US012552864B2

(12) United States Patent
Morsey et al.

(10) Patent No.: US 12,552,864 B2
(45) Date of Patent: Feb. 17, 2026

(54) CANINIZED ANTIBODIES TO HUMAN CTLA-4

(71) Applicant: Intervet Inc., Madison, NJ (US)

(72) Inventors: Mohamad Morsey, Omaha, NE (US); Yuanzheng Zhang, Somerset, NJ (US); Ian Tarpey, St. Ives (GB)

(73) Assignee: INTERVET INC., Rahway, NJ (US)

( * ) Notice: Subject to any disclaimer, the term of this patent is extended or adjusted under 35 U.S.C. 154(b) by 1075 days.

(21) Appl. No.: 17/626,242

(22) PCT Filed: Jul. 15, 2020

(86) PCT No.: PCT/EP2020/069924
§ 371 (c)(1),
(2) Date: Jan. 11, 2022

(87) PCT Pub. No.: WO2021/009188
PCT Pub. Date: Jan. 21, 2021

(65) Prior Publication Data
US 2022/0251209 A1 Aug. 11, 2022

Related U.S. Application Data

(60) Provisional application No. 62/874,287, filed on Jul. 15, 2019.

(51) Int. Cl.
C07K 16/28 (2006.01)

(52) U.S. Cl.
CPC ...... *C07K 16/2818* (2013.01); *C07K 2317/20* (2013.01); *C07K 2317/24* (2013.01); *C07K 2317/34* (2013.01); *C07K 2317/70* (2013.01); *C07K 2317/76* (2013.01); *C07K 2317/92* (2013.01)

(58) Field of Classification Search
CPC ............ C07K 16/2818; C07K 2317/20; C07K 2317/24; C07K 2317/34; C07K 2317/70; C07K 2317/76; C07K 2317/92; C07K 2317/565; A61P 31/00; A61P 35/00; C12N 15/85; A61K 2039/505; A61K 2039/552
See application file for complete search history.

(56) References Cited

U.S. PATENT DOCUMENTS

| | | | |
|---|---|---|---|
| 7,261,890 B2 * | 8/2007 | Krah, III | A61P 43/00 435/69.6 |
| 8,017,114 B2 | 9/2011 | Korman et al. | |
| 9,944,704 B2 | 4/2018 | Morsey et al. | |
| 10,106,607 B2 | 10/2018 | Morsey et al. | |
| 11,820,809 B2 * | 11/2023 | Rao | C07K 16/2866 |
| 2013/0022616 A1 * | 1/2013 | Bammert | A61P 11/00 435/69.6 |
| 2016/0311902 A1 | 10/2016 | Morsey et al. | |
| 2018/0237535 A1 | 8/2018 | Morsey et al. | |

FOREIGN PATENT DOCUMENTS

| | | | |
|---|---|---|---|
| CN | 103547595 A | 1/2014 | |
| CN | 104364264 A | 2/2015 | |
| CN | 105829344 A | 8/2016 | |
| CN | 106029697 A | 10/2016 | |
| EP | 2112166 A2 | 10/2009 | |
| JP | 2014512809 A | 5/2014 | |
| JP | 2017500867 A | 1/2017 | |
| JP | 2017534267 A | 11/2017 | |
| JP | 2019506146 A | 3/2019 | |
| RU | 2346702 C2 | 2/2009 | |
| WO | 2000037504 A2 | 6/2000 | |
| WO | WO-0177332 A2 * | 10/2001 | ........ C07K 14/7155 |
| WO | 2003060080 A2 | 7/2003 | |
| WO | WO 2005092380 A2 | 10/2005 | |
| WO | WO 2005092380 A3 | 10/2005 | |
| WO | 2010097597 A1 | 9/2010 | |
| WO | 2010117760 A2 | 10/2010 | |
| WO | 2012120125 A1 | 9/2012 | |
| WO | WO-2013054127 A1 * | 4/2013 | .............. A61P 17/00 |
| WO | WO 2013184871 A1 | 12/2013 | |
| WO | WO-2015091910 A2 * | 6/2015 | ............. A61K 39/00 |
| WO | WO 2015091910 A3 | 6/2015 | |
| WO | WO 2015091914 A2 | 6/2015 | |
| WO | WO 2015091914 A3 | 6/2015 | |
| WO | WO 2016050721 A1 | 4/2016 | |
| WO | WO-2016156588 A1 * | 10/2016 | ........ A61K 39/3955 |
| WO | 2017062615 A2 | 4/2017 | |
| WO | WO 2017102920 A1 | 6/2017 | |
| WO | WO 2018025178 A1 | 2/2018 | |
| WO | WO-2020056393 A1 * | 3/2020 | ........ A61K 39/3955 |
| WO | WO-2021009188 A1 * | 1/2021 | ............. A61P 31/00 |

OTHER PUBLICATIONS

Janeway, ImmunoBiology The Immune System in Health and Disease, 5th edition, 2001, Chapter 7; figure 7.15 in particular (Year: 2001).*
Wijesuriya SD, Pongo E, Tomic M, Zhang F, Garcia-Rodriquez C, Conrad F, Farr-Jones S, Marks JD, Horwitz AH. Antibody engineering to improve manufacturability. Protein Expr Purif. Sep. 2018; 149:75-83. doi: 10.1016/j.pep.2018.04.003. Epub Apr. 12, 2018. PMID: 29655788. (Year: 2018).*
Bluestein, A. "Both Ends of the Leash". Proto Magazine. published Dec. 20, 2017 (Year: 2017).*
Schwartz, J.C.D., et al., 2001. Structural basis for co-stimulation by the human CTLA-4/B7-2 complex. Nature, 410(6828), pp. 604-608 teaches that mammalian CTLA-4 is highly conserved between human, murine, rat, and rabbit CTLA-4 (Year: 2001).*

(Continued)

*Primary Examiner* — Gary B Nickol
*Assistant Examiner* — Kathleen Cunningchen
(74) *Attorney, Agent, or Firm* — JONES DAY

(57) ABSTRACT

The present invention provides caninized anti-human CTLA-4 antibodies that have specific sequences and a high binding affinity for canine CTLA-4. The invention also relates to use of these antibodies in the treatment of cancer in canines and other companion animals.

23 Claims, 5 Drawing Sheets

Specification includes a Sequence Listing.

(56) References Cited

OTHER PUBLICATIONS

Alegre, Maria-Luisa et al., Regulation of surface and intracellular expression of CTLA4 on mouse T cells, J. Immunol., 1996, 4762-4770, 157.
Aruffo, Alejandro et al., Molecular cloning of a CD28 cDNA by a high-efficiency COS cell expression system, Proc. Natl. Acad. Sci. USA, 1987, 8573-8577, 84.
Attia, Peter et al., Autoimmunity Correlates With Tumor Regression in Patients With Metastatic Melanoma Treated With Anti-Cytotoxic T-Lymphocyte Antigen-4, Journal of Clinical Oncology, 2005, 6043-6053, 23(25).
Azuma, Miyuki et al., B70 antigen is a second ligand for CTLA-4 and CD28, Nature, 1993, 76-79, 366.
Bergeron et al., Comparative functional characterization of canine IgG subclasses, Veterinary Immunology and Immunopathology, 2014, pp. 31-41, 157.
Boutros, C. et al., Safety profiles of anti-CTLA-4 and anti-PD-1 antibodies alone and in combination, Nature Reviews Clinical Oncology, 2016, 473-486, 13.
Butte, Manish J. et al., Interaction of human PD-L1 and B7-1, Molecular Immunology, 2008, 3567-3572, 45.
Chemnitz, Jens M. et al., SHP-1 and SHP-2 Associate with Immunoreceptor Tyrosine-Based Switch Motif of Programmed Death 1 upon Primary Human T Cell Stimulation, but Only Receptor Ligation Prevents T Cell Activation, J. Immunol., 2004, 945-954, 173.
Comin-Anduix, Begona et al., Detailed analysis of immunologic effects of the cytotoxic T lymphocyte-associated antigen 4-blocking monoclonal antibody tremelimumab in peripheral blood of patients with melanoma, Journal of Translational Medicine, 2008, 1-14, 6:22.
Freeman et al., Engagement of the PD-1 Immunoinhibitory Receptor by a Novel B7 Family Member Leads to Negative Regulation of Lymphocyte Activation, J. Exp. Med., 2000, pp. 1027-1034, vol. 192.
Freeman, Gordon J. et al., Cloning of B7-2: a CTLA-4 Counter-Receptor That Costimulates Human T Cell Proliferation, Science, 1993, 909-912, 262.
Freeman, Gordon J. et al., CTLA-4 and CD28 mRNA are coexpressed in most T cells after activation. Expression of CTLA-4 and CD28 mRNA does not correlate with the pattern of lymphokine production, J. Immunol., 1992, 3795-3801, 149.
Gross, Jane A. et al., Identification and distribution of the costimulatory receptor CD28 in the mouse, J. Immunol., 1992, 380-388, 149.
Hodi, F. Stephen et al., Biologic activity of cytotoxic T lymphocyte-associated antigen 4 antibody blockade in previously vaccinated metastatic melanoma and ovarian carcinoma patients, PNAS, 2003, 4712-4717, 100(8).
Inaba, K. et al., The Tissue Distribution of the B7-2 Costimulator in Mice: Abundant Expression on Dendritic Cells In Situ and During Maturation In Vitro, The Journal of Experimental Medicine, 1994, 1849-1860, 180.
Jenkins, Marc K. et al., Antigen Presentation by Chemically Modified Splenocytes Induces Antigen-Specific T Cell Unresponsiveness in Vitro and in Vivo, J. Exp. Med., 1987, 302-319, 165.
Jenkins, Marc K. et al., CD28 delivers a costimulatory signal involved in antigen-specific IL-2 production by human T cells, J. Immunol., 1991, 2461-2466, 147.
Jenkins, Marc K. et al., Molecular events in the induction of a nonresponsive state in interleukin 2-producing helper T-lymphocyte clones, Proc. Natl. Acad. Sci. USA, 1987, 5409-5413, 84.
Jin, Hyun-Tak et al., Role of PD-1 in Regulating T-Cell Immunity, Current Topics in Microbiology and Immunology, 2010, 17-37, 350.
Krummel, Matthew F. et al., CTLA-4 Engagement Inhibits IL-2 Accumulation and Cell Cycle Progression upon Activation of Resting T Cells, J. Exp. Med., 1996, 2533-2540, 183.
Larsen, Christian P. et al., Regulation of Immunostimulatory Function and Costimulatory Molecule (B7-1 and B7-2) Expression on Murine Dendritic Cells, The Journal of Immunology, 1994, 5208-5219, 152.
Leach, DR et al., Enhancement of antitumor immunity by CTLA-4 blockade, Science, 1996, pp. 1734-1736, 271.
Linsley, Peter S. et al., Binding of the B Cell Activation Antigen B7 to CD28 Costimulates T Cell Proliferation and Interleukin 2 mRNA Accumulation, J. Exp. Med., 1991, 721-730, 173.
Linsley, Peter S. et al., T-cell antigen CD28 mediates adhesion with B cells by interacting with activation antigen B7/BB-1, Proc. Natl. Acad. Sci. USA, 1990, 5031-5035, 87.
Mandelbrot, Didier A. et al., B7-1 or B7-2 Is Required to Produce the Lymphoproliferative Phenotype in Mice Lacking Cytotoxic T Lymphocyte-associated Antigen 4 (CTLA-4), J. Exp. Med., 1999, 435-440, 189.
Nishimura et al., Autoimmune Dilated Cardiomyopathy in PD-1 Receptor-Deficient Mice, Science, 2001, pp. 319-322, vol. 291.
Nishimura, Hiroyuki et al., Development of Lupus-like Autoimmune Diseases by Disruption of the PD-1 Gene Encoding an ITIM Motif-Carrying Immunoreceptor, Immunity, 1999, 141-151, 11(2).
Petrovas, Constantinos et al., PD-1 is a regulator of virus-specific CD8+ T cell survival in HIV infection, J. Exp. Med., 2006, 2281-2292, 203.
Phan, Giao Q. et al., Cancer regression and autoimmunity induced by cytotoxic T lymphocyte-associated antigen 4 blockade in patients with metastatic melanoma, PNAS, 2003, 8372-8377, 100.
Razi-Wolf, Ziba et al., Expression and function of the murine B7 antigen, the major costimulatory molecule expressed by peritoneal exudate cells, Proc. Natl. Acad. Sci. USA, 1992, 4210-4214, 89.
Reiser, Hans et al., Murine B7 antigen provides an efficient costimulatory signal for activation of murine T lymphocytes via the T-cell receptor/CD3 complex, Proc. Natl. Acad. Sci. USA, 1992, 271-275, 89.
Riley, James L. et al., The CD28 family: a T-cell rheostat for therapeutic control of T-cell activation, Blood, 2005, 13-21, 105.
Sansom, D. M., CD28, CTLA-4 and their ligands: who does what and to whom?, Immunology, 2000, 169-177, 101.
Sansom, David M. et al., B7/BB1, the ligand for CD28, is expressed on repeatedly activated human T cells in vitro. Eur J Immunol, 1993, 295-298, 23.
Schwartz, Ronald H., A Cell Culture Model for T Lymphocyte Clonal Anergy, Science, 1990, 1349-1356, 248.
Sharpe, Arlene H. et al., The B7-CD28 Superfamily, Nature Reviews, 2002, 116-126, 2.
Soskic, Blagoje et al., A Transendocytosis Perspective on the CD28/CTLA-4 Pathway, Advances in Immunology, 2014, 96-123, Chapter 4.
Tagawa, Michihito et al., Evaluation of costimulatory molecules in dogs with B cell high grade lymphoma, PLoS ONE, 2018, 1-14, 13(7).
Tivol, Elizabeth A. et al., CTLA4Ig prevents lymphoproliferation and fatal multiorgan tissue destruction in CTLA-4-deficient mice, J. Immunol., 1997, 5091-5094, 158.
Tivol, Elizabeth A. et al., Loss of CTLA-4 Leads to Massive Lymphoproliferation and Fatal Multiorgan Tissue Destruction, Revealing a Critical Negative Regulatory Role of CTLA-4, Immunity, 1995, 541-547, 3.
Van Der Merwe, P. Anton et al., CD80 (B7-1) Binds Both CD28 and CTLA-4 with a Low Affinity and Very Fast Kinetics, J. Exp. Med., 1997, 393-403, 185.
Walunas, Theresa L. et al., CTLA-4 Can Function as a Negative Regulator of T Cell Activation, Immunity, 1994, 405-413, 1.
Walunas, Theresa L. et al., CTLA-4 Ligation Blocks CD28-dependent T Cell Activation, J. Exp. Med., 1996, 2541-2550, 183.
Waterhouse, Paul et al., Lymphoproliferative Disorders with Early Lethality in Mice Deficient in Ctla-4, Science, 1995, 985-988, 270.
Zak, Krzysztof M. et al., Structural Biology of the Immune Checkpoint Receptor PD-1 and Its Ligands PD-L1/PD-L2, Cell Structure, 2017, 1163-1174, 25.
Zhang et al., Structural and Functional Analysis of the Costimulatory Receptor Programmed Death-1, Immunity, 2004, pp. 337-347, vol. 20.

(56) References Cited

OTHER PUBLICATIONS

Derksen et al., 2004, "Illegitimate WNT signaling promotes proliferation of multiple myeloma cells," Proc. Natl. Acad. Sci. USA, 101(16):6122-6127.
Dirks, 2008, "Brain tumor stem cells: bringing order to the chaos of brain cancer," J. Clin. Oncol., 26(17):2916-2924.
Lopez-Lazaro, 2015, "The migration ability of stem cells can explain the existence of cancer of unknown primary site. Rethinking metastasis," Oncoscience, 2(5):467-475.
Soskic et al., 2014, "Chapter Four—A Transendocytosis Perspective on the CD28/CTLA-4 Pathway," Adv. Immunol., 124:95-136.
Tran et al., 2010, "Survival comparison between glioblastoma multiforme and other incurable cancers," J. Clin. Neurosci., 17(4):417-421.

* cited by examiner

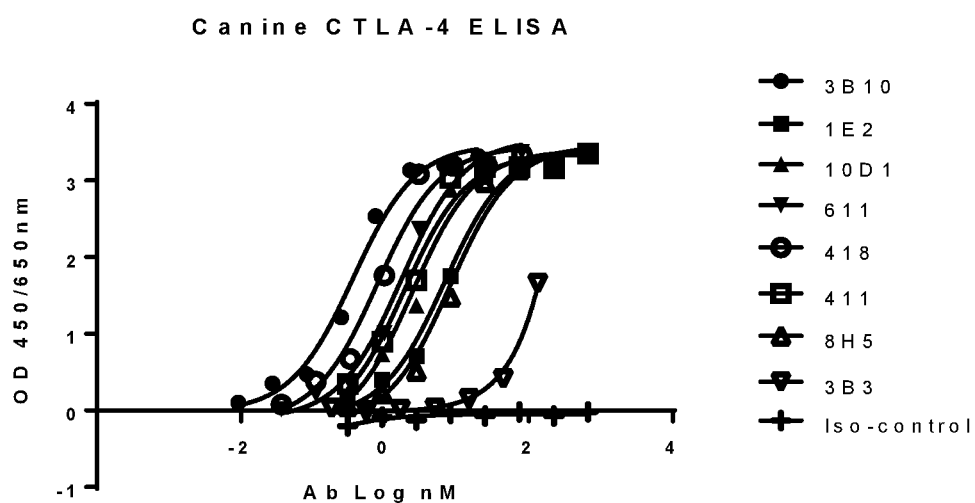
Figure 1. Binding activity of the selected chimeric antibodies with canine CTLA-4.

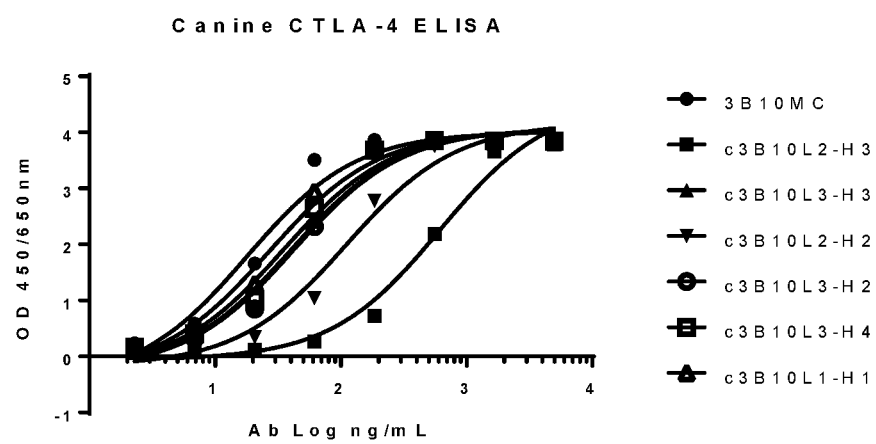
Figure 2. Binding activity of the caninized antibodies with canine CTLA-4.

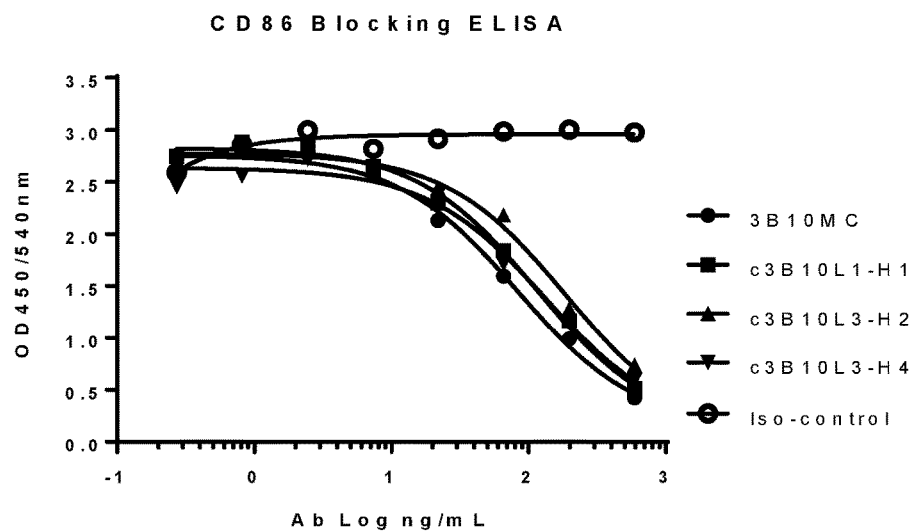
Figure 3. The caninized 3B10 antibodies can block the interaction of canine CD86 and CTLA-4.

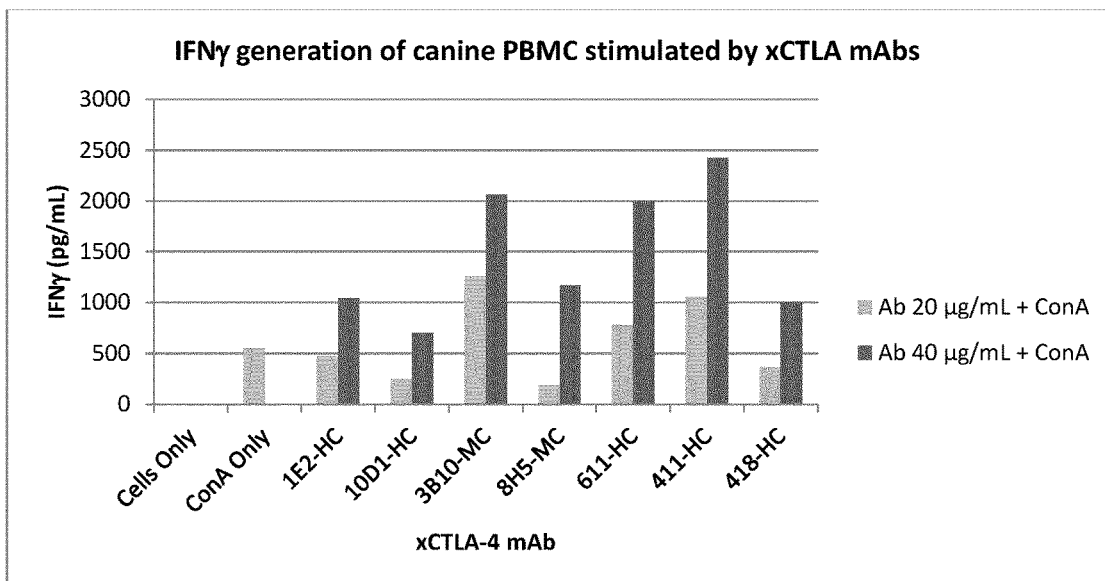
Figure 4. The selected antibodies can activate canine PBMC cells to produce IFNγ. MC: mouse-canine chimera; HC: human-canine chimera.

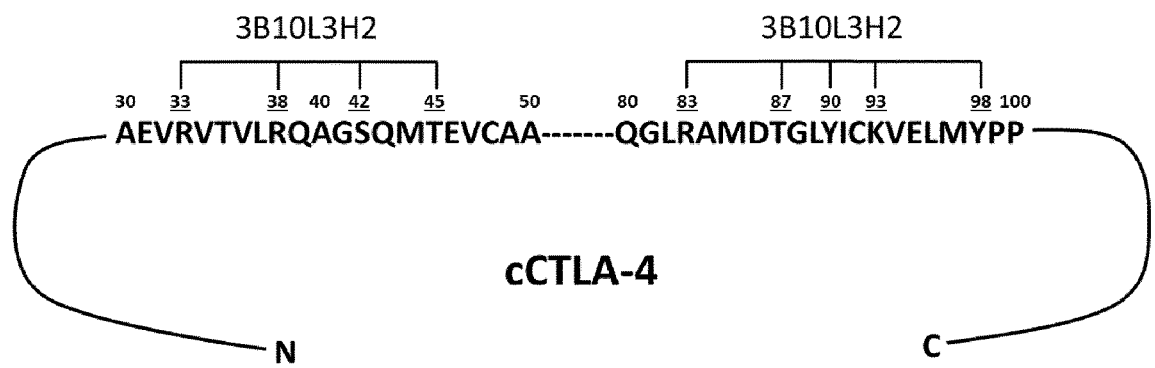
Figure 5. The epitopes of 3B10L3H2 on canine CTLA-4 are cross-linked. The numbers of the residuals interacted with the antibody are underlined.

CANINIZED ANTIBODIES TO HUMAN CTLA-4

CROSS-REFERENCE TO RELATED APPLICATIONS

This application is a National Stage application of International Patent Application No. PCT/EP2020/069924, filed Jul. 15, 2020, which claims priority under 35 U.S.C. § 119 (e) of provisional application U.S. Ser. No. 62/874,287, filed on Jul. 15, 2019, which is hereby incorporated by reference in its entirety.

SEQUENCE LISTING

This application incorporates by reference in its entirety the Computer Readable Form (CRF) of a Substitute Sequence Listing in ASCII text format submitted via Patent Center. The Substitute Sequence Listing text file submitted via Patent Center is entitled "14463-246-999_SUB_SEQ LISTING.txt," was created on Jun. 6, 2025, and is 133,809 bytes in size.

FIELD OF THE INVENTION

The present invention relates to antibodies to proteins involved in co-stimulatory or co-inhibitory signaling pathways, including CTLA-4. More particularly, the present invention further relates to caninized antibodies to human CTLA-4 that have specific sequences and a high binding affinity for canine CTLA-4. The present invention also relates to use of the antibodies of the present invention in the treatment of cancer in canines.

BACKGROUND OF THE INVENTION

The initiation or termination of immune responses is mediated via signaling pathways that are activated by complex interactions between a set of proteins expressed on the surface of many immune cells, most notably T lymphocytes and antigen presenting cells (APCs). Co-stimulatory signaling pathways lead to the development of immune responses and have been shown to be mediated most importantly through the interaction of CD28 on the surface of T cells and B7.1 (also known as CD80) and B7.2 (also known as CD86) family members on the surface of APCs. B7.1 and B7.2 are thought to perform similar functions.

In contrast, co-inhibitory pathways lead to the inhibition or termination of the immune responses and have been shown to be mediated via the interaction between CTLA-4 on T cells and B7.1/B7.2 proteins on APCs. Additional co-inhibitory signaling pathways have been shown to be mediated via the interaction between programmed cell death receptor 1 (PD-1) on T cells and programmed cell death receptor ligands 1 or 2 (PD-L1/PD-L2) proteins on APCs. Furthermore, it has also been shown that the interaction between PD-L1 and B7.1 can also result in inhibitory signals in T cells.

B7.1 and B7.2 are members of the immunoglobulin (Ig) superfamily [Sharpe and Freeman, Nature Reviews, 2:116-126 (2002)]. B7.1 is expressed on activated B cells, activated T cells, as well as macrophages, and dendritic cells [Swanson and Hall, Eur J Immunol., 23:295-298 (1993); Razi-Wolfe et al., PNAS, 89:4210-4214 (1992)]. B7.2 is constitutively expressed on dendritic cells, Langerhans cells, and B cells. In addition, B7.2 is expressed on monocytes and is up-regulated following IFN-gamma stimulation [Larsen et al., Immunol., 152:5208-5219 (1994); Inaba, J. Exp. Med. 180:1849-1860 (1994)].

B7.1 and B7.2 bind CD28 and CTLA-4 with different functional consequences [Linsley et al., PNAS, 87:5031-5035 (1990); Linsley et al., J. Exp. Med., 173:721-730 (1991); Azuma et al., Nature 366:76-79 (1993); Freeman et al., Science 262:909-912 (1993)]. The binding of B7.1 and B7.2 to CTLA-4 has a much higher affinity than the binding of B7.1/B7.2 to CD28 [van der Merwe, J. Exp. Med. 185:393-402 (1997)].

CD28 is a homodimeric glycoprotein that is a member of the Ig superfamily [Aruffo and Seed, PNAS, 84:8573-8577 (1987)]. The mature protein has a single extracellular variable domain of 134 amino acid residues containing a hexapeptide motif MYPPPY that is essential for counter receptor binding [Riley and June, Blood, 105:13-21 (2005)]. The 41-amino acid cytoplasmic domain of CD28 contains four tyrosine residues that can be phosphorylated upon activation [Sharpe and Freeman, Nat. Rev. Immunol., 2:116-126 (2002)]. CD28 is expressed on the majority of CD4$^+$ T cells and about 50% of CD8$^+$ T cells [Gross et al., J. Immunol., 149:380-388 (1992); Riley and June, Blood, 105:13-21 (2005)]. After T cell receptor (TCR) ligation, B7.1/B7.2 binding to CD28 provides a critical co-stimulatory signal to the T cell allowing for T cell activation and subsequent development of the immune response [Reiser et al., PNAS, 89:271-275 (1992); Jenkins et al., J. Immunol., 147:2461-2466 (1991)]. It has been shown that in the absence of CD28 signal, the T cells undergo apoptosis or enter a state of unresponsiveness [Jenkins et al., J. Exp. Med. 165:302-319 (1987); Jenkins et al., PNAS, 84:5409-5413 (1987); Schwartz, Science, 248:1349-1356 (1990)]. CD28-B7.1/B7.2 binding can alter the threshold level of TCR ligation (e.g., the amount of antigen-MHC complex) required for activation, reduce the time needed to stimulate naïve cells and enhance the magnitude of the T cell response [Soskic et al., Advances in Immunology, 124:96-123 (2014)].

CTLA-4 (CD152) is also a member of the Ig superfamily and consists of a single extracellular domain, a transmembrane domain and a short cytoplasmic tail [Swanson, Immunology; 1010:169-177 (2000)]. In addition, CTLA-4 shares about 30% amino acid identity with CD28. CTLA-4 is not constitutively expressed on naïve T cells, although it is rapidly up-regulated soon after CD28 ligation and T cell activation with a peak expression level of CTLA-4 at about 48-96 hours after the initial T cell activation [Alegre et al., J. Immunol., 157:4762-4770 (1996); Freeman et al., J. Immunol., 149:3795-3801 (1992)]. CTLA-4 binds to both B7.1 and B7.2 with a much higher affinity than CD28 [van der Merwe et al., J. Exp. Med., 185:393-402 (1997)]. However, in contrast to the stimulatory effects of CD28 binding B7.1 or B7.2, CTLA-4 acts as an inhibitory receptor that is vital for down-modulation of the immune response [Walnus et al., Immunity, 1:405-413 (1994); Walnus, J. Exp. Med., 183:2541-2550 (1996); Krummel and Allison, J. Exp. Med., 183:2533-2540 (1996)]. The mechanism by which CTLA-4 mediates its immune inhibitory functions are related to its capacity to act as a competitive inhibitor of the interaction between CD28 and B7.1/B7.2 [reviewed in Swanson, Immunology, 1010:169-177 (2000)]. The critical role of CTLA-4 in immune down-regulation is demonstrated in CTLA-4 deficient mice, which die by 3-5 weeks of age because of the development of a lymphoproliferative disease characterized by T cell infiltration of multiple organs [Tivol et al., Immunity, 3:541-5417 (1995); Waterhouse et al., Science, 270:985-988 (1995)]. It was also demonstrated that the consequences of CTLA-4 knockout is dependent on the interaction of CD28 with its ligands B7.1 and B7.2 as shown by the lack of disease in the CTLA-4/B7-1/B7-2 triple knockout mice [Mandelbrot et al., *J. Exp. Med.,* 189:435-440 (1999)]. This is also confirmed by the protection against lymphoproliferation afforded by repeated administration of CTLA-4 Ig in CTLA-4 knockout mice [Tivol et al., *J Immunol.,* 158:5091-5094 (1997)].

In addition, blocking the effect of CTLA-4 with antibodies has been shown to enhance in vitro and in vivo T cell responses and to increase anti-tumor immune responses [Leach et al., *Science,* 271:1734-1736 (1996)]. Based on these findings, the development of CTLA-4 blockers such as monoclonal antibodies were undertaken to provide therapeutic modalities for treatment of cancer [Hodi et al., *PNAS,* 100(8):4712-4717 (2003); Phan G Q et al., *PNAS,* 100(14): 8372-8377 (2003); Attia, *Journal of Clinical Oncology,* 23(25):6043-6053 (2005); Comin-Anduix et al., *Journal of Translational Medicine,* 6:22-22 (2008); WO2000037504 A2; U.S. Pat. No. 8,017,114 B2; WO2010097597A1; WO2012120125 A1; and Boutros et al., *Nat Rev Clin Oncol.,* 13(8):473-486 (2016)]. PD-1 is a member of the CD28/CTLA-4 family of immune modulatory receptors. PD-1 is also a member of the Ig superfamily and contains an extracellular variable domain that binds its ligands and a cytoplasmic tail that binds signaling molecules [reviewed in Zak et al., *Cell Structure,* 25:1163-1174 (2017)]. The cytoplasmic tail of PD-1 contains two tyrosine-based signaling motifs [Zhang et al., *Immunity* 20:337-347 (2004)]. PD-1 expression is not found on unstimulated T cells, B cells, or myeloid cells. However, PD-1 expression is up-regulated on these cells following activation [Chemnitz et al., *J. Immunol.,* 173:945-954 (2004); Petrvas et al., *J. Exp. Med.,* 203:2281-2292 (2006)]. PD-1 is most closely related to CTLA-4, sharing approximately 24% amino acid identity [Jin et al., *Current Topics in Microbiology and Immunology,* 350:17-37 (2010)]. PD-1 attenuates T cell activation when bound to PD-L1 and PD-L2, which are expressed on the surface of APCs. The binding of either of these ligands to PD-1 negatively regulates antigen signaling via the T cell receptor (TCR). To date, only PD-L1 and PD-L2 have been found to function as ligands for PD-1. As with CTLA-4, PD-1 ligation appears to transmit a negative immunomodulatory signal. Ligation of PD-1 by PD-L1 or PD-L2 results in the inhibition of TCR-mediated proliferation and cytokine production [Jin et al., *Current Topics in Microbiology and Immunology,* 350: 17-37 (2010)]. In contrast to CTLA-4 deficient animals, PD-1 deficient mice die much later in life and display signs of autoimmunity although the severity of the observed effects is not as profound as those exhibited by CTLA-4 deficient animals [Nishimura et al., *Immunity,* 11(2):141-151 (1999); Nishimura et al., *Science,* 291(5502):319-322 (2001)]. Although the PD-1 signaling pathways are currently under intense investigation, research to date suggests that the PD-L1/PD-L2/PD-1 interactions are involved in the negative regulation of some immune responses because of diminishing the signals downstream of TCR stimulation leading to decreased cytokine secretion and impairment of T cell proliferation and decrease in the production of cytotoxic molecules by T cells [Freeman et al., *J. Exp. Med.,* 192 (7):1027-1034 (2000)].

PD-L1 (CD274) is a type 1 membrane protein and consists of IgV-like and IgC-like extracellular domains, a hydrophobic transmembrane domain, and a short cytoplasmic tail made from 30 amino acids, with unknown signal transduction properties. PD-L1 is recognized as a member of the B7 family and shares approximately 20% amino acid identity with B7 family members. PD-L1 binds to its receptor, PD-1, found on activated T cells, B cells, and myeloid cells. PD-L1 also binds to the costimulatory molecule B7.1, but not to CD86 [Butte et al., *Immunology,* 45 (13):3567-3572 (2008)]. The affinity of B7.1 for PD-L1 is intermediate between its affinities for CD28 and CTLA-4. The related molecule PD-L2 has no affinity for either CD80 or CD86, but shares PD-1 as a receptor. Engagement of PD-L1 with its receptor PD-1 on T cells delivers a signal that inhibits TCR-mediated IL-2 production and T cell proliferation. PD-L1 binding to PD-1 also contributes to ligand-induced TCR down-modulation during antigen presentation to naive T cells. Additionally, PD-L1 binding to B7.1 on T cells leads to T cell apoptosis. The role of PD-1 and PD-L1 as inhibitors of T cell activation has been demonstrated in many studies. Based on these findings, the development of PD-1 and PD-L1 blockers such as monoclonal antibodies, were undertaken to provide therapeutic modalities for treatment of cancer and infectious diseases.

Humanized monoclonal antibodies that block the binding and activity of canine PD-1, PD-L1, and CTLA-4 have been developed and are currently available for use in the treatment of human subjects diagnosed with one of several different types of cancer. Similarly, caninized monoclonal antibodies that block the binding and activity of canine PD-1 and PD-L1 have also been reported [U.S. Pat. No. 9,944,704 B2, U.S. Pat. No. 10,106,607 B2, and U.S. 2018/0237535 A1, hereby incorporated by reference in their entireties]. However, heretofore there have been no reports of a caninized monoclonal antibody that blocks the binding and activity of canine CTLA-4.

The citation of any reference herein should not be construed as an admission that such reference is available as "prior art" to the instant application.

SUMMARY OF THE INVENTION

The present invention relates to caninized anti-human CTLA-4 antibodies that have specific binding affinity for canine CTLA-4, as well as having the ability to block the binding of canine CTLA-4 to canine CD80 and/or CD86. The present invention also relates to use of such antibodies in the treatment of disease such as cancer and/or those due to infections.

Accordingly, the present invention provides an isolated caninized antibody comprising a canine IgG heavy chain and a canine kappa or lambda light chain, or antigen binding fragment of the caninized antibody, that specifically binds CTLA-4. In particular embodiments of this type, the canine kappa or lambda light chain comprises three light chain complementary determining regions (CDRs), i.e., CDR light 1 (CDRL1), CDR light 2 (CDRL2), and CDR light 3 (CDRL3), and the canine IgG heavy chain comprises three heavy chain CDRs, i.e., CDR heavy 1 (CDRH1), CDR heavy 2 (CDRH2) and CDR heavy 3 (CDRH3), with all six of the CDRs obtained from a mammalian CTLA-4 antibody. Particular embodiments of the caninized antibodies and fragments thereof of the present invention bind canine CTLA-4 and/or block the binding of canine CTLA-4 to canine CD80 and/or CD86.

In certain embodiments, the CDRL1 of the caninized antibody comprises the amino acid sequence of SEQ ID NO: 54, the CDRL2 comprises the amino acid sequence comprising SEQ ID NO: 56, and the CDRL3 comprises the amino acid sequence of SEQ ID NO: 58. In related embodiments the CDRH1 of the caninized antibody comprises the amino acid sequence of SEQ ID NO: 48, the CDRH2 comprises the amino acid sequence comprising SEQ ID NO: 50, and the CDRH3 comprises the amino acid sequence of SEQ ID NO: 52.

In specific embodiments, the CDRL1 of the caninized antibody is encoded by the nucleotide sequence of SEQ ID NO: 53, the CDRL2 is encoded by the nucleotide sequence of SEQ ID NO: 55, and the CDRL3 is encoded by the nucleotide sequence of SEQ ID NO: 57. In related embodiments the CDRH1 of the caninized antibody is encoded by the nucleotide sequence of SEQ ID NO: 47, the CDRH2 is encoded by the nucleotide sequence of SEQ ID NO: 49, and the CDRH3 is encoded by the nucleotide sequence of SEQ ID NO: 51.

In more specific embodiment the CDRL1 of the caninized antibody comprises the amino acid sequence of SEQ ID NO: 54, the CDRL2 comprises the amino acid sequence comprising SEQ ID NO: 56, and the CDRL3 comprises the amino acid sequence of SEQ ID NO: 58, and in addition, the CDRH1 of the caninized antibody comprises the amino acid sequence of SEQ ID NO: 48, the CDRH2 comprises the amino acid sequence comprising SEQ ID NO: 50, and the CDRH3 comprises the amino acid sequence of SEQ ID NO: 52.

For certain embodiments of the present invention, the heavy chain of the caninized antibody comprises the amino acid sequence of SEQ ID NO: 34. In more specific embodiments, the heavy chain is encoded by the nucleotide sequence of SEQ ID NO: 33. In related embodiments, the heavy chain comprises the amino acid sequences of SEQ ID NO: 48, SEQ ID NO: 50, and SEQ ID NO: 52, within a conservative variant of the amino acid sequence of SEQ ID NO: 34. In still other embodiments, the heavy chain comprises the amino acid sequences of SEQ ID NO: 48, SEQ ID NO: 50, and SEQ ID NO: 52, within a function conserved variant of the amino acid sequence of SEQ ID NO: 34.

In yet other embodiments, the heavy chain of the caninized antibody comprises the amino acid sequence of SEQ ID NO: 36. In more specific embodiments, the heavy chain is encoded by the nucleotide sequence of SEQ ID NO: 35. In related embodiments, the heavy chain comprises the amino acid sequences of SEQ ID NO: 48, SEQ ID NO: 50, and SEQ ID NO: 52, within a conservative variant of the amino acid sequence of SEQ ID NO: 36. In still other embodiments, the heavy chain comprises the amino acid sequences of SEQ ID NO: 48, SEQ ID NO: 50, and SEQ ID NO: 52, within a function conserved variant of the amino acid sequence of SEQ ID NO: 36.

In yet other embodiments, the heavy chain of the caninized antibody comprises the amino acid sequence of SEQ ID NO: 38. In more specific embodiments, the heavy chain is encoded by the nucleotide sequence of SEQ ID NO: 37. In related embodiments, the heavy chain comprises the amino acid sequences of SEQ ID NO: 48, SEQ ID NO: 50, and SEQ ID NO: 52, within a conservative variant of the amino acid sequence of SEQ ID NO: 38. In still other embodiments, the heavy chain comprises the amino acid sequences of SEQ ID NO: 48, SEQ ID NO: 50, and SEQ ID NO: 52, within a function conserved variant of the amino acid sequence of SEQ ID NO: 38.

In yet other embodiments, the heavy chain of the caninized antibody comprises the amino acid sequence of SEQ ID NO: 40. In more specific embodiments, the heavy chain is encoded by the nucleotide sequence of SEQ ID NO: 39. In related embodiments, the heavy chain comprises the amino acid sequences of SEQ ID NO: 48, SEQ ID NO: 50, and SEQ ID NO: 52, within a conservative variant of the amino acid sequence of SEQ ID NO: 40. In still other embodiments, the heavy chain comprises the amino acid sequences of SEQ ID NO: 48, SEQ ID NO: 50, and SEQ ID NO: 52, within a function conserved variant of the amino acid sequence of SEQ ID NO: 40.

For certain embodiments of the present invention, the heavy chain of the caninized antibody comprises the amino acid sequence of SEQ ID NO: 60. In more specific embodiments, the heavy chain is encoded by the nucleotide sequence of SEQ ID NO: 59. In related embodiments, the heavy chain comprises the amino acid sequences of SEQ ID NO: 48, SEQ ID NO: 50, and SEQ ID NO: 52, within a conservative variant of the amino acid sequence of SEQ ID NO: 60. In still other embodiments, the heavy chain comprises the amino acid sequences of SEQ ID NO: 48, SEQ ID NO: 50, and SEQ ID NO: 52, within a function conserved variant of the amino acid sequence of SEQ ID NO: 60.

In yet other embodiments, the heavy chain of the caninized antibody comprises the amino acid sequence of SEQ ID NO: 62. In more specific embodiments, the heavy chain is encoded by the nucleotide sequence of SEQ ID NO: 61. In related embodiments, the heavy chain comprises the amino acid sequences of SEQ ID NO: 48, SEQ ID NO: 50, and SEQ ID NO: 52, within a conservative variant of the amino acid sequence of SEQ ID NO: 62. In still other embodiments, the heavy chain comprises the amino acid sequences of SEQ ID NO: 48, SEQ ID NO: 50, and SEQ ID NO: 52, within a function conserved variant of the amino acid sequence of SEQ ID NO: 62.

In still other embodiments, the heavy chain of the caninized antibody comprises the amino acid sequence of SEQ ID NO: 64. In more specific embodiments, the heavy chain is encoded by the nucleotide sequence of SEQ ID NO: 63. In related embodiments, the heavy chain comprises the amino acid sequences of SEQ ID NO: 48, SEQ ID NO: 50, and SEQ ID NO: 52, within a conservative variant of the amino acid sequence of SEQ ID NO: 64. In still other embodiments, the heavy chain comprises the amino acid sequences of SEQ ID NO: 48, SEQ ID NO: 50, and SEQ ID NO: 52, within a function conserved variant of the amino acid sequence of SEQ ID NO: 64.

In yet other embodiments, the heavy chain of the caninized antibody comprises the amino acid sequence of SEQ ID NO: 66. In more specific embodiments, the heavy chain is encoded by the nucleotide sequence of SEQ ID NO: 65. In related embodiments the heavy chain comprises the amino acid sequences of SEQ ID NO: 48, SEQ ID NO: 50, and SEQ ID NO: 52, within a conservative variant of the amino acid sequence of SEQ ID NO: 66. In still other embodiments, the heavy chain comprises the amino acid sequences of SEQ ID NO: 48, SEQ ID NO: 50, and SEQ ID NO: 52, within a function conserved variant of the amino acid sequence of SEQ ID NO: 66.

In certain embodiments, the canine light chain of the caninized antibody is a kappa chain. In alternative embodiments, the canine light chain is a lambda chain. In specific embodiments, the kappa light chain comprises the amino acid sequence of SEQ ID NO: 42. In more specific embodiments, the kappa light chain is encoded by the nucleotide sequence of SEQ ID NO: 41. In related embodiments, the kappa light chain comprises the amino acid sequences of SEQ ID NO: 54, SEQ ID NO: 56, and SEQ ID NO: 58, within a conservative variant of the amino acid sequence of SEQ ID NO: 42. In still other embodiments, the kappa light chain comprises the amino acid sequences of SEQ ID NO:

54, SEQ ID NO: 56, and SEQ ID NO: 58, within a function conserved variant of the amino acid sequence of SEQ ID NO: 42.

In particular embodiments, the kappa light chain of the caninized antibody comprises the amino acid sequence of SEQ ID NO: 44. In more specific embodiments, the kappa light chain is encoded by the nucleotide sequence of SEQ ID NO: 43. In related embodiments, the kappa light chain comprises the amino acid sequences of SEQ ID NO: 54, SEQ ID NO: 56, and SEQ ID NO: 58, within a conservative variant of the amino acid sequence of SEQ ID NO: 44. In still other embodiments, the kappa light chain comprises the amino acid sequences of SEQ ID NO: 54, SEQ ID NO: 56, and SEQ ID NO: 58, within a function conserved variant of the amino acid sequence of SEQ ID NO: 44.

In yet other embodiments, the kappa light chain of the caninized antibody comprises the amino acid sequence of SEQ ID NO: 46. In more specific embodiments, the kappa light chain is encoded by the nucleotide sequence of SEQ ID NO: 45. In related embodiments, the kappa light chain comprises the amino acid sequences of SEQ ID NO: 54, SEQ ID NO: 56, and SEQ ID NO: 58, within a conservative variant of the amino acid sequence of SEQ ID NO: 46. In still other embodiments, the kappa light chain comprises the amino acid sequences of SEQ ID NO: 54, SEQ ID NO: 56, and SEQ ID NO: 58, within a function conserved variant of the amino acid sequence of SEQ ID NO: 46.

The present invention further provides caninized antibodies that comprise any light chain of the present invention with any heavy chain of the present invention. In particular embodiments, the isolated caninized antibody comprises a heavy chain comprising the amino acid sequence of SEQ ID NO: 36, SEQ ID NO: 62, or the amino acid sequences of SEQ ID NO: 48, SEQ ID NO: 50, and SEQ ID NO: 52, within a conservative variant of the amino acid sequence of SEQ ID NO: 36 or SEQ ID NO: 62, and a kappa light chain comprising the amino acid sequence of SEQ ID NO: 46 or an amino acid sequence that comprises the amino acid sequences of SEQ ID NO: 54, SEQ ID NO: 56, and SEQ ID NO: 58, within a conservative variant of the amino acid sequence of SEQ ID NO: 46. In more particular embodiments, an isolated caninized antibody comprises a heavy chain comprising the amino acid sequence of SEQ ID NO: 36 and a kappa light chain comprising the amino acid sequence of SEQ ID NO: 46. In other particular embodiments, an isolated caninized antibody comprises a heavy chain comprising the amino acid sequence of SEQ ID NO: 62 and a kappa light chain comprising the amino acid sequence of SEQ ID NO: 46.

In other particular embodiments, the isolated caninized antibody comprises a heavy chain comprising the amino acid sequence of SEQ ID NO: 40, SEQ ID NO: 66, or comprises the amino acid sequences of SEQ ID NO: 48, SEQ ID NO: 50, and SEQ ID NO: 52, within a conservative variant of the amino acid sequence of SEQ ID NO: 40 or SEQ ID NO: 66, and a kappa light chain comprising the amino acid sequence of SEQ ID NO: 42 or an amino acid sequence that comprises the amino acid sequences of SEQ ID NO: 54, SEQ ID NO: 56, and SEQ ID NO: 58, within a conservative variant of the amino acid sequence of SEQ ID NO: 42. In more particular embodiments, an isolated caninized antibody comprises a heavy chain comprising the amino acid sequence of SEQ ID NO: 40 and a kappa light chain comprising the amino acid sequence of SEQ ID NO: 42. In yet other particular embodiments, an isolated caninized antibody comprises a heavy chain comprising the amino acid sequence of SEQ ID NO: 66 and a kappa light chain comprising the amino acid sequence of SEQ ID NO: 42.

The present invention further provides isolated nucleic acids that encode any one of the light chains of the caninized antibody of the present invention. Similarly, the present invention further provides isolated nucleic acids that encode any one of the heavy chains of the caninized antibody of the present invention. The present invention further provides expression vectors that comprise one or more of the isolated nucleic acids of the present invention. The present invention further provides host cells that comprise one or more expression vectors of the present invention.

In particular embodiments, the antibody is a recombinant antibody or an antigen binding fragment thereof. In related embodiments, the variable heavy chain domain and variable light chain domain are connected by a flexible linker to form a single-chain antibody.

In particular embodiments, the antibody or antigen binding fragment is a Fab fragment. In other embodiments, the antibody or antigen binding fragment is a Fab' fragment. In other embodiments, the antibody or antigen binding fragment is a (Fab')$_2$ fragment. In still other embodiments, the antibody or antigen binding fragment is a diabody. In particular embodiments, the antibody or antigen binding fragment is a domain antibody. In more particular embodiments, the antibody or antigen binding fragment is a camelized single domain antibody.

In particular embodiments, the caninized anti-human CTLA-4 antibody or antigen binding fragment increases the immune response of the canine subject being treated.

Accordingly, the present invention further provides isolated nucleic acids that encode the caninized anti-human CTLA-4 antibodies or antigen binding fragments as disclosed herein. In related embodiments such antibodies or antigen binding fragments can be used for the preparation of a medicament to treat cancer in a canine subject. Alternatively, or in conjunction, the present invention provides for the use of any of the antibodies or antibody fragments of the present invention for diagnostic use. In still additional embodiments, a kit is provided comprising any of the caninized antibodies or antigen binding fragments disclosed herein.

In yet additional embodiments, an expression vector is provided comprising an isolated nucleic acid encoding any of the caninized anti-human CTLA-4 antibodies or antigen binding fragments of the invention. The invention also relates to a host cell comprising any of the expression vectors described herein. In particular embodiments, these nucleic acids, expression vectors or polypeptides of the invention are useful in methods of making an antibody.

The present invention further includes pharmaceutical compositions comprising a caninized antibody of the present invention or antigen binding fragment thereof together with a pharmaceutically acceptable carrier or diluent. In addition, the present invention provides methods of increasing the activity of an immune cell, comprising administering to a subject in need thereof a therapeutically effective amount of such pharmaceutical compositions. In particular embodiments, the subject is a canine. In alternative embodiments, the subject is a feline. In yet other embodiments the subject is an equine. In certain embodiments the method is used for the treatment of cancer. In other embodiments, the method is used in the treatment of an infection or infectious disease. In still other embodiments, a caninized antibody of the present invention or antigen binding fragment thereof is used as a vaccine adjuvant.

These and other aspects of the present invention will be better appreciated by reference to the following Brief Description of the Drawings and the Detailed Description.

BRIEF DESCRIPTION OF THE DRAWINGS

FIG. 1 shows the results of an ELISA with canine CTLA-4 for a series of selected chimera antibodies, as indicated, demonstrating their binding activity: • 3B10, ∆ 8H5, ▼ 611, ▲ 10D1, ∇ 3B3, O 418, □ 411, ■ 1E2, and + Iso-control. The individual chimeric antibodies are described in Table 1 below. The Iso-control is a caninized murine antibody for an antigen that is unrelated to CTLA-4.

FIG. 2 shows the results of an ELISA of a series of caninized 3B-10 antibodies, as indicated, demonstrating that the caninized 3B-10 antibodies bind strongly to canine CTLA-4. • 3B10 MC, ■ c3B10L2-H3, ▲ c3B10L3-H3, ▼ c3B10L2-H2, O c3B10L3-H2, □ c3B10L3-H4, and ∆ c3B10L1-H1. L1, L2, and L3 correspond to VL1, VL2, and VL3 respectively, in Table 5 below, and H1, H2, H3, and H4 correspond to VH1, VH2, VH3, and VH4 respectively, in Table 4 below. 3B10 MC is the same chimeric antibody depicted in FIG. 1.

FIG. 3 provides the results of an ELISA with canine CD86 and canine CTLA-4 in the presence of the chimera or caninized 3B10 antibodies. • 3B10 MC, ■ c3B10L1-H1, ▲ c3B10L3-H2, ▼ c3B10L3-H4, and + Iso-control. The results demonstrate antibody blocking activity towards the binding interaction of canine CD86 with canine CTLA-4 of both the chimera and the caninized 3B10 antibodies. The Iso-control is a caninized murine antibody for an antigen that is unrelated to CTLA-4.

FIG. 4 shows the IFNγ generation produced by canine PBMC after activation by the selected CTLA-4 chimera antibodies, as indicated [1E2, 3B10, 10D1, 8H5, 611, 411, and 418] and as described for FIG. 1 above.

FIG. 5 identifies the epitopes of canine CTLA-4, which comprises the amino acid sequence of the prior art SEQ ID NO: 68, that interact with the caninized 3B10L3H2 (3B10 VL3VH2) antibody.

DETAILED DESCRIPTION OF THE INVENTION

Abbreviations:

Throughout the detailed description and examples of the invention the following abbreviations will be used:
ADCC Antibody-dependent cellular cytotoxicity
CDC Complement-dependent cytotoxicity
CDR Complementarity determining region in the immunoglobulin variable regions, defined using the Kabat numbering system
CHO Chinese hamster ovary
EC50 concentration resulting in 50% efficacy or binding
ELISA Enzyme-linked immunosorbant assay
FR Antibody framework region: the immunoglobulin variable regions excluding the CDR regions.
HRP Horseradish peroxidase
IFN interferon
IC50 concentration resulting in 50% inhibition
IgG Immunoglobulin G
Kabat An immunoglobulin alignment and numbering system pioneered by Elvin A. Kabat [*Sequences of Proteins of Immunological Interest,* 5th Ed. Public Health Service, National Institutes of Health, Bethesda, Md. (1991)].
mAb Monoclonal antibody (also Mab or MAb)
MES 2-(N-morpholino)ethanesulfonic acid
MOA Mechanism of action
PCR Polymerase chain reaction
PK Pharmacokinetics
SEB *Staphylococcus* Enterotoxin B
TT Tetanus toxoid
V region The segment of IgG chains which is variable in sequence between different antibodies. It extends to Kabat residue 109 in the light chain and 113 in the heavy chain.
VH Immunoglobulin heavy chain variable region
VK Immunoglobulin kappa light chain variable region Definitions So that the invention may be more readily understood, certain technical and scientific terms are specifically defined below. Unless specifically defined elsewhere in this document, all other technical and scientific terms used herein have the meaning commonly understood by one of ordinary skill in the art to which this invention belongs.

As used herein, including the appended claims, the singular forms of words such as "a," "an," and "the," include their corresponding plural references unless the context clearly dictates otherwise.

"Activation" as it applies to cells or to receptors refers to the activation or treatment of a cell or receptor with a ligand, unless indicated otherwise by the context or explicitly. "Ligand" encompasses natural and synthetic ligands, e.g., cytokines, cytokine variants, analogues, muteins, and binding compounds derived from antibodies. "Ligand" also encompasses small molecules, e.g., peptide mimetics of cytokines and peptide mimetics of antibodies. "Activation" can refer to cell activation as regulated by internal mechanisms as well as by external or environmental factors.

"Activity" of a molecule may describe or refer to the binding of the molecule to a ligand or to a receptor, to catalytic activity; to the ability to stimulate gene expression or cell signaling, differentiation, or maturation; to antigenic activity, to the modulation of activities of other molecules, and the like. "Activity" of a molecule may also refer to activity in modulating or maintaining cell-to-cell interactions, e.g., adhesion, or activity in maintaining a structure of a cell, e.g., cell membranes or cytoskeleton. "Activity" can also mean specific activity, e.g., [catalytic activity]/[mg protein], or [immunological activity]/[mg protein], concentration in a biological compartment, or the like. "Activity" may refer to modulation of components of the innate or the adaptive immune systems.

"Administration" and "treatment," as it applies to an animal, e.g., a canine experimental subject, cell, tissue, organ, or biological fluid, refers to contact of an exogenous pharmaceutical, therapeutic, diagnostic agent, or composition to the animal e.g., a canine subject, cell, tissue, organ, or biological fluid. Treatment of a cell encompasses contact of a reagent to the cell, as well as contact of a reagent to a fluid, where the fluid is in contact with the cell. "Administration" and "treatment" also means in vitro and ex vivo treatments, e.g., of a cell, by a reagent, diagnostic, binding compound, or by another cell. The term "subject" includes any organism, preferably an animal, more preferably a mammal (e.g., canine, feline, or equine) and most preferably a canine.

"Treat" or "treating" means to administer a therapeutic agent, such as a composition containing any of the antibodies or antigen binding fragments of the present invention, internally or externally to a canine subject or patient having one or more disease symptoms, or being suspected of having a disease, for which the agent has therapeutic activity. Typically, the agent is administered in an amount effective to alleviate and/or ameliorate one or more disease symptoms in the treated subject or population, whether by inducing the regression of or inhibiting the progression of such symptom (s) by any clinically measurable degree. The amount of a therapeutic agent that is effective to alleviate any particular disease symptom (also referred to as the "therapeutically effective amount") may vary according to factors such as the disease state, age, and weight of the patient (e.g., canine, feline, or equine), and the ability of the pharmaceutical composition to elicit a desired response in the subject. Whether a disease symptom has been alleviated or ameliorated can be assessed by any clinical measurement typically used by veterinarians or other skilled healthcare providers to assess the severity or progression status of that symptom. While an embodiment of the present invention (e.g., a treatment method or article of manufacture) may not be effective in alleviating the target disease symptom(s) in every subject, it should alleviate the target disease symptom (s) in a statistically significant number of subjects as determined by any statistical test known in the art such as the Student's t-test, the chi$^2$-test, the U-test according to Mann and Whitney, the Kruskal-Wallis test (H-test), Jonckheere-Terpstra-test and the Wilcoxon-test.

"Treatment," as it applies to a human, veterinary (e.g., canine) or research subject, refers to therapeutic treatment, as well as research and diagnostic applications. "Treatment" as it applies to a human, veterinary (e.g., canine), or research subject, or cell, tissue, or organ, encompasses contact of the antibodies or antigen binding fragments of the present invention to a canine or other animal subject (e.g., feline), a cell, tissue, physiological compartment, or physiological fluid.

The term "immune response" refers to the action of, for example, lymphocytes, antigen presenting cells, phagocytic cells, granulocytes, and soluble macromolecules produced by the above cells or the liver (including antibodies, cytokines, and complement) that results in selective damage to, destruction of, or elimination from the mammalian body (e.g., canine body) of cancerous cells, cells or tissues infected with pathogens, or invading pathogens.

Caninized Anti-Human CTLA-4 Antibodies

The present invention provides isolated caninized anti-human CTLA-4 antibodies or antigen binding fragments thereof that bind canine CTLA-4 and uses of such antibodies or fragments.

As used herein, a caninized anti-human CTLA-4 antibody refers to a caninized antibody that specifically binds to mammalian CTLA-4. An antibody that specifically binds to mammalian CTLA-4, and in particular canine CTLA-4, is an antibody that exhibits preferential binding to mammalian CTLA-4, as compared to other antigens, but this specificity does not require absolute binding specificity. A caninized anti-human CTLA-4 antibody is considered "specific" for canine CTLA-4 if its binding is determinative of the presence of canine CTLA-4 in a biological sample obtained from a canine, or if it is capable of altering the activity of canine CTLA-4 without unduly interfering with the activity of other unrelated canine proteins in a canine sample, e.g. without producing undesired results such as false positives in a diagnostic context or side effects in a therapeutic context. The degree of specificity necessary for a caninized anti-human CTLA-4 antibody may depend on the intended use of the antibody, and at any rate is defined by its suitability for use for an intended purpose. The antibody, or binding compound derived from the antigen-binding site of an antibody, of the contemplated method binds to its antigen, or a variant or mutein thereof, with an affinity that is at least two-fold greater, preferably at least ten-times greater, more preferably at least 20-times greater, and most preferably at least 100-times greater than the affinity with any other canine antigen. An isolated antibody that specifically binds canine CTLA-4, however, may cross-react with other antigens, particularly closely related antigens such as feline CTLA-4, equine CTLA-4, and/or human CTLA-4.

As used herein, an antibody is said to bind specifically to a polypeptide comprising a given sequence (in this case canine CTLA-4) if it binds to polypeptides comprising the sequence of canine CTLA-4, but does not bind anywhere near as well, if at all, to other canine proteins lacking the amino acid sequence of canine CTLA-4. For example, an antibody that specifically binds to a polypeptide comprising canine CTLA-4 may bind to a FLAG®-tagged form of canine CTLA-4, but will not specifically bind to other FLAG®-tagged canine proteins.

As used herein, unless otherwise indicated, "antibody fragment" or "antigen binding fragment" refers to antigen binding fragments of antibodies, i.e. antibody fragments that retain the ability to bind specifically to the antigen (e.g., canine CTLA-4) bound by the full-length antibody, e.g. fragments that retain one or more CDR regions. Examples of antigen binding fragments include, but are not limited to, Fab, Fab', F(ab')2, and Fv fragments; diabodies; linear antibodies; single-chain antibody molecules, e.g., sc-Fv; nanobodies and multispecific antibodies formed from antibody fragments.

Typically, a caninized antibody or antigen binding fragment thereof of the invention retains at least 10% of its canine CTLA-4 binding activity (when compared to the corresponding parental antibody) when that activity is expressed on a molar basis. Preferably, an antibody or antigen binding fragment of the invention retains at least 20%, 50%, 70%, 80%, 90%, 95% or 100% or more of the canine CTLA-4 binding affinity as the parental antibody.

The present invention includes antibodies that are referred to as "conservative variants" of an antibody with a defined amino acid sequence. As used herein, "conservative variants" have one, two, three, or more conservative amino acid substitutions in their amino acid sequence relative to a caninized antibody of the invention that has a defined amino acid sequence. The present invention further includes antibodies that are referred to as "function conserved variants" of a caninized antibody with a defined amino acid sequence. As used herein, "function conserved variants" have one, two, three, or more non-conservative amino acid substitutions relative to the amino acid sequence of that caninized antibody. The terms "conservative variant" and "function conserved variant" are used only with respect to amino acid residue changes in the canine frame of a corresponding caninized antibody of the invention and not to the specific CDRs of the caninized antibody. Importantly, a "conservative variant" and/or a "function conserved variant" does not substantially alter the biologic activity of the corresponding caninized antibody of the invention comprising the defined amino acid sequence.

An "isolated antibody" refers to the purification status and in such context means the molecule is substantially free of other biological molecules such as nucleic acids, proteins, lipids, carbohydrates, or other material such as cellular debris and growth media. Generally, the term "isolated" is not intended to refer to a complete absence of such material or to an absence of water, buffers, or salts, unless they are present in amounts that substantially interfere with experimental or therapeutic use of the binding compound as described herein.

The variable regions of each light/heavy chain pair form the antigen binding site of the antibody. Thus, in general, an intact antibody has two binding sites. Except in bifunctional or bispecific antibodies, the two binding sites are, in general, the same.

Typically, the variable domains of both the heavy and light chains comprise three hypervariable regions, also called complementarity determining regions (CDRs), located within relatively conserved framework regions (FR). The CDRs are usually flanked by the framework regions, enabling binding to a specific epitope. In general, from N-terminal to C-terminal, both light and heavy chains variable domains comprise FR1, CDR1, FR2, CDR2, FR3, CDR3 and FR4. The assignment of amino acids to each domain is, generally, in accordance with the definitions of *Sequences of Proteins of Immunological Interest*, Kabat, et al.; National Institutes of Health, Bethesda, Md., 5$^{th}$ ed., NIH Publ. No. 91-3242 (1991); Kabat, *Adv. Prot. Chem.* 32:1-75 (1978); Kabat, et al., *J. Biol. Chem.* 252:6609-6616 (1977); Chothia, et al., *J. Mol. Biol.* 196:901-917 (1987) or Chothia, et al., *Nature* 342:878-883 (1989).

As used herein, the term "hypervariable region" refers to the amino acid residues of an antibody that are responsible for antigen-binding. The hypervariable region comprises amino acid residues from a "complementarity determining region" or "CDR" (i.e. CDRL1, CDRL2, and CDRL3 in the light chain variable domain and CDRH1, CDRH2, and CDRH3 in the heavy chain variable domain). [See Kabat et al. *Sequences of Proteins of Immunological Interest,* 5th Ed. Public Health Service, National Institutes of Health, Bethesda, Md. (1991), defining the CDR regions of an antibody by sequence; see also Chothia and Lesk, *J Mol. Biol.* 196: 901-917 (1987) defining the CDR regions of an antibody by structure].

As used herein, the term "framework" or "FR" residues refers to those variable domain residues other than the hypervariable region residues defined herein as CDR residues. The framework of a caninized antibody represents a portion of the canine frame.

As used herein, the term "canine" includes all domestic dogs, *Canis lupus familiaris* or *Canis familiaris*, unless otherwise indicated.

As used herein, the term "feline" refers to any member of the Felidae family. Domestic cats, pure-bred and/or mongrel companion cats, and wild or feral cats are all felines.

As used herein the term "canine frame" refers to the amino acid sequence of the heavy chain and light chain of a canine antibody other than the hypervariable region residues defined herein as CDR residues. With regard to a caninized antibody, in the majority of embodiments the amino acid sequences of the native canine CDRs are replaced with the corresponding foreign CDRs (e.g., those from a mouse antibody) in both chains. Optionally the heavy and/or light chains of the canine antibody may contain some foreign non-CDR residues, e.g., so as to preserve the conformation of the foreign CDRs within the canine antibody, and/or to modify the Fc function, as discussed below.

There are four known IgG heavy chain subtypes of dog IgG and they are referred to as IgG-A, IgG-B, IgG-C, and IgG-D. The two known light chain subtypes are referred to as lambda and kappa.

Besides binding and activating of canine immune cells, a canine or caninized antibody against CTLA-4 also can be designed to have two additional attributes:

1. Lack of effector functions such as antibody-dependent cytotoxicity (ADCC) and complement-dependent cytotoxicity (CDC), and
2. be readily purified on a large scale using industry standard technologies such as that based on protein A chromatography.

None of the naturally occurring canine IgG isotypes satisfy both criteria. For example, IgG-B can be purified using protein A, but has a high level of ADCC activity. On the other hand, IgG-A binds weakly to protein A, but displays undesirable ADCC activity. Moreover, neither IgG-C nor IgG-D can be purified on protein A columns, although IgG-D displays no ADCC activity. (IgG-C has considerable ADCC activity). The present invention overcomes this difficulty by providing mutant canine IgG-B antibodies specific to CTLA-4 [see, U.S. Pat. No. 10,106,607 B2, hereby incorporated by reference in its entirety]. These antibodies both lack effector functions such as ADCC and can be easily purified using industry standard protein A chromatography.

As used herein, the term "caninized antibody" refers to an antibody that comprises the three heavy chain CDRs and the three light chain CDRS from a non-canine source, e.g., an anti-human CTLA-4 antibody together with a canine frame or a modified canine frame. A modified canine frame comprises one or more amino acids changes. In certain embodiments, a modified canine frame further optimizes the effectiveness of the caninized antibody, e.g., to increase its binding to canine CTLA-4 and/or its ability to block the binding of canine CTLA-4 to canine CD80 and/or CD86.

"Homology" refers to sequence similarity between two polynucleotide sequences or between two polypeptide sequences when they are optimally aligned. When a position in both of the two compared sequences is occupied by the same base or amino acid monomer subunit, e.g., if a position in each of two DNA molecules is occupied by adenine, then the molecules are homologous at that position. The percent of homology is the number of homologous positions shared by the two sequences divided by the total number of positions compared ×100. For example, if 6 of 10 of the positions in two sequences are matched or homologous when the sequences are optimally aligned then the two sequences are 60% homologous. Generally, the comparison is made when two sequences are aligned to give maximum percent homology.

As used herein one amino acid sequence is 100% "identical" or has 100% "identity" to a second amino acid sequence when the amino acid residues of both sequences are identical. Accordingly, an amino acid sequence is 50% "identical" to a second amino acid sequence when 50% of the amino acid residues of the two amino acid sequences are identical. The sequence comparison is performed over a contiguous block of amino acid residues comprised by a given protein, e.g., a protein, or a portion of the polypeptide being compared. In a particular embodiment, selected deletions or insertions that could otherwise alter the correspondence between the two amino acid sequences are taken into account.

An "isolated nucleic acid molecule" means a DNA or RNA of genomic, mRNA, cDNA, or synthetic origin or some combination thereof which is not associated with all or a portion of a polynucleotide in which the isolated polynucleotide is found in nature, or is linked to a polynucleotide to which it is not linked in nature. For purposes of this disclosure, it should be understood that "a nucleic acid molecule comprising" a particular nucleotide sequence does not encompass intact chromosomes. Isolated nucleic acid molecules "comprising" specified nucleic acid sequences may include, in addition to the specified sequences, coding sequences for up to ten or even up to twenty or more other proteins or portions or fragments thereof, or may include operably linked regulatory sequences that control expression of the coding region of the recited nucleic acid sequences, and/or may include vector sequences.

The phrase "control sequences" refers to DNA sequences necessary for the expression of an operably linked coding sequence in a particular host organism. The control sequences that are suitable for prokaryotes, for example, include a promoter, optionally an operator sequence, and a ribosome binding site. Eukaryotic cells are known to use promoters, polyadenylation signals, and enhancers.

A nucleic acid is "operably linked" when it is placed into a functional relationship with another nucleic acid sequence. For example, DNA for a presequence or secretory leader is operably linked to DNA for a polypeptide if it is expressed as a preprotein that participates in the secretion of the polypeptide; a promoter or enhancer is operably linked to a coding sequence if it affects the transcription of the sequence; or a ribosome binding site is operably linked to a coding sequence if it is positioned so as to facilitate translation. Generally, "operably linked" means that the DNA sequences being linked are contiguous, and, in the case of a secretory leader, contiguous and in reading phase. However, enhancers do not have to be contiguous. Linking is accomplished by ligation at convenient restriction sites. If such sites do not exist, the synthetic oligonucleotide adaptors or linkers are used in accordance with conventional practice. It should also be readily understood that when a nucleic acid sequence is provided herein, it may include a stop codon. However, as stop codons are interchangeable the inclusion of a specific stop codon in a sequence should not be viewed as a necessary portion of that sequence.

As used herein, the expressions "cell," "cell line," and "cell culture" are used interchangeably and all such designations include progeny. Thus, the words "transformants" and "transformed cells" include the primary subject cell and cultures derived therefrom without regard for the number of transfers. It is also understood that not all progeny will have precisely identical DNA content, due to deliberate or inadvertent mutations. Mutant progeny that have the same function or biological activity as screened for in the originally transformed cell are included. Where distinct designations are intended, it will be clear from the context.

As used herein, "germline sequence" refers to a sequence of unrearranged immunoglobulin DNA sequences. Any suitable source of unrearranged immunoglobulin sequences may be used. Human germline sequences may be obtained, for example, from JOINSOLVER® germline databases on the website for the National Institute of Arthritis and Musculoskeletal and Skin Diseases of the United States National Institutes of Health. Mouse germline sequences may be obtained, for example, as described in Giudicelli et al. [*Nucleic Acids Res.* 33: D256-D261 (2005)].

Properties of the Exemplary Caninized Anti-human CTLA-4 Antibodies

The present invention provides isolated caninized anti-human CTLA-4 antibodies and methods of use of the antibodies or antigen binding fragments thereof in the treatment of disease e.g., the treatment of cancer in canines. Examples of caninized anti-human CTLA-4 antibodies that bind canine CTLA-4 include, but are not limited to: antibodies that comprise canine IgG-A, IgG-B, IgG-C, and IgG-D heavy chains and/or canine kappa light chains together with anti-human CTLA-4 CDRs. Accordingly, the present invention provides isolated caninized anti-human CTLA-4 antibodies or antigen binding fragments thereof that bind to canine CTLA-4 and block the binding of canine CTLA-4 to canine CD80 and/or CD86.

"Conservatively modified variants" or "conservative substitution" refers to substitutions of amino acids in a protein with other amino acids having similar characteristics (e.g. charge, side-chain size, hydrophobicity/hydrophilicity, backbone conformation and rigidity, etc.), such that the changes frequently can be made without altering the biological activity of the protein. Those of skill in this art recognize that, in general, single amino acid substitutions in non-essential regions of a polypeptide do not substantially alter biological activity [see, e.g., Watson et al., *Molecular Biology of the Gene*, The Benjamin/Cummings Pub. Co., p. 224 (4th Ed.; 1987)]. In addition, substitutions of structurally or functionally similar amino acids are less likely to disrupt biological activity. Various embodiments of the antibody or antigen binding fragment of the present invention comprise polypeptide chains with the sequences disclosed herein, e.g., SEQ ID NOs: 34, 36, 38, 40, 42, 44, 60, 62, 64, or 66, or polypeptide chains comprising up to 1, 2, 3, 4, 5, 6, 7, 8, 9, 10, 12, 15, 20 or more conservative amino acid substitutions in regions other than that of the CDRs. Exemplary conservative substitutions are set forth in Table A.

TABLE A

Exemplary Conservative Amino Acid Substitutions

| Original residue | Conservative substitution |
| --- | --- |
| Ala (A) | Gly; Ser |
| Arg (R) | Lys; His |
| Asn (N) | Gln; His |
| Asp (D) | Glu; Asn |
| Cys (C) | Ser; Ala |
| Gln (Q) | Asn |
| Glu (E) | Asp; Gln |
| Gly (G) | Ala |
| His (H) | Asn; Gln |
| Ile (I) | Leu; Val |
| Leu (L) | Ile; Val |
| Lys (K) | Arg; His |
| Met (M) | Leu; Ile; Tyr |
| Phe (F) | Tyr; Met; Leu |
| Pro (P) | Ala |
| Ser (S) | Thr |
| Thr (T) | Ser |
| Trp (W) | Tyr; Phe |
| Tyr (Y) | Trp; Phe |
| Val (V) | Ile; Leu |

Function-conservative variants of the antibodies of the invention are also contemplated by the present invention. "Function-conservative variants," as used herein, refers to antibodies or fragments in which one or more amino acid residues have been changed without altering a desired property, such an antigen affinity and/or specificity. Such variants include, but are not limited to, replacement of an amino acid with one having similar properties, such as the conservative amino acid substitutions of Table A.

Nucleic Acids

The present invention further comprises the nucleic acids encoding the immunoglobulin chains of caninized anti-human CTLA-4 antibodies and antigen binding fragments thereof disclosed herein. For example, the present invention includes all of the novel nucleic acids listed in the Tables below.

Also included in the present invention are nucleic acids that encode immunoglobulin polypeptides comprising amino acid sequences of the canine frame that are at least about 70% identical, preferably at least about 80% identical, more preferably at least about 90% identical and most preferably at least about 95% identical (e.g., 95%, 96%, 97%, 98%, 99%, 100%) to the amino acid sequences of the canine frame of the antibodies provided herein when the comparison is performed by a BLAST algorithm wherein the parameters of the algorithm are selected to give the largest match between the respective sequences over the entire length of the respective reference sequences. The present invention further provides nucleic acids that encode the canine frame of immunoglobulin polypeptides comprising amino acid sequences that are at least about 70% similar, preferably at least about 80% similar, more preferably at least about 90% similar and most preferably at least about 95% similar (e.g., 95%, 96%, 97%, 98%, 99%, 100%) to any of the reference amino acid sequences when the comparison is performed with a BLAST algorithm, wherein the parameters of the algorithm are selected to give the largest match between the respective sequences over the entire length of the respective reference sequences, are also included in the present invention.

Sequence identity refers to the degree to which the amino acids of two polypeptides are the same at equivalent positions when the two sequences are optimally aligned. Sequence similarity includes identical residues and nonidentical, biochemically related amino acids. Biochemically related amino acids that share similar properties and may be interchangeable are discussed above.

The following references relate to BLAST algorithms often used for sequence analysis: BLAST ALGORITHMS: Altschul, S. F., et al., *J. Ma Biol.* 215:403-410 (1990); Gish, W., et al., *Nature Genet.* 3:266-272 (1993); Madden, T. L., et al., *Meth. Enzymol.* 266:131-141(1996); Altschul, S. F., et al., *Nucleic Acids Res.* 25:3389-3402 (1997); Zhang, J., et al., *Genome Res.* 7:649-656 (1997); Wootton, J. C., et al., *Comput. Chem.* 17:149-163 (1993); Hancock, J. M. et al., *Comput. Appl. Biosci.* 10:67-70 (1994); ALIGNMENT SCORING SYSTEMS: Dayhoff, M. O., et al., "A model of evolutionary change in proteins." in *Atlas of Protein Sequence and Structure*, vol. 5, suppl. 3. M. O. Dayhoff (ed.), pp. 345-352, (1978); *Natl. Biomed. Res. Found.*, Washington, DC; Schwartz, R. M., et al., "Matrices for detecting distant relationships." in Atlas of Protein Sequence and Structure, vol. 5, suppl. 3." (1978), M. O. Dayhoff (ed.), pp. 353-358 (1978), *Natl. Biomed. Res. Found.*, Washington, DC; Altschul, S. F., *J. Mol. Biol.* 219:555-565 (1991); States, D. J., et al., *Methods* 3:66-70(1991); Henikoff, S., et al., *Proc. Natl. Acad. Sci. USA* 89:10915-10919 (1992); Altschul, S. F., et al., *J. Mol. Evol.* 36:290-300 (1993); ALIGNMENT STATISTICS: Karlin, S., et al., *Proc. Natl. Acad. Sci. USA* 87:2264-2268 (1990); Karlin, S., et al., *Proc. Natl. Acad. Sci. USA* 90:5873-5877 (1993); Dembo, A., et al., *Ann. Prob.* 22:2022-2039 (1994); and Altschul, S. F. "Evaluating the statistical significance of multiple distinct local alignments." in *Theoretical and Computational Methods in Genome Research* (S. Suhai, ed.), pp. 1-14, Plenum, New York (1997).

This present invention also provides expression vectors comprising the isolated nucleic acids of the invention, wherein the nucleic acid is operably linked to control sequences that are recognized by a host cell when the host cell is transfected with the vector. Also provided are host cells comprising an expression vector of the present invention and methods for producing the antibody or antigen binding fragment thereof disclosed herein comprising culturing a host cell harboring an expression vector encoding the antibody or antigen binding fragment in culture medium, and isolating the antigen or antigen binding fragment thereof from the host cell or culture medium.

Epitope Binding and Binding Affinity

The present invention further provides antibodies or antigen binding fragments thereof that bind to the same epitope on canine CTLA-4 as the caninized anti-human CTLA-4 antibody comprising the amino acid sequence of SEQ ID NO: 36 and/or of SEQ ID NO: 46. The caninized anti-human CTLA-4 antibodies or antigen binding fragments thereof are capable of inhibiting the binding of canine CTLA-4 to canine CD80 and/or CD86.

The caninized anti-human CTLA-4 antibody can be recombinantly produced as described below in the examples. Mammalian cell lines available as hosts for expression of the antibodies or fragments disclosed herein are well known in the art and include many immortalized cell lines available from the American Type Culture Collection (ATCC). These include, inter alia, Chinese hamster ovary (CHO) cells, NSO, SP2 cells, HeLa cells, baby hamster kidney (BHK) cells, monkey kidney cells (COS), human hepatocellular carcinoma cells (e.g., Hep G2), A549 cells, 3T3 cells, HEK-293 cells and a number of other cell lines. Mammalian host cells include human, mouse, rat, dog, monkey, pig, goat, bovine, horse and hamster cells. Cell lines of particular preference are selected through determining which cell lines have high expression levels. Other cell lines that may be used are insect cell lines, such as Sf9 cells, amphibian cells, bacterial cells, plant cells and fungal cells. When recombinant expression vectors encoding the heavy chain or antigen-binding portion or fragment thereof, the light chain and/or antigen-binding fragment thereof are introduced into mammalian host cells, the antibodies are produced by culturing the host cells for a period of time sufficient to allow for expression of the antibody in the host cells or, more preferably, secretion of the antibody into the culture medium in which the host cells are grown.

Antibodies can be recovered from the culture medium using standard protein purification methods. Further, expression of antibodies of the invention (or other moieties therefrom) from production cell lines can be enhanced using a number of known techniques. For example, the glutamine synthetase gene expression system (the GS system) is a common approach for enhancing expression under certain conditions. The GS system is discussed in whole or part in connection with European Patent Nos. 0 216 846, 0 256 055, and 0 323 997 and European Patent Application No. 89303964.4.

In general, glycoproteins produced in a particular cell line or transgenic animal will have a glycosylation pattern that is characteristic for glycoproteins produced in the cell line or transgenic animal. Therefore, the particular glycosylation pattern of an antibody will depend on the particular cell line or transgenic animal used to produce the antibody. However, all antibodies encoded by the nucleic acid molecules provided herein, or comprising the amino acid sequences provided herein, comprise the instant invention, independent of the glycosylation pattern that the antibodies may have. Similarly, in particular embodiments, antibodies with a glycosylation pattern comprising only non-fucosylated N-glycans may be advantageous, because these antibodies have been shown to typically exhibit more potent efficacy than their fucosylated counterparts both in vitro and in vivo [See for example, Shinkawa et al., *J. Biol. Chem.* 278: 3466-3473 (2003); U.S. Pat. Nos. 6,946,292 and 7,214,775].

The present invention further includes antibody fragments of the caninized anti-human CTLA-4 antibodies disclosed herein. The antibody fragments include F(ab)$_2$ fragments, which may be produced by enzymatic cleavage of an IgG by, for example, pepsin. Fab fragments may be produced by, for example, reduction of F(ab)$_2$ with dithiothreitol or mercaptoethylamine. A Fab fragment is a $V_L$-$C_L$ chain appended to a $V_H$-$C_{H1}$ chain by a disulfide bridge. A F(ab)$_2$ fragment is two Fab fragments which, in turn, are appended by two disulfide bridges. The Fab portion of an F(ab)$_2$ molecule includes a portion of the $F_c$ region between which disulfide bridges are located. An Fv fragment is a $V_L$ or $V_H$ region.

In one embodiment, the antibody or antigen binding fragment comprises a heavy chain constant region, e.g., a canine constant region, such as IgG-A, IgG-B, IgG-C and IgG-D canine heavy chain constant region or a variant thereof. In another embodiment, the antibody or antigen binding fragment comprises a light chain constant region, e.g., a canine light chain constant region, such as lambda or kappa canine light chain region or variant thereof. By way of example, and not limitation the canine heavy chain constant region can be from IgG-B [e.g., a modified IgG-B, see, U.S. Pat. No. 10,106,607 B2, the contents of which is hereby incorporated by reference in its entirety], and the canine light chain constant region can be from kappa.

Antibody Engineering

The caninized anti-human CTLA-4 antibodies of the present invention have been engineered to include modifications to the canine frame including framework residues within the variable domains of a parental (i.e., canine) monoclonal antibody, e.g. to improve the properties of the antibody.

Experimental and Diagnostic Uses

Caninized anti-human CTLA-4 antibodies or antigen-binding fragments thereof of the present invention may also be useful in diagnostic assays for canine CTLA-4 protein, e.g., detecting its expression in specific tumor cells, tissues, or serum. Such diagnostic methods may be useful in various disease diagnoses, particularly certain cancers in canines.

For example, such a method comprises the following steps:
(a) coat a substrate (e.g., surface of a microtiter plate well, e.g., a plastic plate) with caninized anti-human CTLA-4 antibody or an antigen-binding fragment thereof;
(b) apply a sample to be tested for the presence of canine CTLA-4 to the substrate;
(c) wash the plate, so that unbound material in the sample is removed;
(d) apply detectably labeled antibodies (e.g., enzyme-linked antibodies) which are also specific to the CTLA-4 antigen;
(e) wash the substrate, so that the unbound, labeled antibodies are removed;
(f) if the labeled antibodies are enzyme linked, apply a chemical which is converted by the enzyme into a fluorescent signal; and
(g) detect the presence of the labeled antibody.

In a further embodiment, the labeled antibody is labeled with peroxidase which react with ABTS [e.g., 2,2'-azino-bis (3-ethylbenzthiazoline-6-sulphonic acid)] or 3,3',5,5'-Tetramethylbenzidine to produce a color change which is detectable. Alternatively, the labeled antibody is labeled with a detectable radioisotope (e.g., $^3$H) which can be detected by scintillation counter in the presence of a scintillant. Caninized anti-human CTLA-4 antibodies of the invention may be used in a Western blot or immunoprotein blot procedure.

Such a procedure forms part of the present invention and includes for example:
(i) contacting a membrane or other solid substrate to be tested for the presence of bound canine CTLA-4 or a fragment thereof with a caninized anti-human CTLA-4 antibody or antigen-binding fragment thereof of the present invention. Such a membrane may take the form of a nitrocellulose or vinyl-based [e.g., polyvinylidene fluoride (PVDF)] membrane to which the proteins to be tested for the presence of canine CTLA-4 in a non-denaturing PAGE (polyacrylamide gel electrophoresis) gel or SDS-PAGE (sodium dodecyl sulfate polyacrylamide gel electrophoresis) gel have been transferred (e.g., following electrophoretic separation in the gel). Before contact of membrane with the caninized anti-human CTLA-4 antibody or antigen-binding fragment thereof, the membrane is optionally blocked, e.g., with non-fat dry milk or the like so as to bind non-specific protein binding sites on the membrane.
(ii) washing the membrane one or more times to remove unbound caninized anti-human CTLA-4 antibody or an antigen-binding fragment thereof and other unbound substances; and
(iii) detecting the bound caninized anti-human CTLA-4 antibody or antigen-binding fragment thereof.

Detection of the bound antibody or antigen-binding fragment may be by binding the antibody or antigen-binding fragment with a secondary antibody (an anti-immunoglobulin antibody) which is detectably labeled and, then, detecting the presence of the secondary antibody.

The caninized anti-human CTLA-4 antibodies and antigen-binding fragments thereof disclosed herein may also be used for immunohistochemistry. Such a method forms part of the present invention and comprises, e.g., (1) contacting a cell to be tested for the presence of canine CTLA-4 with a caninized anti-human CTLA-4 antibody or antigen-binding fragment thereof of the present invention; and (2) detecting the antibody or fragment on or in the cell.

If the antibody or antigen-binding fragment itself is detectably labeled, it can be detected directly. Alternatively, the antibody or antigen-binding fragment may be bound by a detectably labeled secondary antibody which is detected.

Certain caninized anti-human CTLA-4 antibodies and antigen-binding fragments thereof disclosed herein may also be used for in vivo tumor imaging. Such a method may include injection of a radiolabeled caninized anti-human CTLA-4 antibodies or antigen-binding fragment thereof into the body of a canine to be tested for the presence of a tumor associated with canine CTLA-4 expression followed by nuclear imaging of the body of the patient to detect the presence of the labeled antibody or antigen-binding fragment e.g., at loci comprising a high concentration of the antibody or antigen-binding fragment which are bound to the tumor.

Imaging techniques include SPECT imaging (single photon emission computed tomography) or PET imaging (positron emission tomography). Labels include e.g., iodine-123 ($^{123}$I) and technetium-99m ($^{99m}$Tc), e.g., in conjunction with SPECT imaging or $^{11}$C, $^{13}$N, $^{15}$O or $^{18}$F, e.g., in conjunction with PET imaging or Indium-111 [See e.g., Gordon et al., *International Rev. Neurobiol.* 67:385-440 (2005)].

Pharmaceutical Compositions and Administration

To prepare pharmaceutical or sterile compositions of the caninized anti-human CTLA-4 antibody or antigen binding fragment thereof is admixed with a pharmaceutically acceptable carrier or excipient. [See, e.g., *Remington's Pharmaceutical Sciences* and *U.S. Pharmacopeia: National Formulary*, Mack Publishing Company, Easton, PA (1984)].

Formulations of therapeutic and diagnostic agents may be prepared by mixing with acceptable carriers, excipients, or stabilizers in the form of, e.g., lyophilized powders, slurries, aqueous solutions or suspensions [see, e.g., Hardman, et al. (2001) *Goodman and Gilman's The Pharmacological Basis of Therapeutics*, McGraw-Hill, New York, NY; Gennaro (2000) *Remington: The Science and Practice of Pharmacy*, Lippincott, Williams, and Wilkins, New York, NY; Avis, et al. (eds.) (1993) *Pharmaceutical Dosage Forms: Parenteral Medications*, Marcel Dekker, N.Y.; Lieberman, et al. (eds.) (1990) *Pharmaceutical Dosage Forms: Tablets*, Marcel Dekker, N.Y.; Lieberman, et al. (eds.) (1990) *Pharmaceutical Dosage Forms: Disperse Systems*, Marcel Dekker, N.Y.; Weiner and Kotkoskie (2000) *Excipient Toxicity and Safety*, Marcel Dekker, Inc., New York, NY]. In one embodiment, anti-CTLA-4 antibodies of the present invention are diluted to an appropriate concentration in a sodium acetate solution pH 5-6, and NaCl or sucrose is added for tonicity. Additional agents, such as polysorbate 20 or polysorbate 80, may be added to enhance stability.

Toxicity and therapeutic efficacy of the antibody compositions, administered alone or in combination with another agent, can be determined by standard pharmaceutical procedures in cell cultures or experimental animals, e.g., for determining the $LD_{50}$ (the dose lethal to 50% of the population) and the $ED_{50}$ (the dose therapeutically effective in 50% of the population). The dose ratio between toxic and therapeutic effects is the therapeutic index ($LD_{50}/ED_{50}$). In particular aspects, antibodies exhibiting high therapeutic indices are desirable. The data obtained from these cell culture assays and animal studies can be used in formulating a range of dosage for use in canines. The dosage of such compounds lies preferably within a range of circulating concentrations that include the $ED_{50}$ with little or no toxicity. The dosage may vary within this range depending upon the dosage form employed and the route of administration.

The mode of administration can vary. Suitable routes of administration include oral, rectal, transmucosal, intestinal, parenteral; intramuscular, subcutaneous, intradermal, intramedullary, intrathecal, direct intraventricular, intravenous, intraperitoneal, intranasal, intraocular, inhalation, insufflation, topical, cutaneous, transdermal, or intra-arterial.

In particular embodiments, the caninized anti-human CTLA-4 antibody or antigen binding fragment thereof can be administered by an invasive route such as by injection. In further embodiments of the invention, a caninized anti-human CTLA-4 antibody or antigen binding fragment thereof, or pharmaceutical composition thereof, is administered intravenously, subcutaneously, intramuscularly, intraarterially, intratumorally, or by inhalation, aerosol delivery. Administration by non-invasive routes (e.g., orally; for example, in a pill, capsule or tablet) is also within the scope of the present invention.

Compositions can be administered with medical devices known in the art. For example, a pharmaceutical composition of the invention can be administered by injection with a hypodermic needle, including, e.g., a prefilled syringe or autoinjector. The pharmaceutical compositions disclosed herein may also be administered with a needleless hypodermic injection device; such as the devices disclosed in U.S. Pat. Nos. 6,620,135; 6,096,002; 5,399,163; 5,383,851; 5,312,335; 5,064,413; 4,941,880; 4,790,824 or 4,596,556.

The pharmaceutical compositions disclosed herein may also be administered by infusion. Examples of well-known implants and modules form administering pharmaceutical compositions include: U.S. Pat. No. 4,487,603, which discloses an implantable micro-infusion pump for dispensing medication at a controlled rate; U.S. Pat. No. 4,447,233, which discloses a medication infusion pump for delivering medication at a precise infusion rate; U.S. Pat. No. 4,447,224, which discloses a variable flow implantable infusion apparatus for continuous drug delivery; U.S. Pat. No. 4,439,196, which discloses an osmotic drug delivery system having multi-chamber compartments. Many other such implants, delivery systems, and modules are well known to those skilled in the art.

Alternately, one may administer the caninized anti-human CTLA-4 antibody in a local rather than systemic manner, for example, via injection of the antibody directly into an arthritic joint or pathogen-induced lesion characterized by immunopathology, often in a depot or sustained release formulation. Furthermore, one may administer the caninized anti-human CTLA-4 antibody in a targeted drug delivery system, for example, in a liposome coated with a tissue-specific antibody, targeting, for example, arthritic joint or pathogen-induced lesion characterized by immunopathology. The liposomes will be targeted to and taken up selectively by the afflicted tissue.

The administration regimen depends on several factors, including the serum or tissue turnover rate of the therapeutic antibody, the level of symptoms, the immunogenicity of the therapeutic antibody, and the accessibility of the target cells in the biological matrix. Preferably, the administration regimen delivers sufficient therapeutic antibody to effect improvement in the target disease state, while simultaneously minimizing undesired side effects. Accordingly, the amount of biologic delivered depends in part on the particular therapeutic antibody and the severity of the condition being treated. Guidance in selecting appropriate doses of therapeutic antibodies is available [see, e.g., Wawrzynczak *Antibody Therapy*, Bios Scientific Pub. Ltd, Oxfordshire, UK (1996); Kresina (ed.) *Monoclonal Antibodies, Cytokines and Arthritis*, Marcel Dekker, New York, NY (1991); Bach (ed.) *Monoclonal Antibodies and Peptide Therapy in Autoimmune Diseases*, Marcel Dekker, New York, NY (1993); Baert, et al. *New Engl. J. Med.* 348:601-608 (2003); Milgrom et al. *New Engl. J. Med.* 341:1966-1973 (1999); Slamon et al. *New Engl. J. Med.* 344:783-792 (2001); Beniaminovitz et al. *New Engl. J. Med.* 342:613-619 (2000); Ghosh et al. *New Engl. J. Med.* 348:24-32 (2003); Lipsky et al. *New Engl. J. Med.* 343:1594-1602 (2000)].

Determination of the appropriate dose is made by the veterinarian, e.g., using parameters or factors known or suspected in the art to affect treatment. Generally, the dose begins with an amount somewhat less than the optimum dose and it is increased by small increments thereafter until the desired or optimum effect is achieved relative to any negative side effects. Important diagnostic measures include those of symptoms of, e.g., the inflammation or level of inflammatory cytokines produced.

Antibodies or antigen binding fragments thereof disclosed herein may be provided by continuous infusion, or by doses administered, e.g., daily, 1-7 times per week, weekly, biweekly, monthly, bimonthly, quarterly, semiannually, annually etc. Doses may be provided, e.g., intravenously, subcutaneously, topically, orally, nasally, rectally, intramuscular, intracerebrally, intraspinally, or by inhalation. A total weekly dose is generally at least 0.05 μg/kg body weight, more generally at least 0.2 μg/kg, 0.5 μg/kg, 1 μg/kg, 10 µg/kg, 100 µg/kg, 0.25 mg/kg, 1.0 mg/kg, 2.0 mg/kg, 5.0 mg/ml, 10 mg/kg, 25 mg/kg, 50 mg/kg or more [see, e.g., Yang, et al. *New Engl. J. Med.* 349:427-434 (2003); Herold, et al. *New Engl. J. Med.* 346:1692-1698 (2002); Liu, et al. *J. Neural. Neurosurg. Psych.* 67:451-456 (1999); Portielji, et al. *Cancer Immunol. Immunother.* 52:133-144 (2003)]. Doses may also be provided to achieve a pre-determined target concentration of the caninized anti-human CTLA-4 antibody in the subject's serum, such as 0.1, 0.3, 1, 3, 10, 30, 100, 300 µg/ml or more. In other embodiments, a caninized anti-human CTLA-4 antibody of the present invention is administered subcutaneously or intravenously, on a weekly, biweekly, "every 4 weeks," monthly, bimonthly, or quarterly basis at 10, 20, 50, 80, 100, 200, 500, 1000 or 2500 mg/subject.

As used herein, "inhibit" or "treat" or "treatment" includes a postponement of development of the symptoms associated with a disorder and/or a reduction in the severity of the symptoms of such disorder. The terms further include ameliorating existing uncontrolled or unwanted symptoms, preventing additional symptoms, and ameliorating or preventing the underlying causes of such symptoms. Thus, the terms denote that a beneficial result has been conferred on a vertebrate subject with a disorder, disease or symptom, or with the potential to develop such a disorder, disease or symptom.

As used herein, the terms "therapeutically effective amount", "therapeutically effective dose" and "effective amount" refer to an amount of the caninized anti-human CTLA-4 antibody or antigen binding fragment thereof of the present invention that, when administered alone or in combination with an additional therapeutic agent to a cell, tissue, or subject, is effective to cause a measurable improvement in one or more symptoms of a disease or condition or the progression of such disease or condition. A therapeutically effective dose further refers to that amount of the binding compound sufficient to result in at least partial amelioration of symptoms, e.g., treatment, healing, prevention or amelioration of the relevant medical condition, or an increase in rate of treatment, healing, prevention or amelioration of such conditions. When applied to an individual active ingredient administered alone, a therapeutically effective dose refers to that ingredient alone. When applied to a combination, a therapeutically effective dose refers to combined amounts of the active ingredients that result in the therapeutic effect, whether administered in combination, serially or simultaneously. An effective amount of a therapeutic will result in an improvement of a diagnostic measure or parameter by at least 10%; usually by at least 20%; preferably at least about 30%; more preferably at least 40%, and most preferably by at least 50%. An effective amount can also result in an improvement in a subjective measure in cases where subjective measures are used to assess disease severity.

Other Combination Therapies

As previously described, the caninized anti-human CTLA-4 antibody or antigen binding fragment thereof may be co-administered with one or other more therapeutic agents (such as a chemotherapeutic agent). The antibody may be linked to the agent (as an immunocomplex) or can be administered separately from the agent. In the latter case (separate administration), the antibody can be administered before, after or concurrently with the agent or can be co-administered with other known therapies.

Kits

Further provided are kits comprising one or more components that include, but are not limited to, an antibody or antigen binding fragment, as discussed herein, which specifically binds CTLA-4 (e.g., a caninized anti-human CTLA-4 antibody or antigen binding fragment thereof of the present invention) in association with one or more additional components including, but not limited to a pharmaceutically acceptable carrier and/or a chemotherapeutic agent, as discussed herein. The binding composition and/or the chemotherapeutic agent can be formulated as a pure composition or in combination with a pharmaceutically acceptable carrier, in a pharmaceutical composition.

In one embodiment, the kit includes a binding composition of the invention, e.g., the caninized anti-human CTLA-4 antibody comprising the amino acid sequence of SEQ ID NO: 36 and SEQ ID NO: 46, or a pharmaceutical composition thereof in one container (e.g., in a sterile glass or plastic vial) and a pharmaceutical composition thereof and/or a chemotherapeutic agent in another container (e.g., in a sterile glass or plastic vial).

In another embodiment, the kit comprises a combination of the invention, including a binding composition component (e.g., the caninized anti-human CTLA-4 antibody comprising the amino acid sequence of SEQ ID NO: 36 and of SEQ ID NO: 46) along with a pharmaceutically acceptable carrier, optionally in combination with one or more therapeutic agent component formulated together, optionally, in a pharmaceutical composition, in a single, common container.

If the kit includes a pharmaceutical composition for parenteral administration to a subject, the kit can include a device for performing such administration. For example, the kit can include one or more hypodermic needles or other injection devices as discussed above. The kit can also include a package insert including information concerning the pharmaceutical compositions and dosage forms in the kit. Generally, such information aids pet owners and veterinarians in using the enclosed pharmaceutical compositions and dosage forms effectively and safely. For example, the following information regarding a combination of the invention may be supplied in the insert: pharmacokinetics, pharmacodynamics, clinical studies, efficacy parameters, indications and usage, contraindications, warnings, precautions, adverse reactions, overdosage, proper dosage and administration, how supplied, proper storage conditions, references, manufacturer/distributor information and patent information.

As a matter of convenience, an antibody or specific binding agent disclosed herein can be provided in a kit, i.e., a packaged combination of reagents in predetermined amounts with instructions for performing the diagnostic or detection assay. Where the antibody is labeled with an enzyme, the kit will include substrates and cofactors required by the enzyme (e.g., a substrate precursor which provides the detectable chromophore or fluorophore). In addition, other additives may be included such as stabilizers, buffers (e.g., a block buffer or lysis buffer) and the like. The relative amounts of the various reagents may be varied widely to provide for concentrations in solution of the reagents which substantially optimize the sensitivity of the assay. Particularly, the reagents may be provided as dry powders, usually lyophilized, including excipients which on dissolution will provide a reagent solution having the appropriate concentration.

EXAMPLES

Example 1

Construction of Anti-CTLA-4 Chimeric Antibodies

It was considered possible that a prior art monoclonal antibody raised against human CTLA-4 that had been found to both bind human CTLA-4 and block the binding of human CTLA-4 with human CD86 also might bind canine CTLA-4 and conceivably block the binding of canine CTLA-4 with canine CD86. In order to test this possibility, a known nucleotide sequence that corresponds to the heavy chain variable region of an anti-human CTLA-4 monoclonal antibody, 3B10 (as disclosed in WO2012120125) was fused to the nucleotide sequence of a modified canine constant heavy chain (CH1-Hinge-CH2-3) to produce a chimeric mouse-canine heavy chain nucleotide sequence designated as SEQ ID NO: 1. A second known nucleotide sequence encoding the amino acid sequence that corresponds to the light chain variable region of anti-human CTLA-4 monoclonal antibody was fused to the nucleotide sequence of the canine constant kappa light chain domain to produce a chimeric mouse-canine light chain nucleotide sequence designated as SEQ ID NO: 3. The protein encoded by the chimeric mouse-canine heavy chain nucleotide sequence comprises the amino acid sequence of SEQ ID NO: 2, and the protein encoded by the chimeric mouse-canine light chain nucleotide sequence comprises the amino acid sequence of SEQ ID NO: 4. The chimeric human-canine heavy and light chains were cloned into separate expression plasmids using standard molecular biology techniques. Plasmids containing heavy and light chain genes were transfected into HEK 293 cells and the expressed antibody was purified from HEK 293 cell supernatant using protein A.

Similarly, chimeric antibody 8H5 containing variable domains previously disclosed in WO2012120125 also was constructed as exemplified by antibody formed by the combination of heavy and light chains with the DNA and amino acid sequences listed as SEQ ID NOs: 5 to 8, respectively. In addition, chimeric antibodies 411, 418, and 611 containing variable domains disclosed in WO2000037504 were constructed as exemplified by antibodies formed by the combination of heavy and light chains with the nucleic acid and amino acid sequences listed as SEQ ID NOs: 9-20, respectively. Chimeric antibodies 10D1 and 1E2 containing variable domains disclosed in U.S. Pat. No. 8,017,114 B2 also were constructed as exemplified by antibodies formed by the combination of heavy and light chains with the nucleotide and amino acid sequences listed as SEQ ID NOs: 21-28, respectively. In addition, chimeric antibody 3B3 containing variable domains disclosed as in WO2010097597 was constructed as exemplified by the antibody formed by the combination of heavy and light chains with the nucleotide and amino acid sequences listed as SEQ ID NOs: 29-32, respectively. Amino acid sequence identification numbers for the chimeric antibodies are provided in Table 1 below.

TABLE 1

AMINO ACID SEQUENCES FOR CHIMERIC ANTIBODIES

| Chimera | | Heavy chain SEQ ID NO: | Light Chain SEQ ID NO: |
|---|---|---|---|
| 3B10 | Mouse-Canine | 2 | 4 |
| 8H5 | Mouse-Canine | 6 | 8 |
| 411 | Human-Canine | 10 | 12 |
| 418 | Human-Canine | 14 | 16 |
| 611 | Human-Canine | 18 | 20 |
| 10D1 | Human-Canine | 22 | 24 |
| 1E2 | Human-Canine | 26 | 28 |
| 3B3 | Mouse-Canine | 30 | 32 |

Example 2

Reactivity of the Anti-CTLA-4 Chimeric Antibodies

The chimeric antibodies of Example 1 were expressed in Expi293 cells [Expi293 Expression System obtained from THERMO FISHER SCIENTIFIC] and purified with a Protein A column. The chimeric antibodies were then tested for reactivity with canine CTLA-4 by ELISA as follows:

1. Coated 200 ng/well CTLA-4 in an immunoplate and incubated the plate at 4° C. overnight.
2. Washed the plate 3 times by PBS with 0.05% Tween 20 (PBST).
3. Blocked the plate by 0.5% BSA in PBS for 45-60 min at room temperature.
4. Washed the plate 3 times by PBST.
5. Diluted the antibodies three-fold in each column or row of the dilution plate.
6. Transferred the diluted antibodies into each column or row of the immunoplate, and incubated the plate for 45-60 min at room temperature.
7. Washed the plate 3 times by PBST.
8. Added 1:2000 diluted horseradish peroxidase labeled anti-dog IgG Fc into each well of the plate, and incubated the plate for 45-60 min at room temperature.
9. Washed the plate 3 times by PBST.
10. Added TMB Substrate into each well of the plate, and incubated the plate for 10 to 15 min at room temperature for color development.
11. Added 100 µL of 1.5 M phosphoric acid into each well to stop the reaction.
12. Read the plate at 450 nm using a 540 nm reference wavelength.

The results of the ELISA are depicted in FIG. 1, and indicate that the selected antibodies could bind to canine CTLA-4. Moreover, the 3B10 chimeric antibody was found to be the best binder among this group of chimeric antibodies.

Example 3

Construction of Caninized Anti-Human CTLA-4 Monoclonal Antibody 3B10

Having determined that the 3B10 chimeric antibody had the strongest binding affinity for canine CTLA-4 (see, FIG. 1), the set of 6 CDRs of this chimeric antibody were selected to be added to a canine frame. In order to execute the process of caninization, the DNA sequences that encode the heavy and light chains of canine IgG were determined [see, U.S. Pat. No. 10,106,607 B2, the contents of which is hereby incorporated by reference in its entirety]. The DNA and protein sequences of the canine heavy and light chains are known in the art and can be obtained by searching the NCBI gene and protein databases. There are four known IgG subtypes of dog IgG and they are referred to as IgG-A, IgG-B, IgG-C, and IgG-D. There are two types of light chains in canine antibodies referred to as kappa and lambda.

TABLE 2

DNA SEQUENCES OF THE PRIOR ART CDRS IN THE CANINIZED ANTIBODIES

| CDR | Nucleotide Sequence | SEQ ID NO: |
|---|---|---|
| H-1 | gattataacatggat | 47 |
| H-2 | aacattaacccgaacagcgaaagcaccagctataacca gaaatttaaaggc | 49 |
| H-3 | gatggcaaccgctatgatgcgtggtttgcgtat | 51 |
| L-1 | agcgcgagcagcagcgtgacctatatgcat | 53 |
| L-2 | agcaccagcattctggcgagc | 55 |
| L-3 | cagcagcgcaccagctatccgctgacc | 57 |

TABLE 3[1]

AMINO ACID SEQUENCES OF THE PRIOR ART CDRS IN THE CANINIZED ANTIBODIES

| CDR | Amino Acid Sequence | SEQ ID NO: |
|---|---|---|
| H-1 | DYNMD | 48 |
| H-2 | NINPNSESTSYNQKFKG | 50 |
| H-3 | DGNRYDAWFAY | 52 |
| L-1 | SASSSVTYMH | 54 |
| L-2 | STSILAS | 56 |
| L-3 | QQRTSYPLT | 58 |

[1]The CDR nucleic acid and amino acid sequences in Tables 2 and 3 were previously obtained and disclosed in WO2012120125 for a humanized anti-human CTLA-4 antibody.

Without being bound by any specific approach, the overall process of producing caninized heavy and light chains that can be mixed in different combinations to produce caninized anti-human CTLA-4 mAbs may involve the following scheme:
i) Identify the CDRs of H and L chains of the desired anti-CTLA-4 mAbs. Back translate the amino acid sequences of the CDRs into a suitable DNA sequence.
ii) Identify a suitable DNA sequence for H and L chain of canine IgG (e.g., a modified heavy chain of IgG-B as described in U.S. Pat. No. 10,106,607 B2 and light kappa chain).
iii) Identify the DNA sequences encoding the endogenous CDRs of canine IgG H and L chains DNA of the above sequence.
iv) Replace the DNA sequence encoding endogenous dog H and L chain CDRs with DNA sequences encoding the desired anti-human CTLA-4 CDRs. When the modified canine IgG B was used, modifications at D31A and N63A, as numbered in SEQ ID NO: 69, were made in the canine IgG B, as previously described in U.S. Pat. No. 10,106,607 B2, hereby incorporated in its entirety. Also, optionally replaced the DNA encoding some canine frame amino acid residues with DNA encoding selected amino acid residues from the desired anti-human CTLA-4 mAb canine regions. This process is called back mutation. Two sets of four variants for each heavy chain and one set of three variants for the light chain variable region, listed in Tables 4 and 5 were developed with each variant in the set containing different back mutation sites.
v) Synthesize the DNA from step (iv) and clone it into a suitable expression plasmid.
vi) Transfect plasmids containing desired caninized H and L chains into HEK 293 cells.
vii) Purify expressed caninized antibody from HEK 293 supernatant.
viii) Test purified caninized antibody for binding to canine CTLA-4.

A set of caninized H and L chain sequences were developed. The SEQ ID NOs: are listed in Tables 4 and 5 below.

TABLE 4

SEQ ID NOs. OF CANINIZED 3B10 HEAVY CHAIN

| Caninized Heavy Chain | Modified[2] IgG B (D31A/N63A) | SEQ ID NO: Nucleic Acid | SEQ ID NO: Amino Acid |
|---|---|---|---|
| 3B10 VH1 | No | 33 | 34 |
| 3B10 VH2 | No | 35 | 36 |
| 3B10 VH3 | No | 37 | 38 |
| 3B10 VH4 | No | 39 | 40 |
| 3B10 VH1 | Yes | 59 | 60 |
| 3B10 VH2 | Yes | 61 | 62 |
| 3B10 VH3 | Yes | 63 | 64 |
| 3B10 VH4 | Yes | 65 | 66 |

[2]As shown in SEQ ID NO: 69, below.

TABLE 5

SEQ ID NOs. OF CANINIZED 3B10 LIGHT CHAIN

| Caninized Light Chain | SEQ ID NO: Nucleic Acid | SEQ ID NO: Amino Acid |
|---|---|---|
| 3B10 VL1 | 41 | 42 |
| 3B10 VL2 | 43 | 44 |
| 3B10 VL3 | 45 | 46 |

The present invention provides the caninized antibodies formed by any combination of the caninized heavy with the light chains listed in Tables 4 and 5 above. The antibodies were next expressed in Expi293 cells and then purified. The ELISA results shown in FIG. 2 demonstrate that 3B10 had been successfully caninized, with the 3B10L3H2, 3B10L3H3, and 3B10L3H4 all possessing similar tight binding activity as the parental mouse-canine chimera antibody of 3B10.

Example 4

Blocking Activity of the Chimera and Caninized Antibodies 3B10 on Interaction of Canine CD86 and CTLA-4

To ensure that the caninized 3B10 antibodies maintain the neutralizing activity for canine CTLA-4 as the parental antibody, the caninized antibodies were tested for blocking activity on the interaction of canine-CD-80 and canine CTLA-4 by ELISA as follows:
1. Coated 200 ng/well CTLA-4 in an immunoplate and incubated the plate at 4° C. overnight.
2. Washed the plate 3 times by PBS with 0.05% Tween 20 (PBST).
3. Blocked the plate with 0.5% BSA in PBS for 45-60 min at room temperature.
4. Washed the plate 3 times by PBST.

5. Three-fold diluted the antibodies in each column or row of dilution plate, and then added 100 ng/well biotinylated CD-86 and mixed with the antibodies.
6. Transferred the diluted antibodies and CD-86 mixture into each column or row of the immunoplate, and incubated the plate for 45-60 min at room temperature.
7. Washed the plate 3 times by PBST.
8. Added 1:2000 diluted horseradish peroxidase conjugated streptavidin into each well of the plate, and incubated the plate for 45-60 min at room temperature.
9. Washed the plate 3 times with PBST.
10. Added TMB Substrate into each well of the plate, and incubated the plate for 10 to 15 mm at room temperature for color development.
11. Added 100 µL of 1.5 M phosphoric acid into each well to stop the reaction.
12. Read the plate at 450 nm using a 540 nm reference wavelength.

The plot of the results of the ELISA plates depicted in FIG. 3, indicate that the caninized 3B10 variants possess similar blocking activity as the parental 3B10.

Example 5

IFNγ Generation of Canine PBMC Activated by the Chimeric Antibodies

Introduction

Interferon-gamma (IFN-γ; also known as type II interferon) is mainly produced by activated T lymphocytes and possibly by natural killer cells. This attribute is widely applied as an indication of T-cell activation by quantitatively testing IFN-γ production on an ELISA-based assay. To identify functional antibodies to CTLA-4 (anti-CTLA-4 antibodies), selected antibodies were tested for their activity-stimulating IFN-γ production on canine peripheral blood mononuclear cells using the following the protocol.

Experimental and Results

Isolation of Canine Peripheral Blood Mononuclear Cells:
1. Collected ~20 mL of whole blood in EDTA or a sodium heparin tube.
2. Transferred the blood into a 50 mL polystyrene tube and diluted 50:50 with Hank's Balanced Salt Solution (HMS).
3. Added 15 mL of Ficoll-Plaque Plus to four ×50 mL SepMate™ Tubes. Then add ~10 mL of the 50:50 diluted blood slowly and to the side of each SepMate™ Tubes containing Ficoll.
4. Centrifuged tubes at 1200×g for 20 minutes.
5. Harvested cells from the gradient interface and transferred the cells to 50 mL polypropylene tube. Added HMS to the 40-45 mL mark and centrifuged the cells at 800×g for 10 minutes.
6. Discarded the supernatant, resuspended the cells in 40-45 mL HMS, and centrifuged the tubes again at 800×g for 10 minutes.
7. Discarded the supernatant and resuspended the cells from each tube with 2 mL of Canine Lymphocyte Media (pooled cells from same animal).
8. Took a small aliquot of the cell suspension, mixed it with 0.04% Trypan blue and counted the number of cells.
9. Stored the cell suspension at 2-7° C. until use [but no longer than 24 hours prior to use.]

Cell Proliferation Assay for Canine Peripheral Blood Mononuclear Cells:
1. Diluted the antibodies in Canine Lymphocyte Media [RPMI medium purchased from LONZA, Catalog No. 12-167Q, or equivalent] to achieve a final concentration of 40 µg/mL (prepare 160 µg/mL) and sterilized them using a 0.2 µm syringe filter. Two-fold diluted antibodies placed down a sterile dilution plate and then set them aside.
2. Diluted the cells to $2.5 \times 10^6$ cells/mL in Canine Lymphocyte Media and dispensed 100 µL per well of an entire 96-well tissue culture plate.
3. Diluted Con A in Canine Lymphocyte Media to achieve final concentration 250 ng/mL (prepared 1000 ng/mL), sterilized them using 0.2 µm syringe filter and added 50 µL to all wells. (Note—did not add Con A to one column of the eight wells for the cell-only control nor to the wells intended for cells+mAb-only controls.)
4. Added 100 µL of Canine Lymphocyte Media per well to cells-only wells and 50 µL media to column containing Con A control wells (Con A+cells without mAb treatment).
5. Added 50 µL of diluted mAbs to duplicate wells.
6. Incubated the plates at 36±2° C., 4.0-6.0% $CO_2$ in a humidified incubator for 68 to 124 hours.

IFN-Gamma ELISA:
1. Following the 68-124 hour incubation, centrifuged the plate at 800×g for 10 minutes.
2. Collected supernatant from each well and pool replicates. These samples may be frozen at ≤−50° C. for later use or tested immediately.
3. Diluted supernatant samples appropriately, if needed, and perform IFN-gamma ELISA according to the instructions of Canine IFN-gamma Quantikine™ ELISA Kit [R&D Systems Catalog No. CAIF00].

The results provided in FIG. 4 demonstrate that the chimeric antibodies tested, especially 3B10, 411, and 611, significantly activated the canine T cells to produce IFN-gamma.

Example 6

Epitope Mapping of Caninized 3B10 Antibody

The binding epitope of the caninized antibody 3B10L3H2 on canine CTLA-4 (NCBI Reference Sequence: NP 001003106; SEQ ID NO: 68) were mapped by chemical cross-linking and mass spectrometry. The results show that the antibody binds to two separate linear regions on antigen CTLA-4, including amino acids R33, R38, S42, T45, R83, T87, Y90, K93 and Y98 (see, FIG. 5). In FIG. 5, the amino acid residues for a non-contiguous epitope of CTLA-4 that the caninized antibody 3B10L3H2 binds is shown as being made up of two linear portions, amino acid residues 30 to 50 and amino acid residues 80 to 100, respectively.

SEQUENCES

SEQ ID NO: 1: Chimeric mouse - canine heavy chain DNA (3B10):
GAAGTGCAGCTGCAGCAGTTTGGCGCGGAACTGGTGAAACCGGGCGCGAGCGTGAAAATGAGCTGCAAAG

CGAGCGGCTATACCTTTACCGATTATAACATGGATTGGGTGCGCCAGAGCGGCAAAAGCCTGGAATGGAT

TGGCAACATTAACCCGAACAGCGAAAGCACCAGCTATAACCAGAAATTTAAAGGCAAAGCGACCCTGACC

GTGGATAAAAGCAGCAGCACCGCGTATATGGAACTGCGCAGCCTGACCAGCGATGATACCGCGGTGTATT

ATTGCACCCGCGATGGCAACCGCTATGATGCGTGGTTTGCGTATTGGGGCCAGGGCACCCTGGTGACCGT

GAGCAGCGCGAGCACCACCGCGCCGAGCGTGTTTCCGCTGGCGCCGAGCTGCGGCAGCACCAGCGGCAGC

ACCGTGGCGCTGGCGTGCCTGGTGAGCGGCTATTTTCCGGAACCGGTGACCGTGAGCTGGAACAGCGGCA

GCCTGACCAGCGGCGTGCATACCTTTCCGAGCGTGCTGCAGAGCAGCGGCCTGTATAGCCTGAGCAGCAT

GGTGACCGTGCCGAGCAGCCGCTGGCCGAGCGAAACCTTTACCTGCAACGTGGCGCATCCGGCGAGCAAA

ACCAAAGTGGATAAACCGGTGCCGAAACGCGAAAACGGCCGCGTGCCGCGCCCGCCGGATTGCCCGAAAT

GCCCGGCGCCGGAAATGCTGGGCGGCCCGAGCGTGTTTATTTTTCCGCCGAAACCGAAAGATACCCTGCT

GATTGCGCGCACCCCGGAAGTGACCTGCGTGGTGGTGGCGCTGGATCCGGAAGATCCGGAAGTGCAGATT

AGCTGGTTTGTGGATGGCAAACAGATGCAGACCGCGAAAACCCAGCCGCGCGAAGAACAGTTTGCGGGCA

CCTATCGCGTGGTGAGCGTGCTGCCGATTGGCCATCAGGATTGGCTGAAAGGCAAACAGTTTACCTGCAA

AGTGAACAACAAAGCGCTGCCGAGCCCGATTGAACGCACCATTAGCAAAGCGCGCGGCCAGGCGCATCAG

CCGAGCGTGTATGTGCTGCCGCCGAGCCGCGAAGAACTGAGCAAAAACACCGTGAGCCTGACCTGCCTGA

TTAAAGATTTTTTTCCGCCGGATATTGATGTGGAATGGCAGAGCAACGGCCAGCAGGAACCGGAAAGCAA

ATATCGCACCACCCCGCCGCAGCTGGATGAAGATGGCAGCTATTTTCTGTATAGCAAACTGAGCGTGGAT

AAAAGCCGCTGGCAGCGCGGCGATACCTTTATTTGCGCGGTGATGCATGAAGCGCTGCATAACCATTATA

CCCAGGAAAGCCTGAGCCATAGCCCGGGCAAA

SEQ ID NO: 2: Chimeric mouse - canine heavy chain amino acid sequence
(3B10):
EVQLQQFGAELVKPGASVKMSCKASGYTFT<u>DYNMD</u>WVRQSGKSLEWIG<u>NINPNSESTSYNQKFKG</u>KATLT

VDKSSSTAYMELRSLTSDDTAVYYCTR<u>DGNRYDAWFAY</u>WGQGTLVTVSSASTTAPSVFPLAPSCGSTSGS

TVALACLVSGYFPEPVTVSWNSGSLTSGVHTFPSVLQSSGLYSLSSMVTVPSSRWPSETFTCNVAHPASK

TKVDKPVPKRENGRVPRPPDCPKCPAPEMLGGPSVFIFPPKPKDTLLIARTPEVTCVVVALDPEDPEVQI

SWFVDGKQMQTAKTQPREEQFAGTYRVVSVLPIGHQDWLKGKQFTCKVNNKALPSPIERTISKARGQAHQ

PSVYVLPPSREELSKNTVSLTCLIKDFFPPDIDVEWQSNGQQEPESKYRTTPPQLDEDGSYFLYSKLSVD

KSRWQRGDTFICAVMHEALHNHYTQESLSHSPGK

SEQ ID NO: 3: Chimeric mouse - canine light chain DNA (3B10):
CAGATTGTGCTGACCCAGAGCCCGGCGATTATGAGCGCGAGCCCGGGCGAAAAAGTGACCATGACCTGCA

GCGCGAGCAGCAGCGTGACCTATATGCATTGGTTTCAGCAGAAACCGGGCACCAGCCCGAAACTGTGGAT

TTATAGCACCAGCAATTCTGGCGAGCGGCGTGCCGGCGCGCTTTAGCGGCAGCGGCAGCGGCACCAGCTAT

AGCCTGACCATTAGCCGCATGGAAGCGGAAGATGCGGCGACCTATTATTGCCAGCAGCGCACCAGCTATC

CGCTGACCTTTGGCACCGGCACCAAACTGGAACTGAAACGCAACGATGCGCAGCCGGCGGTGTATCTGTT

TCAGCCGAGCCCGGATCAGCTGCATACCGGCAGCGCGAGCGTGGTGTGCCTGCTGAACAGCTTTTATCCG

AAAGATATTAACGTGAAATGGAAAGTGGATGGCGTGATTCAGGATACCGGCATTCAGGAAAGCGTGACCG

AACAGGATAGCAAAGATAGCACCTATAGCCTGAGCAGCACCCTGACCATGAGCAGCACCGAATATCTGAG

CCATGAACTGTATAGCTGCGAAATTACCCATAAAAGCCTGCCGAGCACCCTGATTAAAAGCTTTCAGCGC

AGCGAATGCCAGCGCGTGGAT

SEQUENCES

SEQ ID NO: 4: Chimeric mouse - canine light chain amino acid sequence (3B10):
QIVLTQSPAIMSASPGEKVTMTCSASSSVTYMHWFQQKPGTSPKLWIYSTSILASGVPARFSGSGSGTSY

SLTISRMEAEDAATYYCQQRTSYPLTFGTGTKLELKRNDAQPAVYLFQPSPDQLHTGSASVVCLLNSFYP

KDINVKWKVDGVIQDTGIQESVTEQDSKDSTYSLSSTLTMSSTEYLSHELYSCEITHKSLPSTLIKSFQR

SECQRVD

SEQ ID NO: 5: Chimeric mouse - canine heavy chain DNA (8H5)
CAGGTGCAGCTGCAGCAGAGCGGCGATGATCTGGTGAAACCGGGCGCGAGCGTGAAACTGAGCTGCAAAG

CGAGCGGCTATACCTTTACCAGCTATTGGATTAACTGGATTAAACAGCGCCCGGGCCAGGGCCTGGAATG

GATTGGCCGCATTGCGCCGGGCAGCGGCACCACCTATTATAACGAAGTGTTTAAAGGCAAAGCGACCCTG

ACCGTGGATAAATATAGCACCGCGTATATTCAGCTGAGCAGCCTGAGCAGCGAAGATAGCGCGGTGT

ATTTTTGCGCGCGCGGCGATTATGGCAGCTATTGGGGCCAGGGCACCCTGGTGACCGTGAGCAGCGCGAG

CACCACCGCCGAGCGTGTTTCCGCTGGCGCCGAGCTGCGGCAGCACCAGCGGCAGCACCGTGGCGCTG

GCGTGCCTGGTGAGCGGCTATTTTCCGGAACCGGTGACCGTGAGCTGGAACAGCGGCAGCCTGACCAGCG

GCGTGCATACCTTTCCGAGCGTGCTGCAGAGCAGCGGCCTGTATAGCCTGAGCAGCATGGTGACCGTGCC

GAGCAGCCGCTGGCCGAGCGAAACCTTTACCTGCAACGTGGCGCATCCGGCGAGCAAAACCAAAGTGGAT

AAACCGGTGCCGAAACGCGAAAACGGCCGCGTGCCGCGCCCGCCGGATTGCCCGAAATGCCCGGCGCCGG

AAATGCTGGGCGGCCCGAGCGTGTTTATTTTTCCGCCGAAACCGAAAGATACCCTGCTGATTGCGCGCAC

CCCGGAAGTGACCTGCGTGGTGGTGGCGCTGGATCCGGAAGATCCGGAAGTGCAGATTAGCTGGTTTGTG

GATGGCAAACAGATGCAGACCGCGAAAACCCAGCCGCGCGAAGAACAGTTTGCGGGCACCTATCGCGTGG

TGAGCGTGCTGCCGATTGGCCATCAGGATTGGCTGAAAGGCAAACAGTTTACCTGCAAAGTGAACAACAA

AGCGCTGCCGAGCCCGATTGAACGCACCATTAGCAAAGCGCGCGGCCAGGCGCATCAGCCGAGCGTGTAT

GTGCTGCCGCCGAGCCGCGAAGAACTGAGCAAAAACACCGTGAGCCTGACCTGCCTGATTAAAGATTTTT

TTCCGCCGGATATTGATGTGGAATGGCAGAGCAACGGCCAGCAGGAACCGGAAAGCAAATATCGCACCAC

CCCGCCGCAGCTGGATGAAGATGGCAGCTATTTTCTGTATAGCAAACTGAGCGTGGATAAAAGCCGCTGG

CAGCGCGGCGATACCTTTATTTGCGCGGTGATGCATGAAGCGCTGCATAACCATTATACCCAGGAAAGCC

TGAGCCATAGCCCGGGCAAA

SEQ ID NO: 6. Chimeric mouse - canine heavy chain amino acid sequence (8H5):
QVQLQQSGDDLVKPGASVKLSCKASGYTFTSYWINWIKQRPGQGLEWIGRIAPGSGTTYYNEVFKGKATL

TVDKYSSTAYIQLSSLSSEDSAVYFCARGDYGSYWGQGTLVTVSSASTTAPSVFPLAPSCGSTSGSTVAL

ACLVSGYFPEPVTVSWNSGSLTSGVHTFPSVLQSSGLYSLSSMVTVPSSRWPSETFTCNVAHPASKTKVD

KPVPKRENGRVPRPPDCPKCPAPEMLGGPSVFIFPPKPKDTLLIARTPEVTCVVVALDPEDPEVQISWFV

DGKQMQTAKTQPREEQFAGTYRVVSVLPIGHQDWLKGKQFTCKVNNKALPSPIERTISKARGQAHQPSVY

VLPPSREELSKNTVSLTCLIKDFFPPDIDVEWQSNGQQEPESKYRTTPPQLDEDGSYFLYSKLSVDKSRW

QRGDTFICAVMHEALHNHYTQESLSHSPGK

SEQ ID NO: 7: Chimeric mouse - canine lightc hain DNA (8H5):
CAGATTGTGCTGACCCAGAGCCCGGCGATTATGAGCGCGAGCCCGGGCGAAAAAGTGACCATGACCTGCA

GCGCGAGCAGCAGCATTAGCTATATGCATTGGTTTCAGCAGAAACCGGGCACCAGCCCGAAACGCTGGAT

TTATGATACCAGCAAACTGGCGAGCGGCGTGCCGGCGCGCTTTAGCGGCAGCGGCAGCGGCACCAGCTAT

AGCCTGACCATTAACAGCATGGAAGCGGAAGATGCGGCGACCTATTATTGCCATCAGCGCACCAGCTATC

CGCTGACCTTTGGCGCGGGCACCAAACTGGAACTGAAACGCAACGATGCGCAGCCGGCGGTGTATCTGTT

TCAGCCGAGCCCGGATCAGCTGCATACCGGCAGCGCGAGCGTGGTGTGCCTGCTGAACAGCTTTTATCCG

AAAGATATTAACGTGAAATGGAAAGTGGATGGCGTGATTCAGGATACCGGCATTCAGGAAAGCGTGACCG

AACAGGATAGCAAAGATAGCACCTATAGCCTGAGCAGCACCCTGACCATGAGCAGCACCGAATATCTGAG

CCATGAACTGTATAGCTGCGAAATTACCCATAAAAGCCTGCCGAGCACCCTGATTAAAAGCTTTCAGCGC

AGCGAATGCCAGCGCGTGGAT

SEQ ID NO: 8: Chimeric mouse - canine light chain amino acid sequence
(8H5):
QIVLTQSPAIMSASPGEKVTMTCSASSSISYMHWFQQKPGTSPKRWIYDTSKLASGVPARFSGSGSGTSY

SLTINSMEAEDAATYYCHQRTSYPLTFGAGTKLELKRNDAQPAVYLFQPSPDQLHTGSASVVCLLNSFYP

KDINVKWKVDGVIQDTGIQESVTEQDSKDSTYSLSSTLTMSSTEYLSHELYSCEITHKSLPSTLIKSFQR

SECQRVD

SEQ ID NO: 9: Chimeric human - canine heavy chain DNA (411):
CAGGTGCAGCTGGTGGAAAGCGGCGGCGGCGTGGTGCAGCCGGGCCGCAGCCTGCGCCTGAGCTGCGTGG

CGAGCGGCTTTACCTTTAGCAGCCATGGCATGCATTGGGTGCGCCAGGCGCCGGGCAAAGGCCTGGAATG

GGTGGCGGTGATTTGGTATGATGGCCGCAACAAATATTATGCGGATAGCGTGAAAGGCCGCTTTACCATT

AGCCGCGATAACAGCAAAAACACCCTGTTTCTGCAGATGAACAGCCTGCGCGCGGAAGATACCGCGGTGT

ATTATTGCGCGCGCGGCGGCCATTTTGGCCCGTTTGATTATTGGGGCCAGGGCACCCTGGTGACCGTGAG

CAGCGCGAGCACCACCGCGCCGAGCGTGTTTCCGCTGGCGCCGAGCTGCGGCAGCACCAGCGGCAGCACC

GTGGCGCTGGCGTGCCTGGTGAGCGGCTATTTTCCGGAACCGGTGACCGTGAGCTGGAACAGCGGCAGCC

TGACCAGCGGCGTGCATACCTTTCCGAGCGTGCTGCAGAGCAGCGGCCTGTATAGCCTGAGCAGCATGGT

GACCGTGCCGAGCAGCCGCTGGCCGAGCGAAACCTTTACCTGCAACGTGGCGCATCCGGCGAGCAAAACC

AAAGTGGATAAACCGGTGCCGAAACGCGAAAACGGCCGCGTGCCGCGCCCGCCGGATTGCCCGAAATGCC

CGGCGCCGGAAATGCTGGGCGGCCCGAGCGTGTTTATTTTTCCGCCGAAACCGAAAGATACCCTGCTGAT

TGCGCGCACCCCGGAAGTGACCTGCGTGGTGGTGGCGCTGGATCCGGAAGATCCGGAAGTGCAGATTAGC

TGGTTTGTGGATGGCAAACAGATGCAGACCGCGAAAACCCAGCCGCGCGAAGAACAGTTTGCGGGCACCT

ATCGCGTGGTGAGCGTGCTGCCGATTGGCCATCAGGATTGGCTGAAAGGCAAACAGTTTACCTGCAAAGT

GAACAACAAAGCGCTGCCGAGCCCGATTGAACGCACCATTAGCAAAGCGCGCGGCCAGGCGCATCAGCCG

AGCGTGTATGTGCTGCCGCCGAGCCGCGAAGAACTGAGCAAAAACACCGTGAGCCTGACCTGCCTGATTA

AAGATTTTTTTCCGCCGGATATTGATGTGGAATGGCAGAGCAACGGCCAGCAGGAACCGGAAAGCAAATA

TCGCACCACCCCGCCGCAGCTGGATGAAGATGGCAGCTATTTTCTGTATAGCAAACTGAGCGTGGATAAA

AGCCGCTGGCAGCGCGGCGATACCTTTATTTGCGCGGTGATGCATGAAGCGCTGCATAACCATTATACCC

AGGAAAGCCTGAGCCATAGCCCGGGCAAA

SEQ ID NO: 10: Chimeric human - canine heavy chain amino acid sequence
(411)
QVQLVESGGGVVQPGRSLRLSCVASGFTFSSHGMHWVRQAPGKGLEWVAVIWYDGRNKYYADSVKGRFTI

SRDNSKNTLFLQMNSLRAEDTAVYYCARGGHFGPFDYWGQGTLVTVSSASTTAPSVFPLAPSCGSTSGST

VALACLVSGYFPEPVTVSWNSGSLTSGVHTFPSVLQSSGLYSLSSMVTVPSSRWPSETFTCNVAHPASKT

KVDKPVPKRENGRVPRPPDCPKCPAPEMLGGPSVFIFPPKPKDTLLIARTPEVTCVVVALDPEDPEVQIS

WFVDGKQMQTAKTQPREEQFAGTYRVVSVLPIGHQDWLKGKQFTCKVNNKALPSPIERTISKARGQAHQP

SVYVLPPSREELSKNTVSLTCLIKDFFPPDIDVEWQSNGQQEPESKYRTTPPQLDEDGSYFLYSKLSVDK

SRWQRGDTFICAVMHEALHNHYTQESLSHSPGK

SEQUENCES

SEQ ID NO: 11. Chimeric human - canine light chain DNA (411):
GAAATTGTGCTGACCCAGAGCCCGGGCACCCTGAGCCTGAGCCCGGGCGAACGCGCGACCCTGAGCTGCC

GCGCGAGCCAGAGCATTAGCAGCAGCTTTCTGGCGTGGTATCAGCAGCGCCCGGGCCAGGCGCCGCGCCT

GCTGATTTATGGCGCGAGCAGCCGCGCGACCGGCATTCCGGATCGCTTTAGCGGCAGCGGCAGCGGCACC

GATTTTACCCTGACCATTAGCCGCCTGGAACCGGAAGATTTTGCGGTGTATTATTGCCAGCAGTATGGCA

CCAGCCCGTGGACCTTTGGCCAGGGCACCAAAGTGGAAATTAAACGCAACGATGCGCAGCCGGCGGTGTA

TCTGTTTCAGCCGAGCCCGGATCAGCTGCATACCGGCAGCGCGAGCGTGGTGTGCCTGCTGAACAGCTTT

TATCCGAAAGATATTAACGTGAAATGGAAAGTGGATGGCGTGATTCAGGATACCGGCATTCAGGAAAGCG

TGACCGAACAGGATAGCAAAGATAGCACCTATAGCCTGAGCAGCACCCTGACCATGAGCAGCACCGAATA

TCTGAGCCATGAACTGTATAGCTGCGAAATTACCCATAAAAGCCTGCCGAGCACCCTGATTAAAAGCTTT

CAGCGCAGCGAATGCCAGCGCGTGGAT

SEQ ID NO: 12: Chimeric human - canine light chain amino acid sequence (411):
EIVLTQSPGTLSLSPGERATLSCRASQSISSSFLAWYQQRPGQAPRLLIYGASSRATGIPDRFSGSGSGT

DFTLTISRLEPEDFAVYYCQQYGTSPWTFGQGTKVEIKRNDAQPAVYLFQPSPDQLHTGSASVVCLLNSF

YPKDINVKWKVDGVIQDTGIQESVTEQDSKDSTYSLSSTLTMSSTEYLSHELYSCEITHKSLPSTLIKSF

QRSECQRVD

SEQ ID NO: 13. Chimeric human - canine heavy chain DNA (418)
CAGGTGCAGCTGGTGGAAAGCGGCGGCGGCGTGGTGCAGCCGGGCCGCAGCCTGCGCCTGAGCTGCACCG

CGAGCGGCTTTACCTTTAGCAACTATGGCATGCATTGGGTGCGCCAGGCGCCGGGCAAAGGCCTGGAATG

GGTGGCGGTGATTTGGTATGATGGCAGCAACAAACATTATGGCGATAGCGTGAAAGGCCGCTTTACCATT

AGCAGCGATAACAGCAAAAACACCCTGTATCTGCAGATGAACAGCCTGCGCGCGGAAGATACCGCGGTGT

ATTATTGCGCGCGCGGCGAACGCCTGGGCAGCTATTTTGATTATTGGGGCCAGGGCACCCTGGTGACCGT

GAGCAGCGCGAGCACCACCGCGCCGAGCGTGTTTCCGCTGGCGCCGAGCTGCGGCAGCACCAGCGGCAGC

ACCGTGGCGCTGGCGTGCCTGGTGAGCGGCTATTTTCCGGAACCGGTGACCGTGAGCTGGAACAGCGGCA

GCCTGACCAGCGGCGTGCATACCTTTCCGAGCGTGCTGCAGAGCAGCGGCCTGTATAGCCTGAGCAGCAT

GGTGACCGTGCCGAGCAGCCGCTGGCCGAGCGAAACCTTTACCTGCAACGTGGCGCATCCGGCGAGCAAA

ACCAAAGTGGATAAACCGGTGCCGAAACGCGAAAACGGCCGCGTGCCGCGCCCGCCGGATTGCCCGAAAT

GCCCGGCGCCGGAAATGCTGGGCGGCCCGAGCGTGTTTATTTTTCCGCCGAAACCGAAAGATACCCTGCT

GATTGCGCGCACCCCGGAAGTGACCTGCGTGGTGGTGGCGCTGGATCCGGAAGATCCGGAAGTGCAGATT

AGCTGGTTTGTGGATGGCAAACAGATGCAGACCGCGAAAACCCAGCCGCGCGAAGAACAGTTTGCGGGCA

CCTATCGCGTGGTGAGCGTGCTGCCGATTGGCCATCAGGATTGGCTGAAAGGCAAACAGTTTACCTGCAA

AGTGAACAACAAAGCGCTGCCGAGCCCGATTGAACGCACCATTAGCAAAGCGCGCGGCCAGGCGCATCAG

CCGAGCGTGTATGTGCTGCCGCCGAGCCGCGAAGAACTGAGCAAAAACACCGTGAGCCTGACCTGCCTGA

TTAAAGATTTTTTTCCGCCGGATATTGATGTGGAATGGCAGAGCAACGGCCAGCAGGAACCGGAAAGCAA

ATATCGCACCACCCCGCCGCAGCTGGATGAAGATGGCAGCTATTTTCTGTATAGCAAACTGAGCGTGGAT

AAAAGCCGCTGGCAGCGCGGCGATACCTTTATTTGCGCGGTGATGCATGAAGCGCTGCATAACCATTATA

CCCAGGAAAGCCTGAGCCATAGCCCGGGCAAA

SEQUENCES

SEQ ID NO: 14. Chimeric human - canine heavy chain amino acid sequence (418)
QVQLVESGGGVVQPGRSLRLSCTASGFTFSNYGMHWVRQAPGKGLEWVAVIWYDGSNKHYGDSVKGRFTI

SSDNSKNTLYLQMNSLRAEDTAVYYCARGERLGSYFDYWGQTLVTVSSASTTAPSVFPLAPSCGSTSGS

TVALACLVSGYFPEPVTVSWNSGSLTSGVHTFPSVLQSSGLYSLSSMVTVPSSRWPSETFTCNVAHPASK

TKVDKPVPKRENGRVPRPPDCPKCPAPEMLGGPSVFIFPPKPKDTLLIARTPEVTCVVVALDPEDPEVQI

SWFVDGKQMQTAKTQPREEQFAGTYRVVSVLPIGHQDWLKGKQFTCKVNNKALPSPIERTISKARGQAHQ

PSVYVLPPSREELSKNTVSLTCLIKDFFPPDIDVEWQSNGQQEPESKYRTTPPQLDEDGSYFLYSKLSVD

KSRWQRGDTFICAVMHEALHNHYTQESLSHSPGK

SEQ ID NO: 15. Chimeric human - canine light chain DNA (418)
GAAATTGTGCTGACCCAGAGCCCGGGCACCCTGAGCCTGAGCCCGGGCGAACGCGCGACCCTGAGCTGCC

GCACCAGCGTGAGCAGCAGCTATCTGGCGTGGTATCAGCAGAAACCGGGCCAGGCGCCGCGCCTGCTGAT

TTATGGCGCGAGCAGCCGCGCGACCGGCATTCCGGATCGCTTTAGCGGCAGCGGCAGCGGCACCGATTTT

ACCCTGACCATTAGCCGCCTGGAACCGGAAGATTTTGCGGTGTATTATTGCCAGCAGTATGGCATTAGCC

CGTTTACCTTTGGCGGCGGCACCAAAGTGGAAATTAAACGCAACGATGCGCAGCCGGCGGTGTATCTGTT

TCAGCCGAGCCCGGATCAGCTGCATACCGGCAGCGCGAGCGTGGTGTGCCTGCTGAACAGCTTTTATCCG

AAAGATATTAACGTGAAATGGAAAGTGGATGGCGTGATTCAGGATACCGGCATTCAGGAAAGCGTGACCG

AACAGGATAGCAAAGATAGCACCTATAGCCTGAGCAGCACCCTGACCATGAGCAGCACCGAATATCTGAG

CCATGAACTGTATAGCTGCGAAATTACCCATAAAAGCCTGCCGAGCACCCTGATTAAAAGCTTTCAGCGC

AGCGAATGCCAGCGCGTGGAT

SEQ ID NO: 16. Chimeric human - canine light chain amino acid sequence (418)
EIVLTQSPGTLSLSPGERATLSCRTSVSSSYLAWYQQKPGQAPRLLIYGASSRATGIPDRFSGSGSGTDF

TLTISRLEPEDFAVYYCQQYGISPFTFGGGTKVEIKRNDAQPAVYLFQPSPDQLHTGSASVVCLLNSFYP

KDINVKWKVDGVIQDTGIQESVTEQDSKDSTYSLSSTLTMSSTEYLSHELYSCEITHKSLPSTLIKSFQR

SECQRVD

SEQ ID NO: 17. Chimeric human - canine heavy chain DNA (611)
CAGGTGCAGCTGGTGGAAAGCGGCGGCGGCGTGGTGGAACCGGGCCGCAGCCTGCGCCTGAGCTGCACCG

CGAGCGGCTTTACCTTTAGCAGCTATGGCATGCATTGGGTGCGCCAGGCGCCGGGCAAAGGCCTGGAATG

GGTGGCGGTGATTTGGTATGATGGCAGCAACAAACATTATGCGGATAGCGCGAAAGGCCGCTTTACCATT

AGCCGCGATAACAGCAAAAACACCCTGTATCTGCAGATGAACAGCCTGCGCGCGGAAGATACCGCGGTGT

ATTATTGCGCGCGCGGGCCTGCTGGGCTATTTTGATTATTGGGGCCAGGGCACCCTGGTGACCGTGAG

CAGCGCGAGCACCACCGCGCCGAGCGTGTTTCCGCTGGCGCCGAGCTGCGGCAGCACCAGCGGCAGCACC

GTGGCGCTGGCGTGCCTGGTGAGCGGCTATTTTCCGGAACCGGTGACCGTGAGCTGGAACAGCGGCAGCC

TGACCAGCGGCGTGCATACCTTTCCGAGCGTGCTGCAGAGCAGCGGCCTGTATAGCCTGAGCAGCATGGT

GACCGTGCCGAGCAGCCGCTGGCCGAGCGAAACCTTTACCTGCAACGTGGCGCATCCGGCGAGCAAAACC

AAAGTGGATAAACCGGTGCCGAAACGCGAAAACGGCCGCGTGCCGCGCCCGCCGGATTGCCCGAAATGCC

CGGCGCCGGAAATGCTGGGCGGCCCGAGCGTGTTTATTTTTCCGCCGAAACCGAAAGATACCCTGCTGAT

TGCGCGCACCCCGGAAGTGACCTGCGTGGTGGTGGCGCTGGATCCGGAAGATCCGGAAGTGCAGATTAGC

TGGTTTGTGGATGGCAAACAGATGCAGACCGCGAAAACCCAGCCGCGCGAAGAACAGTTTGCGGGCACCT

ATCGCGTGGTGAGCGTGCTGCCGATTGGCCATCAGGATTGGCTGAAAGGCAAACAGTTTACCTGCAAAGT

GAACAACAAAGCGCTGCCGAGCCCGATTGAACGCACCATTAGCAAAGCGCGCGGCCAGGCGCATCAGCCG

| SEQUENCES |
| --- |
| AGCGTGTATGTGCTGCCGCCGAGCCGCGAAGAACTGAGCAAAAACACCGTGAGCCTGACCTGCCTGATTA

AAGATTTTTTTCCGCCGGATATTGATGTGGAATGGCAGAGCAACGGCCAGCAGGAACCGGAAAGCAAATA

TCGCACCACCCCGCCGCAGCTGGATGAAGATGGCAGCTATTTTCTGTATAGCAAACTGAGCGTGGATAAA

AGCCGCTGGCAGCGCGGCGATACCTTTATTTGCGCGGTGATGCATGAAGCGCTGCATAACCATTATACCC

AGGAAAGCCTGAGCCATAGCCCGGGCAAA

SEQ ID NO: 18: Chimeric human - canine heavy chain amino acid sequence (611)
QVQLVESGGGVVEPGRSLRLSCTASGFTFSSYGMHWVRQAPGKGLEWVAVIWYDGSNKHYADSAKGRFTI

SRDNSKNTLYLQMNSLRAEDTAVYYCARAGLLGYFDYWGQGTLVTVSSASTTAPSVFPLAPSCGSTSGST

VALACLVSGYFPEPVTVSWNSGSLTSGVHTFPSVLQSSGLYSLSSMVTVPSSRWPSETFTCNVAHPASKT

KVDKPVPKRENGRVPRPPDCPKCPAPEMLGGPSVFIFPPKPKDTLLIARTPEVTCVVVALDPEDPEVQIS

WFVDGKQMQTAKTQPREEQFAGTYRVVSVLPIGHQDWLKGKQFTCKVNNKALPSPIERTISKARGQAHQP

SVYVLPPSREELSKNTVSLTCLIKDFFPPDIDVEWQSNGQQEPESKYRTTPPQLDEDGSYFLYSKLSVDK

SRWQRGDTFICAVMHEALHNHYTQESLSHSPGK

SEQ ID NO: 19: Chimeric human - canine light chain DNA (611)
GAAATTGTGCTGACCCAGAGCCCGGGCACCCTGAGCCTGAGCCCGGGCGAACGCGCGACCCTGAGCTGCC

GCGCGAGCCAGAGCGTGAGCAGCTATCTGGCGTGGTATCAGCAGAAACCGGGCCAGGCGCCGCGCCCGCT

GATTTATGGCGTGAGCAGCCGCGCGACCGGCATTCCGGATCGCTTTAGCGGCAGCGGCAGCGGCACCGAT

TTTACCCTGACCATTAGCCGCCTGGAACCGGAAGATTTTGCGGTGTATTATTGCCAGCAGTATGGCATTA

GCCCGTTTACCTTTGGCCCGGGCACCAAAGTGGATATTAAACGCAACGATGCGCAGCCGGCGGTGTATCT

GTTTCAGCCGAGCCCGGATCAGCTGCATACCGGCAGCGCGAGCGTGGTGTGCCTGCTGAACAGCTTTTAT

CCGAAAGATATTAACGTGAAATGGAAAGTGGATGGCGTGATTCAGGATACCGGCATTCAGGAAAGCGTGA

CCGAACAGGATAGCAAAGATAGCACCTATAGCCTGAGCAGCACCCTGACCATGAGCAGCACCGAATATCT

GAGCCATGAACTGTATAGCTGCGAAATTACCCATAAAAGCCTGCCGAGCACCCTGATTAAAAGCTTTCAG

CGCAGCGAATGCCAGCGCGTGGAT

SEQ ID NO: 20. Chimeric human - canine light chain amino acid sequence (611)
EIVLTQSPGTLSLSPGERATLSCRASQSVSSYLAWYQQKPGQAPRPLIYGVSSRATGIPDRFSGSGSGTD

FTLTISRLEPEDFAVYYCQQYGISPFTFGPGTKVDIKRNDAQPAVYLFQPSPDQLHTGSASVVCLLNSFY

PKDINVKWKVDGVIQDTGIQESVTEQDSKDSTYSLSSTLTMSSTEYLSHELYSCEITHKSLPSTLIKSFQ

RSECQRVD

SEQ ID NO: 21. Chimeric human - canine heavy chain DNA (10D1)
CAGGTGCAGCTGGTGGAAAGCGGCGGCGGCGTGGTGCAGCCGGGCCGCAGCCTGCGCCTGAGCTGCGCGG

CGAGCGGCTTTACCTTTAGCAGCTATACCATGCATTGGGTGCGCCAGGCGCCGGGCAAAGGCCTGGAATG

GGTGACCTTTATTAGCTATGATGGCAACAACAAATATTATGCGGATAGCGTGAAAGGCCGCTTTACCATT

AGCCGCGATAACAGCAAAAACACCCTGTATCTGCAGATGAACAGCCTGCGCGCGGAAGATACCGCGGTGT

ATTATTGCGCGCGCACCGGCTGGCTGGGCCCGTTTGATTATTGGGGCCAGGGCACCCTGGTGACCGTGAG

CAGCGCGAGCACCACCGCGCCGAGCGTGTTTCCGCTGGCGCCGAGCTGCGGCAGCACCAGCGGCAGCACC

GTGGCGCTGGCGTGCCTGGTGAGCGGCTATTTTCCGGAACCGGTGACCGTGAGCTGGAACAGCGGCAGCC

TGACCAGCGGCGTGCATACCTTTCCGAGCGTGCTGCAGAGCAGCGGCCTGTATAGCCTGAGCAGCATGGT

GACCGTGCCGAGCAGCCGCTGGCCGAGCGAAACCTTTACCTGCAACGTGGCGCATCCGGCGAGCAAAACC |

| SEQUENCES |
|---|
| AAAGTGGATAAACCGGTGCCGAAACGCGAAAACGGCCGCGTGCCGCGCCCGCCGGATTGCCCGAAATGCC |
| CGGCGCCGGAAATGCTGGGCGGCCCGAGCGTGTTTATTTTTCCGCCGAAACCGAAAGATACCCTGCTGAT |
| TGCGCGCACCCCGGAAGTGACCTGCGTGGTGGTGGCGCTGGATCCGGAAGATCCGGAAGTGCAGATTAGC |
| TGGTTTGTGGATGGCAAACAGATGCAGACCGCGAAAACCCAGCCGCGCGAAGAACAGTTTGCGGGCACCT |
| ATCGCGTGGTGAGCGTGCTGCCGATTGGCCATCAGGATTGGCTGAAAGGCAAACAGTTTACCTGCAAAGT |
| GAACAACAAAGCGCTGCCGAGCCCGATTGAACGCACCATTAGCAAAGCGCGCGGCCAGGCGCATCAGCCG |
| AGCGTGTATGTGCTGCCGCCGAGCCGCGAAGAACTGAGCAAAAACACCGTGAGCCTGACCTGCCTGATTA |
| AAGATTTTTTTCCGCCGGATATTGATGTGGAATGGCAGAGCAACGGCCAGCAGGAACCGGAAAGCAAATA |
| TCGCACCACCCCGCCGCAGCTGGATGAAGATGGCAGCTATTTTCTGTATAGCAAACTGAGCGTGGATAAA |
| AGCCGCTGGCAGCGCGGCGATACCTTTATTTGCGCGGTGATGCATGAAGCGCTGCATAACCATTATACCC |
| AGGAAAGCCTGAGCCATAGCCCGGGCAAA |

SEQ ID NO: 22. Chimeric human - canine heavy chain amino acid sequence (10D1)
QVQLVESGGGVVQPGRSLRLSCAASGFTFS<u>SYTMH</u>WVRQAPGKGLEWVT<u>FISYDGNNKYYADSVKGRFTI SRDNSKNTLYLQMNSLRAEDTAVYYCART<u>GWLGPFDY</u>WGQGTLVTVSSASTTAPSVFPLAPSCGSTSGST

VALACLVSGYFPEPVTVSWNSGSLTSGVHTFPSVLQSSGLYSLSSMVTVPSSRWPSETFTCNVAHPASKT

KVDKPVPKRENGRVPRPPDCPKCPAPEMLGGPSVFIFPPKPKDTLLIARTPEVTCVVVALDPEDPEVQIS

WFVDGKQMQTAKTQPREEQFAGTYRVVSVLPIGHQDWLKGKQFTCKVNNKALPSPIERTISKARGQAHQP

SVYVLPPSREELSKNTVSLTCLIKDFFPPDIDVEWQSNGQQEPESKYRTTPPQLDEDGSYFLYSKLSVDK

SRWQRGDTFICAVMHEALHNHYTQESLSHSPGK

SEQ ID NO: 23. Chimeric human - canine light chain DNA (10D1)
GAAATTGTGCTGACCCAGAGCCCGGGCACCCTGAGCCTGAGCCCGGGCGAACGCGCGACCCTGAGCTGCC

GCGCGAGCCAGAGCGTGGGCAGCAGCTATCTGGCGTGGTATCAGCAGAAACCGGGCCAGGCGCCGCGCCT

GCTGATTTATGGCGCGTTTAGCCGCGCGACCGGCATTCCGGATCGCTTTAGCGGCAGCGGCAGCGGCACC

GATTTTACCCTGACCATTAGCCGCCTGGAACCGGAAGATTTTGCGGTGTATTATTGCCAGCAGTATGGCA

GCAGCCCGTGGACCTTTGGCCAGGGCACCAAAGTGGAAATTAAACGAACGATGCGCAGCCGGCGGTGTA

TCTGTTTCAGCCGAGCCCGGATCAGCTGCATACCGGCAGCGCGAGCGTGGTGTGCCTGCTGAACAGCTTT

TATCCGAAAGATATTAACGTGAAATGGAAAGTGGATGGCGTGATTCAGGATACCGGCATTCAGGAAAGCG

TGACCGAACAGGATAGCAAAGATAGCACCTATAGCCTGAGCAGCACCCTGACCATGAGCAGCACCGAATA

TCTGAGCCATGAACTGTATAGCTGCGAAATTACCCATAAAAGCCTGCCGAGCACCCTGATTAAAAGCTTT

CAGCGCAGCGAATGCCAGCGCGTGGAT

SEQ ID NO: 24. Chimeric human - canine light chain amino acid sequence (10D1)
EIVLTQSPGTLSLSPGERATLSC<u>RASQSVGSSYLA</u>WYQQKPGQAPRLLIY<u>GAFSRAT</u>GIPDRFSGSGSGT DFTLTISRLEPEDFAVYYC<u>QQYGSSPWT</u>FGQGTKVEIKRNDAQPAVYLFQPSPDQLHTGSASVVCLLNSF

YPKDINVKWKVDGVIQDTGIQESVTEQDSKDSTYSLSSTLTMSSTEYLSHELYSCEITHKSLPSTLIKSF

QRSECQRVD

SEQ ID NO: 25. Chimeric human - canine heavy chain DNA (1E2)
CAGGTGCAGCTGGTGGAAAGCGGCGGCGGCGTGGTGCAGCCGGGCCGCAGCCTGCGCCTGAGCTGCGCGG

CGAGCGGCTTTACCTTTAGCAGCTATGGCATGCATTGGGTGCGCCAGGCGCCGGGCAAAGGCCTGGAATG

GGTGGCGGTGATTTGGTATGATGGCAGCAACAAATATTATGCGGATAGCGTGAAAGGCCGCTTTACCATT

AGCCGCGATAACAGCAAAAACACCCTGTATCTGCAGATGAACAGCCTGCGCGCGGAAGATACCGCGGTGT

-continued

SEQUENCES

TTTATTGCGCGCGCGCCGAACTATATTGGCGCGTTTGATGTGTGGGGCCAGGGCACCATGGTGACCGT

GAGCAGCGCGAGCACCACCGCGCCGAGCGTGTTTCCGCTGGCGCCGAGCTGCGGCAGCACCAGCGGCAGC

ACCGTGGCGCTGGCGTGCCTGGTGAGCGGCTATTTTCCGGAACCGGTGACCGTGAGCTGGAACAGCGGCA

GCCTGACCAGCGGCGTGCATACCTTTCCGAGCGTGCTGCAGAGCAGCGGCCTGTATAGCCTGAGCAGCAT

GGTGACCGTGCCGAGCAGCCGCTGGCCGAGCGAAACCTTTACCTGCAACGTGGCGCATCCGGCGAGCAAA

ACCAAAGTGGATAAACCGGTGCCGAAACGCGAAAACGGCCGCGTGCCGCGCCCGCCGGATTGCCCGAAAT

GCCCGGCGCCGGAAATGCTGGGCGGCCCGAGCGTGTTTATTTTTCCGCCGAAACCGAAAGATACCCTGCT

GATTGCGCGCACCCCGGAAGTGACCTGCGTGGTGGTGGCGCTGGATCCGGAAGATCCGGAAGTGCAGATT

AGCTGGTTTGTGGATGGCAAACAGATGCAGACCGCGAAAACCCAGCCGCGCGAAGAACAGTTTGCGGGCA

CCTATCGCGTGGTGAGCGTGCTGCCGATTGGCCATCAGGATTGGCTGAAAGGCAAACAGTTTACCTGCAA

AGTGAACAACAAAGCGCTGCCGAGCCCGATTGAACGCACCATTAGCAAAGCGCGCGGCCAGGCGCATCAG

CCGAGCGTGTATGTGCTGCCGCCGAGCCGCGAAGAACTGAGCAAAAACACCGTGAGCCTGACCTGCCTGA

TTAAAGATTTTTTTCCGCCGGATATTGATGTGGAATGGCAGAGCAACGGCCAGCAGGAACCGGAAAGCAA

ATATCGCACCACCCCGCCGCAGCTGGATGAAGATGGCAGCTATTTTCTGTATAGCAAACTGAGCGTGGAT

AAAAGCCGCTGGCAGCGCGGCGATACCTTTATTTGCGCGGTGATGCATGAAGCGCTGCATAACCATTATA

CCCAGGAAAGCCTGAGCCATAGCCCGGGCAAA

SEQ ID NO: 26. Chimeric human - canine heavy chain amino acid sequence
(1E2)
QVQLVESGGGVVQPGRSLRLSCAASGFTF<ins>SSYGMHW</ins>VRQAPGKGLEWVA<ins>VIWYDGSNKYYADSVKG</ins>RFTI SRDNSKNTLYLQMNSLRAEDTAVFYCAR<ins>APNYIGAFDV</ins>WGQGTMVTVSSASTTAPSVFPLAPSCGSTSGS

TVALACLVSGYFPEPVTVSWNSGSLTSGVHTFPSVLQSSGLYSLSSMVTVPSSRWPSETFTCNVAHPASK

TKVDKPVPKRENGRVPRPPDCPKCPAPEMLGGPSVFIFPPKPKDTLLIARTPEVTCVVVALDPEDPEVQI

SWFVDGKQMQTAKTQPREEQFAGTYRVVSVLPIGHQDWLKGKQFTCKVNNKALPSPIERTISKARGQAHQ

PSVYVLPPSREELSKNTVSLTCLIKDFFPPDIDVEWQSNGQQEPESKYRTTPPQLDEDGSYFLYSKLSVD

KSRWQRGDTFICAVMHEALHNHYTQESLSHSPGK

SEQ ID NO: 27: Chimeric human - canine light chain DNA (1E2)
GATATTCAGATGACCCAGAGCCCGAGCAGCCTGAGCGCGAGCGTGGGCGATCGCGTGACCATTACCTGCC

GCGCGAGCCAGGGCATTAGCAGCTGGCTGGCGTGGTATCAGCAGAAACCGGAAAAAGCGCCGAAAAGCCT

GATTTATGCGGCGAGCAGCCTGCAGAGCGGCGTGCCGAGCCGCTTTAGCGGCAGCGGCAGCGGCACCGAT

TTTACCCTGACCATTAGCAGCCTGCAGCCGGAAGATTTTGCGACCTATTATTGCCAGCAGTATAACAGCT

ATCCGCCGACCTTTGGCCAGGGCACCAAAGTGGAAATTAAACGCAACGATGCGCAGCCGGCGGTGTATCT

GTTTCAGCCGAGCCCGGATCAGCTGCATACCGGCAGCGCGAGCGTGGTGTGCCTGCTGAACAGCTTTTAT

CCGAAAGATATTAACGTGAAATGGAAAGTGGATGGCGTGATTCAGGATACCGGCATTCAGGAAAGCGTGA

CCGAACAGGATAGCAAAGATAGCACCTATAGCCTGAGCAGCACCCTGACCATGAGCAGCACCGAATATCT

GAGCCATGAACTGTATAGCTGCGAAATTACCCATAAAAGCCTGCCGAGCACCCTGATTAAAGCTTTCAG

CGCAGCGAATGCCAGCGCGTGGAT

SEQ ID NO: 28: Chimeric human - canine light chain amino acid sequence
(1E2)
DIQMTQSPSSLSASVGDRVTITC<ins>RASQGISSWLAWYQQKPEKAPKSLIYAASSLQSGVPSRFSGSGSGTD</ins>

FTLTISSLQPEDFATYYC<ins>QQYNSYPPT</ins>FGQGTKVEIKRNDAQPAVYLFQPSPDQLHTGSASVVCLLNSFY

| SEQUENCES |
| --- |
| PKDINVKWKVDGVIQDTGIQESVTEQDSKDSTYSLSSTLTMSSTEYLSHELYSCEITHKSLPSTLIKSFQ RSECQRVD |
| SEQ ID NO: 29: Chimeric mouse - canine heavy chain DNA (3B3)<br>GAAGTGAAACTGGTGAACAGCGGCGGCGGCCTGGTGCAGCCGGGCAACAGCCTGCGCCTGAGCTGCGCGA<br>CCAGCGGCTTTACCTTTACCGATTTTTATATGAGCTGGGTGCGCCAGCCGCCGGGCAAAGCGCTGGAATG<br>GCTGGGCTTTGTGCGCAACCGCGCGAACGGCTATACCACCGAATATAGCGTGAGCGTGAAAGGCCGCTTT<br>ATTATTAGCCGCGATAACTTTCAGAGCACCCTGTTTCTGCAGATGAACACCCTGCGCGCGGAAGATAGCG<br>GCACCTATTATTGCGTGCGCGGCCCGGGCGATACCGCGGATTATACCATGGATTATTGGGGCCAGGGCAC<br>CAGCGTGACCGTGAGCAGCGCGAGCACCACCGCGCCGAGCGTGTTTCCGCTGGCGCCGAGCTGCGGCAGC<br>ACCAGCGGCAGCACCGTGGCGCTGGCGTGCCTGGTGAGCGGCTATTTTCCGGAACCGGTGACCGTGAGCT<br>GGAACAGCGGCAGCCTGACCAGCGGCGTGCATACCTTTCCGAGCGTGCTGCAGAGCAGCGGCCTGTATAG<br>CCTGAGCAGCATGGTGACCGTGCCGAGCAGCCGCTGGCCGAGCGAAACCTTTACCTGCAACGTGGCGCAT<br>CCGGCGAGCAAAACCAAAGTGGATAAACCGGTGCCGAAACGCGAAAACGGCCGCGTGCCGCGCCCGCCGG<br>ATTGCCCGAAATGCCCGGCGCCGGAAATGCTGGGCGGCCCGAGCGTGTTTATTTTTCCGCCGAAACCGAA<br>AGATACCCTGCTGATTGCGCGCACCCCGGAAGTGACCTGCGTGGTGGTGGCGCTGGATCCGGAAGATCCG<br>GAAGTGCAGATTAGCTGGTTTGTGGATGGCAAACAGATGCAGACCGCGAAAACCCAGCCGCGCGAAGAAC<br>AGTTTGCGGGCACCTATCGCGTGGTGAGCGTGCTGCCGATTGGCCATCAGGATTGGCTGAAAGGCAAACA<br>GTTTACCTGCAAAGTGAACAACAAAGCGCTGCCGAGCCCGATTGAACGCACCATTAGCAAAGCGCGCGGC<br>CAGGCGCATCAGCCGAGCGTGTATGTGCTGCCGCCGAGCCGCGAAGAACTGAGCAAAAACACCGTGAGCC<br>TGACCTGCCTGATTAAAGATTTTTTTCCGCCGGATATTGATGTGGAATGGCAGAGCAACGGCCAGCAGGA<br>ACCGGAAAGCAAATATCGCACCACCCCGCCGCAGCTGGATGAAGATGGCAGCTATTTTCTGTATAGCAAA<br>CTGAGCGTGGATAAAAGCCGCTGGCAGCGCGGCGATACCTTTATTTGCGCGGTGATGCATGAAGCGCTGC<br>ATAACCATTATACCCAGGAAAGCCTGAGCCATAGCCCGGGCAAA |
| SEQ ID NO: 30. Chimeric mouse - canine heavy chain amino acid sequence (3B3)<br>EVKLVNSGGGLVQPGNSLRLSCATSGFTFT<u>DFYMSW</u>VRQPPGKALEWL<u>GFVRNRANGYTTEYSVSVKGRF</u><br>IISRDNFQSTLFLQMNTLRAEDSGTYYCVR<u>GPGDTADYTMDY</u>WGQGTSVTVSSASTTAPSVFPLAPSCGS<br>TSGSTVALACLVSGYFPEPVTVSWNSGSLTSGVHTFPSVLQSSGLYSLSSMVTVPSSRWPSETFTCNVAH<br>PASKTKVDKPVPKRENGRVPRPPDCPKCPAPEMLGGPSVFIFPPKPKDTLLIARTPEVTCVVVALDPEDP<br>EVQISWFVDGKQMQTAKTQPREEQFAGTYRVVSVLPIGHQDWLKGKQFTCKVNNKALPSPIERTISKARG<br>QAHQPSVYVLPPSREELSKNTVSLTCLIKDFFPPDIDVEWQSNGQQEPESKYRTTPPQLDEDGSYFLYSK<br>LSVDKSRWQRGDTFICAVMHEALHNHYTQESLSHSPGK |
| SEQ ID NO: 31: Chimeric mouse - canine light chain DNA (3B3)<br>CAGGCGGTGGTGACCCAGGAAAGCGCGTTTACCACCAGCCCGGGCGGCACCGTGATTCTGACCTGCCGCA<br>GCAGCACCGGCGCGGTGACCACCAACAACTATGCGAACTGGGTGCAGGAAAAACCGGATCATCTGTTTAC<br>CGGCCTGATTGGCGGCACCAGCAACCGCGCGCCGGGCGTGCCGGTGCGCTTTAGCGGCAGCCTGATTGGC<br>GATAAAGCGGCGCTGACCATTACCGGCGCGCAGACCGAAGATGATGGCATGTATTTTGCGCGCTGTGGT<br>ATACCACCCATTTTGTGTTTGGCGGCGGCACCAAAGTGACCGTGCTGGGCCAGCCGAAAGCGAGCCCGAG<br>CGTGACCCTGTTTCCGCCGAGCAGCGAAGAACTGGGCGCGAACAAAGCGACCCTGGTGTGCCTGATTAGC<br>GATTTTTATCCGAGCGGCGTGACCGTGGCGTGGAAAGCGGATGGCAGCCCGATTACCCAGGGCGTGGAAA<br>CCACCAAACCGAGCAAACAGAGCAACAACAAATATGCGGCGAGCAGCTATCTGAGCCTGACCCCGGATAA |

| SEQUENCES |
|---|
| ATGGAAAAGCCATAGCAGCTTTAGCTGCCTGGTGACCCATGAAGGCAGCACCGTGGAAAAAAAGTGGCG |
| CCGGCGGAATGCAGC |
| SEQ ID NO: 32: Chimeric mouse - canine light chain amino acid sequence (3B3)<br>QAVVTQESAFTTSPGGTVILTC<u>RSSTGAVTTNNYANW</u>VQEKPDHLFTGLIGGT<u>SNRAPG</u>VPVRFSGSLIG<br>DKAALTITGAQTEDDGMYFC<u>ALWYTTHFVF</u>GGGTKVTVLGQPKASPSVTLFPPSSEELGANKATLVCLIS<br>DFYPSGVTVAWKADGSPITQGVETTKPSKQSNNKYAASSYLSLTPDKWKSHSSFSCLVTHEGSTVEKKVA<br>PAECS |
| SEQ ID NO: 33: Caninized 3B10 heavy chain DNA (VH1)<br>GAAGTGCAGCTGGTGCAGAGCGGCGCGGAAGTGAAAAAACCGGGCGCGAGCGTGAAAGTGAGCTGCAAAG<br>CGAGCGGCTATACCTTTACCGATTATAACATGGATTGGGTGCGCCAGGCGCCGGGCGCGGGCCTGGATTG<br>GATGGGCAACATTAACCCGAACAGCGAAAGCACCAGCTATAACCAGAAATTTAAAGGCCGCGTGACCCTG<br>ACCGCGGATACCAGCACCAGCACCGCGTATATGGAACTGAGCAGCCTGCGCGCGGGCGATATTGCGGTGT<br>ATTATTGCACCCGCGATGGCAACCGCTATGATGCGTGGTTTGCGTATTGGGGCCAGGGCACCCTGGTGAC<br>CGTGAGCAGCGCGAGCACCACCGCGCCGAGCGTGTTTCCGCTGGCGCCGAGCTGCGGCAGCACCAGCGGC<br>AGCACCGTGGCGCTGGCGTGCCTGGTGAGCGGCTATTTTCCGGAACCGGTGACCGTGAGCTGGAACAGCG<br>GCAGCCTGACCAGCGGCGTGCATACCTTTCCGAGCGTGCTGCAGAGCAGCGGCCTGTATAGCCTGAGCAG<br>CATGGTGACCGTGCCGAGCAGCCGCTGGCCGAGCGAAACCTTTACCTGCAACGTGGCGCATCCGGCGAGC<br>AAAACCAAAGTGGATAAACCGGTGCCGAAACGCGAAAACGGCCGCGTGCCGCGCCCGCCGGATTGCCCGA<br>ATGCCCGGCGCCGGAAATGCTGGGCGGCCCGAGCGTGTTTATTTTTCCGCCGAAACCGAAAGATACCCT<br>GCTGATTGCGCGCACCCCGGAAGTGACCTGCGTGGTGGTGGATCTGGATCCGGAAGATCCGGAAGTGCAG<br>ATTAGCTGGTTTGTGGATGGCAAACAGATGCAGACCGCGAAAACCCAGCCGCGCGAAGAACAGTTTAACG<br>GCACCTATCGCGTGGTGAGCGTGCTGCCGATTGGCCATCAGGATTGGCTGAAAGGCAAACAGTTTACCTG<br>CAAAGTGAACAACAAAGCGCTGCCGAGCCCGATTGAACGCACCATTAGCAAAGCGCGCGGCCAGGCGCAT<br>CAGCCGAGCGTGTATGTGCTGCCGCCGAGCCGCGAAGAACTGAGCAAAAACACCGTGAGCCTGACCTGCC<br>TGATTAAAGATTTTTTTCCGCCGGATATTGATGTGGAATGGCAGAGCAACGGCCAGCAGGAACCGGAAAG<br>CAAATATCGCACCACCCCGCCGCAGCTGGATGAAGATGGCAGCTATTTTCTGTATAGCAAACTGAGCGTG<br>GATAAAAGCCGCTGGCAGCGCGGCGATACCTTTATTTGCGCGGTGATGCATGAAGCGCTGCATAACCATT<br>ATACCCAGGAAAGCCTGAGCCATAGCCCGGGCAAA |
| SEQ ID NO: 34. Caninized 3B10 heavy chain amino acid sequence (VH1)<br>EVQLVQSGAEVKKPGASVKVSCKASGYTFT<u>DYNMDW</u>VRQAPGAGLDWMG<u>NINPNSESTSYNQKFKG</u>RVTL<br>TADTSTSTAYMELSSLRAGDIAVYYCT<u>RDGNRYDAWFAY</u>WGQGTLVTVSSASTTAPSVFPLAPSCGSTSG<br>STVALACLVSGYFPEPVTVSWNSGSLTSGVHTFPSVLQSSGLYSLSSMVTVPSSRWPSETFTCNVAHPAS<br>KTKVDKPVPKRENGRVPRPPDCPKCPAPEMLGGPSVFIFPPKPKDTLLIARTPEVTCVVVDLDPEDPEVQ<br>ISWFVDGKQMQTAKTQPREEQFNGTYRVVSVLPIGHQDWLKGKQFTCKVNNKALPSPIERTISKARGQAH<br>QPSVYVLPPSREELSKNTVSLTCLIKDFFPPDIDVEWQSNGQQEPESKYRTTPPQLDEDGSYFLYSKLSV<br>DKSRWQRGDTFICAVMHEALHNHYTQESLSHSPGK |
| SEQ ID NO: 35: Caninized 3B10 heavy chain DNA (VH2)<br>GAAGTGCAGCTGGTGCAGAGCGGCGCGGAAGTGAAAAAACCGGGCGCGAGCGTGAAAGTGAGCTGCAAAG<br>CGAGCGGCTATACCTTTACCGATTATAACATGGATTGGGTGCGCCAGGCGCCGGGCGCGAGCCTGGATTG<br>GATTGGCAACATTAACCCGAACAGCGAAAGCACCAGCTATAACCAGAAATTTAAAGGCAAAGCGACCCTG |

| SEQUENCES |
|---|
| ACCGTGGATAAAAGCACCAGCACCGCGTATATGGAACTGAGCAGCCTGCGCGCGGGCGATATTGCGGTGT |
| ATTATTGCACCCGCGATGGCAACCGCTATGATGCGTGGTTTGCGTATTGGGGCCAGGGCACCCTGGTGAC |
| CGTGAGCAGCGCGAGCACCACCGCGCCGAGCGTGTTTCCGCTGGCGCCGAGCTGCGGCAGCACCAGCGGC |
| AGCACCGTGGCGCTGGCGTGCCTGGTGAGCGGCTATTTTCCGGAACCGTGACCGTGAGCTGGAACAGCG |
| GCAGCCTGACCAGCGGCGTGCATACCTTTCCGAGCGTGCTGCAGAGCAGCGGCCTGTATAGCCTGAGCAG |
| CATGGTGACCGTGCCGAGCAGCCGCTGGCCGAGCGAAACCTTTACCTGCAACGTGGCGCATCCGGCGAGC |
| AAAACCAAAGTGGATAAACCGGTGCCGAAACGCGAAAACGGCCGCGTGCCGCGCCCGCCGGATTGCCCGA |
| AATGCCCGGCGCCGGAAATGCTGGGCGGCCCGAGCGTGTTTATTTTTCCGCCGAAACCGAAAGATACCCT |
| GCTGATTGCGCGCACCCCGGAAGTGACCTGCGTGGTGGTGGATCTGGATCCGGAAGATCCGGAAGTGCAG |
| ATTAGCTGGTTTGTGGATGGCAAACAGATGCAGACCGCGAAAACCCAGCCGCGCGAAGAACAGTTTAACG |
| GCACCTATCGCGTGGTGAGCGTGCTGCCGATTGGCCATCAGGATTGGCTGAAAGGCAAACAGTTTACCTG |
| CAAAGTGAACAACAAAGCGCTGCCGAGCCCGATTGAACGCACCATTAGCAAAGCGCGCGGCCAGGCGCAT |
| CAGCCGAGCGTGTATGTGCTGCCGCCGAGCCGCGAAGAACTGAGCAAAAACACCGTGAGCCTGACCTGCC |
| TGATTAAAGATTTTTTTCCGCCGGATATTGATGTGGAATGGCAGAGCAACGGCCAGCAGGAACCGGAAAG |
| CAAATATCGCACCACCCCGCCGCAGCTGGATGAAGATGGCAGCTATTTTCTGTATAGCAAACTGAGCGTG |
| GATAAAAGCCGCTGGCAGCGCGGCGATACCTTTATTTGCGCGGTGATGCATGAAGCGCTGCATAACCATT |
| ATACCCAGGAAAGCCTGAGCCATAGCCCGGGCAAA |

SEQ ID NO: 36: Caninized 3B10 heavy chain amino acid sequence (VH2)
EVQLVQSGAEVKKPGASVKVSCKASGYTFT<u>DYNMD</u>WVRQAPGASLDWIG<u>NINPNSESTSYNQKFKG</u>KATL TVDKSTSTAYMELSSLRAGDIAVYYCT<u>RDGNRYDAWFAY</u>WGQGTLVTVSSASTTAPSVFPLAPSCGSTSG

STVALACLVSGYFPEPVTVSWNSGSLTSGVHTFPSVLQSSGLYSLSSMVTVPSSRWPSETFTCNVAHPAS

KTKVDKPVPKRENGRVPRPPDCPKCPAPEMLGGPSVFIFPPKPKDTLLIARTPEVTCVVVDLDPEDPEVQ

ISWFVDGKQMQTAKTQPREEQFNGTYRVVSVLPIGHQDWLKGKQFTCKVNNKALPSPIERTISKARGQAH

QPSVYVLPPSREELSKNTVSLTCLIKDFFPPDIDVEWQSNGQQEPESKYRTTPPQLDEDGSYFLYSKLSV

DKSRWQRGDTFICAVMHEALHNHYTQESLSHSPGK

SEQ ID NO: 37: Caninized 3B10 heavy chain DNA (VH3)
GAAGTGCAGCTGGTGCAGAGCGGCGCGGAAGTGAAAAAACCGGGCGCGAGCGTGAAAGTGAGCTGCAAAG

CGAGCGGCTATACCTTTACCGATTATAACATGGATTGGGTGCGCCAGGCGCATGGCGCGAGCCTGGATTG

GATTGGCAACATTAACCCGAACAGCGAAAGCACCAGCTATAACCAGAAATTTAAAGGCAAAGCGACCCTG

ACCGTGGATAAAAGCACCAGCACCGCGTATATGGAACTGAGCAGCCTGCGCGCGGGCGATATTGCGGTGT

ATTATTGCACCCGCGATGGCAACCGCTATGATGCGTGGTTTGCGTATTGGGGCCAGGGCACCCTGGTGAC

CGTGAGCAGCGCGAGCACCACCGCGCCGAGCGTGTTTCCGCTGGCGCCGAGCTGCGGCAGCACCAGCGGC

AGCACCGTGGCGCTGGCGTGCCTGGTGAGCGGCTATTTTCCGGAACCGTGACCGTGAGCTGGAACAGCG

GCAGCCTGACCAGCGGCGTGCATACCTTTCCGAGCGTGCTGCAGAGCAGCGGCCTGTATAGCCTGAGCAG

CATGGTGACCGTGCCGAGCAGCCGCTGGCCGAGCGAAACCTTTACCTGCAACGTGGCGCATCCGGCGAGC

AAAACCAAAGTGGATAAACCGGTGCCGAAACGCGAAAACGGCCGCGTGCCGCGCCCGCCGGATTGCCCGA

AATGCCCGGCGCCGGAAATGCTGGGCGGCCCGAGCGTGTTTATTTTTCCGCCGAAACCGAAAGATACCCT

GCTGATTGCGCGCACCCCGGAAGTGACCTGCGTGGTGGTGGATCTGGATCCGGAAGATCCGGAAGTGCAG

ATTAGCTGGTTTGTGGATGGCAAACAGATGCAGACCGCGAAAACCCAGCCGCGCGAAGAACAGTTTAACG

GCACCTATCGCGTGGTGAGCGTGCTGCCGATTGGCCATCAGGATTGGCTGAAAGGCAAACAGTTTACCTG

CAAAGTGAACAACAAAGCGCTGCCGAGCCCGATTGAACGCACCATTAGCAAAGCGCGCGGCCAGGCGCAT

CAGCCGAGCGTGTATGTGCTGCCGCCGAGCCGCGAAGAACTGAGCAAAAACACCGTGAGCCTGACCTGCC

TGATTAAAGATTTTTTTCCGCCGGATATTGATGTGGAATGGCAGAGCAACGGCCAGCAGGAACCGGAAAG

CAAATATCGCACCACCCCGCCGCAGCTGGATGAAGATGGCAGCTATTTTCTGTATAGCAAACTGAGCGTG

GATAAAAGCCGCTGGCAGCGCGGCGATACCTTTATTTGCGCGGTGATGCATGAAGCGCTGCATAACCATT

ATACCCAGGAAAGCCTGAGCCATAGCCCGGGCAAA

SEQ ID NO: 38. Caninized 3B10 heavy chain amino acid sequence (VH3)
EVQLVQSGAEVKKPGASVKVSCKASGYTFT<u>DYNMD</u>WVRQAHGASLDWIG<u>NINPNSESTSYNQKFKG</u>KATL

TVDKSTSTAYMELSSLRAGDIAVYYCTR<u>DGNRYDAWFAY</u>WGQGTLVTVSSASTTAPSVFPLAPSCGSTSG

STVALACLVSGYFPEPVTVSWNSGSLTSGVHTFPSVLQSSGLYSLSSMVTVPSSRWPSETFTCNVAHPAS

KTKVDKPVPKRENGRVPRPPDCPKCPAPEMLGGPSVFIFPPKPKDTLLIARTPEVTCVVVDLDPEDPEVQ

ISWFVDGKQMQTAKTQPREEQFNGTYRVVSVLPIGHQDWLKGKQFTCKVNNKALPSPIERTISKARGQAH

QPSVYVLPPSREELSKNTVSLTCLIKDFFPPDIDVEWQSNGQQEPESKYRTTPPQLDEDGSYFLYSKLSV

DKSRWQRGDTFICAVMHEALHNHYTQESLSHSPGK

SEQ ID NO: 39: Caninized 3B10 heavy chain DNA (VH4)
GAAGTGCAGCTGCAGCAGAGCGGCGCGGAAGTGAAAAAACCGGGCGCGAGCGTGAAAGTGAGCTGCAAAG

CGAGCGGCTATACCTTTACCGATTATAACATGGATTGGGTGCGCCAGGCGCCGGGCGCGAGCCTGGATTG

GATTGGCAACATTAACCCGAACAGCGAAAGCACCAGCTATAACCAGAAATTTAAAGGCAAAGCGACCCTG

ACCGTGGATAAAAGCACCAGCACCGCGTATATGGAACTGCGCAGCCTGACCGCGGGCGATATTGCGGTGT

ATTATTGCACCCGCGATGGCAACCGCTATGATGCGTGGTTTGCGTATTGGGGCCAGGGCACCCTGGTGAC

CGTGAGCAGCGCGAGCACCACCGCGCCGAGCGTGTTTCCGCTGGCGCCGAGCTGCGGCAGCACCAGCGGC

AGCACCGTGGCGCTGGCGTGCCTGGTGAGCGGCTATTTTCCGGAACCGGTGACCGTGAGCTGGAACAGCG

GCAGCCTGACCAGCGGCGTGCATACCTTTCCGAGCGTGCTGCAGAGCAGCGGCCTGTATAGCCTGAGCAG

CATGGTGACCGTGCCGAGCAGCCGCTGGCCGAGCGAAACCTTTACCTGCAACGTGGCGCATCCGGCGAGC

AAAACCAAAGTGGATAAACCGGTGCCGAAACGCGAAAACGGCCGCGTGCCGCGCCCGCCGGATTGCCCGA

AATGCCCGGCGCCGGAAATGCTGGGCGGCCCGAGCGTGTTTATTTTTCCGCCGAAACCGAAAGATACCCT

GCTGATTGCGCGCACCCCGGAAGTGACCTGCGTGGTGGTGGATCTGGATCCGGAAGATCCGGAAGTGCAG

ATTAGCTGGTTTGTGGATGGCAAACAGATGCAGACCGCGAAAACCCAGCCGCGCGAAGAACAGTTTAACG

GCACCTATCGCGTGGTGAGCGTGCTGCCGATTGGCCATCAGGATTGGCTGAAAGGCAAACAGTTTACCTG

CAAAGTGAACAACAAAGCGCTGCCGAGCCCGATTGAACGCACCATTAGCAAAGCGCGCGGCCAGGCGCAT

CAGCCGAGCGTGTATGTGCTGCCGCCGAGCCGCGAAGAACTGAGCAAAAACACCGTGAGCCTGACCTGCC

TGATTAAAGATTTTTTTCCGCCGGATATTGATGTGGAATGGCAGAGCAACGGCCAGCAGGAACCGGAAAG

CAAATATCGCACCACCCCGCCGCAGCTGGATGAAGATGGCAGCTATTTTCTGTATAGCAAACTGAGCGTG

GATAAAAGCCGCTGGCAGCGCGGCGATACCTTTATTTGCGCGGTGATGCATGAAGCGCTGCATAACCATT

ATACCCAGGAAAGCCTGAGCCATAGCCCGGGCAAA

SEQ ID NO: 40: Caninized 3B10 heavy chain amino acid sequence (VH4)
EVQLQQSGAEVKKPGASVKVSCKASGYTFT<u>DYNMD</u>WVRQAPGASLDWIG<u>NINPNSESTSYNQKFKG</u>KATL

TVDKSTSTAYMELRSLTAGDIAVYYCTR<u>DGNRYDAWFAY</u>WGQGTLVTVSSASTTAPSVFPLAPSCGSTSG

STVALACLVSGYFPEPVTVSWNSGSLTSGVHTFPSVLQSSGLYSLSSMVTVPSSRWPSETFTCNVAHPAS

KTKVDKPVPKRENGRVPRPPDCPKCPAPEMLGGPSVFIFPPKPKDTLLIARTPEVTCVVVDLDPEDPEVQ

| SEQUENCES |
|---|
| ISWFVDGKQMQTAKTQPREEQFNGTYRVVSVLPIGHQDWLKGKQFTCKVNNKALPSPIERTISKARGQAH
QPSVYVLPPSREELSKNTVSLTCLIKDFFPPDIDVEWQSNGQQEPESKYRTTPPQLDEDGSYFLYSKLSV
DKSRWQRGDTFICAVMHEALHNHYTQESLSHSPGK

SEQ ID NO: 41: Caninized 3B10 light chain DNA (VL1)
GATATTGTGATGACCCAGACCCCGCTGAGCCTGAGCGTGAGCCCGGGCGAACCGGCGAGCATTAGCTGCA
GCGCGAGCAGCAGCGTGACCTATATGCATTGGTTTCGCCATAAACCGGGCCAGAGCCCGCAGAGCCTGAT
TTATAGCACCAGCATTCTGGCGAGCGGCGTGCCGGATCGCTTTAGCGGCAGCGGCAGCGGCACCGATTTT
ACCCTGAAAATTAGCCGCGTGGAAGCGGATGATGCGGGCGTGTATTATTGCCAGCAGCGCACCAGCTATC
CGCTGACCTTTGGCACCGGCACCAAACTGGAACTGAAACGCAACGATGCGCAGCCGGCGGTGTATCTGTT
TCAGCCGAGCCCGGATCAGCTGCATACCGGCAGCGCGAGCGTGGTGTGCCTGCTGAACAGCTTTTATCCG
AAAGATATTAACGTGAAATGGAAAGTGGATGGCGTGATTCAGGATACCGGCATTCAGGAAAGCGTGACCG
AACAGGATAGCAAAGATAGCACCTATAGCCTGAGCAGCACCCTGACCATGAGCAGCACCGAATATCTGAG
CCATGAACTGTATAGCTGCGAAATTACCCATAAAAGCCTGCCGAGCACCCTGATTAAAAGCTTTCAGCGC
AGCGAATGCCAGCGCGTGGAT SEQ ID NO: 42: Caninized 3B10 light chain amino acid sequence (VL1)
DIVMTQTPLSLSVSPGEPASISCS<u>ASSSVTYMH</u>WFRHKPGQSPQSLIY<u>STSILAS</u>GVPDRFSGSGSGTDF
TLKISRVEADDAGVYYC<u>QQRTSYPLT</u>FGTGTKLELKRNDAQPAVYLFQPSPDQLHTGSASVVCLLNSFYP
KDINVKWKVDGVIQDTGIQESVTEQDSKDSTYSLSSTLTMSSTEYLSHELYSCEITHKSLPSTLIKSFQR
SECQRVD SEQ ID NO: 43: Caninized 3B10 light chain DNA (VL2)
CAGATTGTGATGACCCAGACCCCGCTGAGCCTGAGCGTGAGCCCGGGCGAACCGGCGAGCATTAGCTGCA
GCGCGAGCAGCAGCGTGACCTATATGCATTGGTTTCAGCAGAAACCGGGCCAGAGCCCGCAGAGCCTGAT
TTATAGCACCAGCATTCTGGCGAGCGGCGTGCCGGATCGCTTTAGCGGCAGCGGCAGCGGCACCGATTTT
ACCCTGAAAATTAGCCGCGTGGAAGCGGATGATGCGGGCGTGTATTATTGCCAGCAGCGCACCAGCTATC
CGCTGACCTTTGGCACCGGCACCAAACTGGAACTGAAACGCAACGATGCGCAGCCGGCGGTGTATCTGTT
TCAGCCGAGCCCGGATCAGCTGCATACCGGCAGCGCGAGCGTGGTGTGCCTGCTGAACAGCTTTTATCCG
AAAGATATTAACGTGAAATGGAAAGTGGATGGCGTGATTCAGGATACCGGCATTCAGGAAAGCGTGACCG
AACAGGATAGCAAAGATAGCACCTATAGCCTGAGCAGCACCCTGACCATGAGCAGCACCGAATATCTGAG
CCATGAACTGTATAGCTGCGAAATTACCCATAAAAGCCTGCCGAGCACCCTGATTAAAAGCTTTCAGCGC
AGCGAATGCCAGCGCGTGGAT SEQ ID NO: 44: Caninized 3B10 light chain amino acids equence (VL2)
QIVMTQTPLSLSVSPGEPASISCS<u>ASSSVTYMH</u>WFQQKPGQSPQSLIY<u>STSILAS</u>GVPDRFSGSGSGTDF
TLKISRVEADDAGVYYC<u>QQRTSYPLT</u>FGTGTKLELKRNDAQPAVYLFQPSPDQLHTGSASVVCLLNSFYP
KDINVKWKVDGVIQDTGIQESVTEQDSKDSTYSLSSTLTMSSTEYLSHELYSCEITHKSLPSTLIKSFQR
SECQRVD SEQ ID NO: 45: Caninized 3B10 light chain DNA (VL3)
CAGATTGTGCTGACCCAGACCCCGCTGAGCCTGAGCGTGAGCCCGGGCGAACCGGCGAGCATTAGCTGCA
GCGCGAGCAGCAGCGTGACCTATATGCATTGGTTTCAGCAGAAACCGGGCCAGAGCCCGAAAAGCTGGAT
TTATAGCACCAGCATTCTGGCGAGCGGCGTGCCGGATCGCTTTAGCGGCAGCGGCAGCGGCACCGATTTT
ACCCTGAAAATTAGCCGCGTGGAAGCGGATGATGCGGGCGTGTATTATTGCCAGCAGCGCACCAGCTATC
CGCTGACCTTTGGCACCGGCACCAAACTGGAACTGAAACGCAACGATGCGCAGCCGGCGGTGTATCTGTT |

| SEQUENCES |
| --- |
| TCAGCCGAGCCCGGATCAGCTGCATACCGGCAGCGCGAGCGTGGTGTGCCTGCTGAACAGCTTTTATCCG
AAAGATATTAACGTGAAATGGAAAGTGGATGGCGTGATTCAGGATACCGGCATTCAGGAAAGCGTGACCG
AACAGGATAGCAAAGATAGCACCTATAGCCTGAGCAGCACCCTGACCATGAGCAGCACCGAATATCTGAG
CCATGAACTGTATAGCTGCGAAATTACCCATAAAAGCCTGCCGAGCACCCTGATTAAAAGCTTTCAGCGC
AGCGAATGCCAGCGCGTGGAT

SEQ ID NO: 46: Caninized 3B10 light chain amino acid sequence (VL3)
QIVLTQTPLSLSVSPGEPASISCS<u>SASSSVTYMH</u>WFQQKPGQSPKSWIY<u>STSILAS</u>GVPDRFSGSGSTDF
TLKISRVEADDAGVYYC<u>QQRTSYPLT</u>FGTGTKLELKRNDAQPAVYLFQPSPDQLHTGSASVVCLLNSFYP
KDINVKWKVDGVIQDTGIQESVTEQDSKDSTYSLSSTLTMSSTEYLSHELYSCEITHKSLPSTLIKSFQR
SECQRVD SEQ ID NO: 59: Caninized 3B10 heavy chain IgGBm DNA (VH1)
GAAGTGCAGCTGGTGCAGAGCGGCGCGGAAGTGAAAAAACCGGGCGCGAGCGTGAAAGTGAGCTGCAAAG
CGAGCGGCTATACCTTTACCGATTATAACATGGATTGGGTGCGCCAGGCGCCGGGCGCGGGCCTGGATTG
GATGGGCAACATTAACCCCGAACAGCGAAAGCACCAGCTATAACCAGAAATTTAAAGGCCGCGTGACCCTG
ACCGCGGATACCAGCACCAGCACCGCGTATATGGAACTGAGCAGCCTGCGCGCGGGCGATATTGCGGTGT
ATTATTGCACCCGCGATGGCAACCGCTATGATGCGTGGTTTGCGTATTGGGGCCAGGGCACCCTGGTGAC
CGTGAGCAGCGCGAGCACCACCGCGCCGAGCGTGTTTCCGCTGGCGCCGAGCTGCGGCAGCACCAGCGGC
AGCACCGTGGCGCTGGCGTGCCTGGTGAGCGGCTATTTTCCGGAACCGGTGACCGTGAGCTGGAACAGCG
GCAGCCTGACCAGCGGCGTGCATACCTTTCCGAGCGTGCTGCAGAGCAGCGGCCTGTATAGCCTGAGCAG
CATGGTGACCGTGCCGAGCAGCCGCTGGCCGAGCGAAACCTTTACCTGCAACGTGGCGCATCCGGCGAGC
AAAACCAAAGTGGATAAACCGGTGCCGAAACGCGAAAACGGCCGCGTGCCGCGCCCGCCGGATTGCCCGA
AATGCCCGGCGCCGGAAATGCTGGGCGGCCCGAGCGTGTTTATTTTTCCGCCGAAACCGAAAGATACCCT
GCTGATTGCGCGCACCCCGGAAGTGACCTGCGTGGTGGTGGCGCTGGATCCGGAAGATCCGGAAGTGCAG
ATTAGCTGGTTTGTGGATGGCAAACAGATGCAGACCGCGAAAACCCAGCCGCGCGAAGAACAGTTTGCCG
GCACCTATCGCGTGGTGAGCGTGCTGCCGATTGGCCATCAGGATTGGCTGAAAGGCAAACAGTTTACCTG
CAAAGTGAACAACAAAGCGCTGCCGAGCCCGATTGAACGCACCATTAGCAAAGCGCGCGGCCAGGCGCAT
CAGCCGAGCGTGTATGTGCTGCCGCCGAGCCGCGAAGAACTGAGCAAAAACACCGTGAGCCTGACCTGCC
TGATTAAAGATTTTTTTCCGCCGGATATTGATGTGGAATGGCAGAGCAACGGCCAGCAGGAACCGGAAAG
CAAATATCGCACCACCCCGCCGCAGCTGGATGAAGATGGCAGCTATTTTCTGTATAGCAAACTGAGCGTG
GATAAAAGCCGCTGGCAGCGCGGCGATACCTTTATTTGCGCGGTGATGCATGAAGCGCTGCATAACCATT
ATACCCAGGAAAGCCTGAGCCATAGCCCGGGCAAA SEQ ID NO: 60: Caninized 3B10 heavy chain IgGBm amino acid sequence
(VH1)
EVQLVQSGAEVKKPGASVKVSCKASGYTFT<u>DYNMD</u>WVRQAPGAGLDWMG<u>NINPNSESTSYNQKFKG</u>RVTL
TADTSTSTAYMELSSLRAGDIAVYYCTR<u>DGNRYDAWFAY</u>WGQGTLVTSSASTTAPSVFPLAPSCGSTSG
STVALACLVSGYFPEPVTVSWNSGSLTSGVHTFPSVLQSSGLYSLSSMVTVPSSRWPSETFTCNVAHPAS
KTKVDKPVPKRENGRVPRPPDCPKCPAPEMLGGPSVFIFPPKPKDTLLIARTPEVTCVVVALDPEDPEVQ
ISWFVDGKQMQTAKTQPREEQFAGTYRVVSVLPIGHQDWLKGKQFTCKVNNKALPSPIERTISKARGQAH
QPSVYVLPPSREELSKNTVSLTCLIKDFFPPDIDVEWQSNGQQEPESKYRTTPPQLDEDGSYFLYSKLSV
DKSRWQRGDTFICAVMHEALHNHYTQESLSHSPGK |

| SEQUENCES |
|---|
| SEQ ID NO: 61: Caninized 3B10 heavy chain IgGBm DNA (VH2)<br>GAAGTGCAGCTGGTGCAGAGCGGCGCGGAAGTGAAAAAACCGGGCGCGAGCGTGAAAGTGAGCTGCAAAG<br>CGAGCGGCTATACCTTTACCGATTATAACATGGATTGGGTGCGCCAGGCGCCGGGCGCGAGCCTGGATTG<br>GATTGGCAACATTAACCCGAACAGCGAAAGCACCAGCTATAACCAGAAATTTAAAGGCAAAGCGACCCTG<br>ACCGTGGATAAAAGCACCAGCACCGCGTATATGGAACTGAGCAGCCTGCGCGCGGGCGATATTGCGGTGT<br>ATTATTGCACCCGCGATGGCAACCGCTATGATGCGTGGTTTGCGTATTGGGGCCAGGGCACCCTGGTGAC<br>CGTGAGCAGCGCGAGCACCACCGCGCCGAGCGTGTTTCCGCTGGCGCCGAGCTGCGGCAGCACCAGCGGC<br>AGCACCGTGGCGCTGGCGTGCCTGGTGAGCGGCTATTTTCCGGAACCGTGACCGTGAGCTGGAACAGCG<br>GCAGCCTGACCAGCGGCGTGCATACCTTTCCGAGCGTGCTGCAGAGCAGCGGCCTGTATAGCCTGAGCAG<br>CATGGTGACCGTGCCGAGCAGCCGCTGGCCGAGCGAAACCTTTACCTGCAACGTGGCGCATCCGGCGAGC<br>AAAACCAAAGTGGATAAACCGGTGCCGAAACGCGAAAACGGCCGCGTGCCGCGCCCGCCGGATTGCCCGA<br>ATGCCCGGCGCCGAAATGCTGGGCGGCCCGAGCGTGTTTATTTTTCCGCCGAAACCGAAAGATACCCT<br>GCTGATTGCGCGCACCCCGGAAGTGACCTGCGTGGTGGTGGCGCTGGATCCGGAAGATCCGGAAGTGCAG<br>ATTAGCTGGTTTGTGGATGGCAAACAGATGCAGACCGCGAAAACCCAGCCGCGCGAAGAACAGTTTGCCG<br>GCACCTATCGCGTGGTGAGCGTGCTGCCGATTGGCCATCAGGATTGGCTGAAAGGCAAACAGTTTACCTG<br>CAAAGTGAACAACAAAGCGCTGCCGAGCCCGATTGAACGCACCATTAGCAAAGCGCGCGGCCAGGCGCAT<br>CAGCCGAGCGTGTATGTGCTGCCGCCGAGCCGCGAAGAACTGAGCAAAAACACCGTGAGCCTGACCTGCC<br>TGATTAAAGATTTTTTTCCGCCGGATATTGATGTGGAATGGCAGAGCAACGGCCAGCAGGAACCGGAAAG<br>CAAATATCGCACCACCCCGCCGCAGCTGGATGAAGATGGCAGCTATTTTCTGTATAGCAAACTGAGCGTG<br>GATAAAAGCCGCTGGCAGCGCGGCGATACCTTTATTTGCGCGGTGATGCATGAAGCGCTGCATAACCATT<br>ATACCCAGGAAAGCCTGAGCCATAGCCCGGGCAAA |
| SEQ ID NO: 62: Caninized 3B10 heavy chain IgGBm amino acid sequence (VH2)<br>EVQLVQSGAEVKKPGASVKVSCKASGYTFT<u>DYNMDW</u>VRQAPGASLDWIG<u>NINPNSESTSYNQKFKG</u>KATL<br>TVDKSTSTAYMELSSLRAGDIAVYYCT<u>RDGNRYDAWFAY</u>WGQGTLVTVSSASTTAPSVFPLAPSCGSTSG<br>STVALACLVSGYFPEPVTVSWNSGSLTSGVHTFPSVLQSSGLYSLSSMVTVPSSRWPSETFTCNVAHPAS<br>KTKVDKPVPKRENGRVPRPPDCPKCPAPEMLGGPSVFIFPPKPKDTLLIARTPEVTCVVVALDPEDPEVQ<br>ISWFVDGKQMQTAKTQPREEQFAGTYRVVSVLPIGHQDWLKGKQFTCKVNNKALPSPIERTISKARGQAH<br>QPSVYVLPPSREELSKNTVSLTCLIKDFFPPDIDVEWQSNGQQEPESKYRTTPPQLDEDGSYFLYSKLSV<br>DKSRWQRGDTFICAVMHEALHNHYTQESLSHSPGK |
| SEQ ID NO: 63: Caninized 3B10 heavy chain IgGBm DNA (VH3)<br>GAAGTGCAGCTGGTGCAGAGCGGCGCGGAAGTGAAAAAACCGGGCGCGAGCGTGAAAGTGAGCTGCAAAG<br>CGAGCGGCTATACCTTTACCGATTATAACATGGATTGGGTGCGCCAGGCGCATGGCGCGAGCCTGGATTG<br>GATTGGCAACATTAACCCGAACAGCGAAAGCACCAGCTATAACCAGAAATTTAAAGGCAAAGCGACCCTG<br>ACCGTGGATAAAAGCACCAGCACCGCGTATATGGAACTGAGCAGCCTGCGCGCGGGCGATATTGCGGTGT<br>ATTATTGCACCCGCGATGGCAACCGCTATGATGCGTGGTTTGCGTATTGGGGCCAGGGCACCCTGGTGAC<br>CGTGAGCAGCGCGAGCACCACCGCGCCGAGCGTGTTTCCGCTGGCGCCGAGCTGCGGCAGCACCAGCGGC<br>AGCACCGTGGCGCTGGCGTGCCTGGTGAGCGGCTATTTTCCGGAACCGTGACCGTGAGCTGGAACAGCG<br>GCAGCCTGACCAGCGGCGTGCATACCTTTCCGAGCGTGCTGCAGAGCAGCGGCCTGTATAGCCTGAGCAG<br>CATGGTGACCGTGCCGAGCAGCCGCTGGCCGAGCGAAACCTTTACCTGCAACGTGGCGCATCCGGCGAGC<br>AAAACCAAAGTGGATAAACCGGTGCCGAAACGCGAAAACGGCCGCGTGCCGCGCCCGCCGGATTGCCCGA |

| SEQUENCES |
|---|
| AATGCCCGGCGCCGGAAATGCTGGGCGGCCCGAGCGTGTTTATTTTTCCGCCGAAACCGAAAGATACCCT |
| GCTGATTGCGCGCACCCCGGAAGTGACCTGCGTGGTGGTGGCGCTGGATCCGGAAGATCCGGAAGTGCAG |
| ATTAGCTGGTTTGTGGATGGCAAACAGATGCAGACCGCGAAAACCCAGCCGCGCGAAGAACAGTTTGCCG |
| GCACCTATCGCGTGGTGAGCGTGCTGCCGATTGGCCATCAGGATTGGCTGAAAGGCAAACAGTTTACCTG |
| CAAAGTGAACAACAAAGCGCTGCCGAGCCCGATTGAACGCACCATTAGCAAAGCGCGCGGCCAGGCGCAT |
| CAGCCGAGCGTGTATGTGCTGCCGCCGAGCCGCGAAGAACTGAGCAAAAACACCGTGAGCCTGACCTGCC |
| TGATTAAAGATTTTTTTCCGCCGGATATTGATGTGGAATGGCAGAGCAACGGCCAGCAGGAACCGGAAAG |
| CAAATATCGCACCACCCCGCCGCAGCTGGATGAAGATGGCAGCTATTTTCTGTATAGCAAACTGAGCGTG |
| GATAAAAGCCGCTGGCAGCGCGGCGATACCTTTATTTGCGCGGTGATGCATGAAGCGCTGCATAACCATT |
| ATACCCAGGAAAGCCTGAGCCATAGCCCGGGCAAA |

SEQ ID NO: 64: Caninized 3B10 heavy chain IgGBm amino acid sequence (VH3)
**EVQLVQSGAEVKKPGASVKVSCKASGYTFT<u>DYNMD</u>WVRQAHGASLDWIG<u>NINPNSESTSYNQKFKG</u>KATL
TVDKSTSTAYMELSSLRAGDIAVYYCTR<u>DGNRYDAWFAY</u>WGQGTLVTVSS**ASTTAPSVFPLAPSCGSTSG
STVALACLVSGYFPEPVTVSWNSGSLTSGVHTFPSVLQSSGLYSLSSMVTVPSSRWPSETFTCNVAHPAS
KTKVDKPVPKRENGRVPRPPDCPKCPAPEMLGGPSVFIFPPKPKDTLLIARTPEVTCVVVALDPEDPEVQ
ISWFVDGKQMQTAKTQPREEQFAGTYRVVSVLPIGHQDWLKGKQFTCKVNNKALPSPIERTISKARGQAH
QPSVYVLPPSREELSKNTVSLTCLIKDFFPPDIDVEWQSNGQQEPESKYRTTPPQLDEDGSYFLYSKLSV
DKSRWQRGDTFICAVMHEALHNHYTQESLSHSPGK SEQ ID NO: 65: Caninized 3B10 heavy chain IgGBm DNA (VH4)
**GAAGTGCAGCTGCAGCAGAGCGGCGCGGAAGTGAAAAAACCGGGCGCGAGCGTGAAAGTGAGCTGCAAAG
CGAGCGGCTATACCTTTACCGATTATAACATGGATTGGGTGCGCCAGGCGCCGGGCGCGAGCCTGGATTG
GATTGGCAACATTAACCCGAACAGCGAAAGCACCAGCTATAACCAGAAATTTAAAGGCAAAGCGACCCTG
ACCGTGGATAAAAGCACCAGCACCGCGTATATGGAACTGCGCAGCCTGACCGCGGGCGATATTGCGGTGT
ATTATTGCACCCGCGATGGCAACCGCTATGATGCGTGGTTTGCGTATTGGGGCCAGGGCACCCTGGTGAC
CGTGAGCAGC**GCGAGCACCACCGCGCCGAGCGTGTTTCCGCTGGCGCCGAGCTGCGGCAGCACCAGCGGC
AGCACCGTGGCGCTGGCGTGCCTGGTGAGCGGCTATTTTCCGGAACCGGTGACCGTGAGCTGGAACAGCG
GCAGCCTGACCAGCGGCGTGCATACCTTTCCGAGCGTGCTGCAGAGCAGCGGCCTGTATAGCCTGAGCAG
CATGGTGACCGTGCCGAGCAGCCGCTGGCCGAGCGAAACCTTTACCTGCAACGTGGCGCATCCGGCGAGC
AAAACCAAAGTGGATAAACCGGTGCCGAAACGCGAAAACGGCCGCGTGCCGCGCCCGCCGGATTGCCCGA
ATGCCCGGCGCCGGAAATGCTGGGCGGCCCGAGCGTGTTTATTTTTCCGCCGAAACCGAAAGATACCCT
GCTGATTGCGCGCACCCCGGAAGTGACCTGCGTGGTGGTGGCGCTGGATCCGGAAGATCCGGAAGTGCAG
ATTAGCTGGTTTGTGGATGGCAAACAGATGCAGACCGCGAAAACCCAGCCGCGCGAAGAACAGTTTGCCG
GCACCTATCGCGTGGTGAGCGTGCTGCCGATTGGCCATCAGGATTGGCTGAAAGGCAAACAGTTTACCTG
CAAAGTGAACAACAAAGCGCTGCCGAGCCCGATTGAACGCACCATTAGCAAAGCGCGCGGCCAGGCGCAT
CAGCCGAGCGTGTATGTGCTGCCGCCGAGCCGCGAAGAACTGAGCAAAAACACCGTGAGCCTGACCTGCC
TGATTAAAGATTTTTTTCCGCCGGATATTGATGTGGAATGGCAGAGCAACGGCCAGCAGGAACCGGAAAG
CAAATATCGCACCACCCCGCCGCAGCTGGATGAAGATGGCAGCTATTTTCTGTATAGCAAACTGAGCGTG
GATAAAAGCCGCTGGCAGCGCGGCGATACCTTTATTTGCGCGGTGATGCATGAAGCGCTGCATAACCATT
ATACCCAGGAAAGCCTGAGCCATAGCCCGGGCAAA -continued

SEQUENCES

SEQ ID NO: 66: Caninized 3B10 heavy chain amino acid IgGBm sequence
(VH4)
EVQLQQSGAEVKKPGASVKVSCKASGYTFT<u>DYNMD</u>WVRQAPGASLDWIG<u>NINPNSESTSYNQKFKG</u>KATL

TVDKSTSTAYMELRSLTAGDIAVYYCTR<u>DGNRYDAWFAY</u>WGQGTLVTVSSASTTAPSVFPLAPSCGSTSG

STVALACLVSGYFPEPVTVSWNSGSLTSGVHTFPSVLQSSGLYSLSSMVTVPSSRWPSETFTCNVAHPAS

KTKVDKPVPKRENGRVPRPPDCPKCPAPEMLGGPSVFIFPPKPKDTLLIARTPEVTCVVVALDPEDPEVQ

ISWFVDGKQMQTAKTQPREEQFAGTYRVVSVLPIGHQDWLKGKQFTCKVNNKALPSPIERTISKARGQAH

QPSVYVLPPSREELSKNTVSLTCLIKDFFPPDIDVEWQSNGQQEPESKYRTTPPQLDEDGSYFLYSKLSV

DKSRWQRGDTFICAVMHEALHNHYTQESLSHSPGK

SEQ ID NO: 67: Canine CTLA-4 NA sequence (NCBI Reference Sequence:
NP_001003106).
ATGGCGGGCTTTGGCTTTCGCCGCCATGGCGCGCAGCCGGATCTGGCGAGCCGCACCTGGCCGTGCACCG

CGCTGTTTAGCCTGCTGTTTATTCCGGTGTTTAGCAAAGGCATGCATGTGGCGCAGCCGGCGGTGGTGCT

GGCGAGCAGCCGCGGCGTGGCGAGCTTTGTGTGCGAATATGGCAGCAGCGGCAACGCGGCGGAAGTGCGC

GTGACCGTGCTGCGCCAGGCGGGCAGCCAGATGACCGAAGTGTGCGCGGCGACCTATACCGTGGAAGATG

AACTGGCGTTTCTGGATGATAGCACCTGCACCGGCACCAGCAGCGGCAACAAAGTGAACCTGACCATTCA

GGGCCTGCGCGCGATGGATACCGGCCTGTATATTTGCAAAGTGGAACTGATGTATCCGCCGCCGTATTAT

GTGGGCATGGGCAACGGCACCCAGATTTATGTGATTGATCCGGAACCGTGCCCGGATAGCGATTTTCTGC

TGTGGATTCTGGCGGCGGTGAGCAGCGGCCTGTTTTTTTATAGCTTTCTGATTACCGCGGTGAGCCTGAG

CAAAATGCTGAAAAAACGCAGCCCGCTGACCACCGGCGTGTATGTGAAAATGCCGCCGACCGAACCGGAA

TGCGAAAAACAGTTTCAGCCGTATTTTATTCCGATTAAC

SEQ ID NO: 68: Canine CTLA-4 AA sequence (NCBI Reference Sequence:
NP_001003106).
MAGFGFRRHGAQPDLASRTWPCTALFSLLFIPVFSKGMHVAQPAVVLASSRGVASFVCEYGSSGNAAEVR

VTVLRQAGSQMTEVCAATYTVEDELAFLDDSTCTGTSSGNKVNLTIQGLRAMDTGLYICKVELMYPPPYY

VGMGNGTQIYVIDPEPCPDSDFLLWILAAVSSGLFFYSFLITAVSLSKMLKKRSPLTTGVYVKMPPTEPE

CEKQFQPYFIPIN

SEQ ID NO: 69: Genetically Modified cFc Region of canine IgGB
(From U.S. 10,106,107 B2)
LGGPSVFIFPPKPKDTLLIARTPEVTCVVVALDPEDPEVQISWFVDGKQMQTAKTQPREEQFAGTYRVVS

VLPIGHQDWLKGKQFTCKVNNKALPSPIERTISKARGQAHQPSVYVLPPSREELSKNTVSLTCLIKDFFP

PDIDVEWQSNGQQEPESKYRTTPPQLDEDGSYFLYSKLSVDKSRWQRGDTFICAVMHEALHNHYTQESLS

HSPGK

In all of the preceding nucleotide sequences the variable regions are in bold, whereas in the corresponding amino acid sequences, the sequences for the variable regions are in bold and the CDRs are both underlined and in bold.

We claim:

1. An isolated caninized antibody or antigen binding fragment thereof that specifically binds canine Cytotoxic T-Lymphocyte-Associated protein 4 (CTLA-4) comprising a canine IgG heavy chain and a canine light chain; wherein the canine light chain comprises three light chain complementary determining regions (CDRs): CDR light 1 (CDRL1), CDR light 2 (CDRL2), and CDR light 3 (CDRL3); and the canine IgG heavy chain comprises three heavy chain CDRs: CDR heavy 1 (CDRH1), CDR heavy 2 (CDRH2) and CDR heavy 3 (CDRH3):

(a) wherein CDRL1 comprises the amino acid sequence of SEQ ID NO: 54;
(b) wherein CDRL2 comprises the amino acid sequence of SEQ ID NO: 56;
(c) wherein CDRL3 comprises the amino acid sequence of SEQ ID NO: 58;
(d) wherein CDRH1 comprises the amino acid sequence of SEQ ID NO: 48;
(e) wherein CDRH2 comprises the amino acid sequence of SEQ ID NO: 50; and
(f) wherein CDRH3 comprises the amino acid sequence of SEQ ID NO: 52;
wherein the isolated caninized antibody or antigen binding fragment thereof blocks the binding of canine CTLA-4 with canine CD80, blocks the binding of canine CTLA-4 with canine CD86, or blocks binding of canine CTLA-4 with both canine CD80 and canine CD86.

2. The isolated caninized antibody or antigen binding fragment thereof of claim 1, wherein the canine IgG heavy chain comprises an amino acid sequence selected from the group consisting of SEQ ID NO: 60, SEQ ID NO: 62, SEQ ID NO: 64, and SEQ ID NO: 66.

3. An isolated nucleic acid that encodes the canine IgG heavy chain of the caninized antibody or antigen binding fragment thereof of claim 2.

4. An expression vector comprising the isolated nucleic acid of claim 3.

5. A host cell comprising the expression vector of claim 4.

6. The isolated caninized antibody or antigen binding fragment thereof of claim 2, wherein the canine light chain is a canine kappa light chain that comprises an amino acid sequence selected from the group consisting of SEQ ID NO: 42, and SEQ ID NO: 46.

7. An isolated nucleic acid that encodes the canine kappa light chain of the caninized antibody or antigen binding fragment thereof of claim 6.

8. An expression vector comprising the isolated nucleic acid of claim 7.

9. A host cell comprising the expression vector of claim 8.

10. A pharmaceutical composition comprising the caninized antibody or antigen binding fragment thereof of claim 6, and a pharmaceutically acceptable carrier or diluent.

11. A method of blocking the binding of canine CTLA-4 with canine CD80, blocking the binding of canine CTLA-4 with canine CD86, or blocking the binding of canine CTLA-4 with both canine CD80 and canine CD86 in a subject in need thereof, comprising administering to the subject a therapeutically effective amount of the pharmaceutical composition of claim 10; wherein the subject has cancer.

12. A method of blocking the binding of canine CTLA-4 with canine CD80, blocking the binding of canine CTLA-4 with canine CD86, or blocking the binding of canine CTLA-4 with both canine CD80 and canine CD86 in a subject in need thereof, comprising administering to the subject a therapeutically effective amount of the pharmaceutical composition of claim 10; wherein the subject has an infection or infectious disease.

13. A method of administering a therapeutically effective amount of the pharmaceutical composition of claim 10 to a canine subject.

14. The isolated caninized antibody or antigen binding fragment thereof of claim 1, wherein the canine IgG heavy chain comprises the amino acid sequence of SEQ ID NO: 62 and the canine kappa light chain comprises the amino acid sequence of SEQ ID NO: 46.

15. A pharmaceutical composition comprising the caninized antibody or antigen binding fragment thereof of claim 14, and a pharmaceutically acceptable carrier or diluent.

16. A method of blocking the binding of canine CTLA-4 with canine CD80, blocking the binding of canine CTLA-4 with canine CD86, or blocking the binding of canine CTLA-4 with both canine CD80 and canine CD86 in a subject in need thereof, comprising administering to the subject a therapeutically effective amount of the pharmaceutical composition of claim 15; wherein the subject has cancer.

17. A method of blocking the binding of canine CTLA-4 with canine CD80, blocking the binding of canine CTLA-4 with canine CD86, or blocking the binding of canine CTLA-4 with both canine CD80 and canine CD86 in a subject in need thereof, comprising administering to the subject a therapeutically effective amount of the pharmaceutical composition of claim 15; wherein the subject has an infection or infectious disease.

18. A method of administering a therapeutically effective amount of the pharmaceutical composition of claim 15 to a canine subject.

19. A pharmaceutical composition comprising the caninized antibody or antigen binding fragment thereof of claim 1, and a pharmaceutically acceptable carrier or diluent.

20. A method of blocking the binding of canine CTLA-4 with canine CD80, blocking the binding of canine CTLA-4 with canine CD86, or blocking the binding of canine CTLA-4 with both canine CD80 and canine CD86 in a subject in need thereof, comprising administering to the subject a therapeutically effective amount of the pharmaceutical composition of claim 19; wherein the subject has cancer.

21. A method of blocking the binding of canine CTLA-4 with canine CD80, blocking the binding of canine CTLA-4 with canine CD86, or blocking the binding of canine CTLA-4 with both canine CD80 and canine CD86 in a subject in need thereof, comprising administering to the subject a therapeutically effective amount of the pharmaceutical composition of claim 19; wherein the subject has an infection or infectious disease.

22. A method of administering a therapeutically effective amount of the pharmaceutical composition of claim 19 to a canine subject.

23. A method of producing a caninized antibody that specifically binds CTLA-4 comprising:
a. culturing host cells that comprise
(i) an expression vector comprising a first nucleic acid encoding a canine IgG heavy chain comprising an amino acid sequence selected from the group consisting of SEQ ID NO: 60, SEQ ID NO: 62, SEQ ID NO: 64, and SEQ ID NO: 66 in a culture medium under conditions wherein the first nucleic acid is expressed, thereby producing a polypeptide that comprises the IgG heavy chain; and
(ii) an expression vector comprising a second nucleic acid encoding a canine kappa light chain that comprises an amino acid sequence selected from the group consisting of SEQ ID NO: 42, and SEQ ID NO: 46 in the culture medium under conditions wherein the second nucleic acid is expressed, thereby producing a polypeptide that comprises the canine kappa light chain; and b. recovering the caninized antibody from the host cells, the culture medium, or both the host cells and the culture medium.

\* \* \* \* \*

SEQUENCE LISTING

<160> NUMBER OF SEQ ID NOS: 69

<210> SEQ ID NO 1
<211> LENGTH: 1362
<212> TYPE: DNA
<213> ORGANISM: Artificial Sequence
<220> FEATURE:
<223> OTHER INFORMATION: murine-canine chimera

<400> SEQUENCE: 1

```
gaagtgcagc tgcagcagtt tggcgcggaa ctggtgaaac cgggcgcgag cgtgaaaatg      60
agctgcaaag cgagcggcta ccctttacc gattataaca tggattgggt gcgccagagc     120
ggcaaaagcc tggaatggat tggcaacatt aacccgaaca gcgaaagcac cagctataac     180
cagaaattta aaggcaaagc gaccctgacc gtggataaaa gcagcagcac cgcgtatatg     240
gaactgcgca gcctgaccag cgatgatacc gcggtgtatt attgcacccg cgatggcaac     300
cgctatgatg cgtggtttgc gtattggggc cagggcaccc tggtgaccgt gagcagcgcg     360
agcaccaccg cgccgagcgt gtttccgctg cgcgccagct cgggcagcac cagcggcagc     420
accgtggcgc tggcgtgcct ggtgagcggc tattttccgg aaccggtgac cgtgagctgg     480
aacagcggca gcctgaccag cggcgtgcat acctttccga gcgtgctgca gagcagcggc     540
ctgtatagcc tgagcagcat ggtgaccgtg ccgagcagcc gctggccgag cgaaacctttt    600
acctgcaacg tggcgcatcc ggcgagcaaa accaaagtgg ataaaccggt gccgaaacgc     660
gaaaacggcc gcgtgccgcg cccgccggat tgcccgaaat gccggcgcc ggaaatgctg      720
ggcggcccga gcgtgtttat ttttccgccg aaaccgaaag ataccctgct gattgcgcgc     780
accccggaag tgacctgcgt ggtggtggcg ctggatccgg aagatccgga agtgcagatt     840
agctggtttg tggatggcaa acagatgcag accgcgaaaa cccagccgcg cgaagaacag     900
tttgcgggca cctatcgcgt ggtgagcgtg ctgccgattg ccatcagga ttggctgaaa      960
ggcaaacagt ttacctgcaa agtgaacaac aaagcgctgc cgagcccgat tgaacgcacc    1020
attagcaaag cgcgcggcca ggcgcatcag ccgagcgtgt atgtgctgcc gccgagccgc    1080
gaagaactga gcaaaaacac cgtgagcctg acctgctga ttaaagattt ttttccgccg     1140
gatattgatg tggaatggca gagcaacggc cagcaggaac cggaaagcaa atatcgcacc    1200
accccgccgc agctggatga agatggcagc tattttctgt atagcaaact gagcgtggat    1260
aaaagccgct ggcagcgcgg cgatacctttt atttgcgcgg tgatgcatga agcgctgcat    1320
aaccattata cccaggaaag cctgagccat agcccgggca aa                       1362
```

<210> SEQ ID NO 2
<211> LENGTH: 454
<212> TYPE: PRT
<213> ORGANISM: Artificial Sequence
<220> FEATURE:
<223> OTHER INFORMATION: murine-canine chimera

<400> SEQUENCE: 2

```
Glu Val Gln Leu Gln Gln Phe Gly Ala Glu Leu Val Lys Pro Gly Ala
1               5                   10                  15

Ser Val Lys Met Ser Cys Lys Ala Ser Gly Tyr Thr Phe Thr Asp Tyr
            20                  25                  30

Asn Met Asp Trp Val Arg Gln Ser Gly Lys Ser Leu Glu Trp Ile Gly
        35                  40                  45

Asn Ile Asn Pro Asn Ser Glu Ser Thr Ser Tyr Asn Gln Lys Phe Lys
    50                  55                  60

Gly Lys Ala Thr Leu Thr Val Asp Lys Ser Ser Ser Thr Ala Tyr Met
65                  70                  75                  80

Glu Leu Arg Ser Leu Thr Ser Asp Asp Thr Ala Val Tyr Tyr Cys Thr
                85                  90                  95

Arg Asp Gly Asn Arg Tyr Asp Ala Trp Phe Ala Tyr Trp Gly Gln Gly
            100                 105                 110
```

-continued

```
Thr Leu Val Thr Val Ser Ser Ala Ser Thr Thr Ala Pro Ser Val Phe
            115                 120                 125

Pro Leu Ala Pro Ser Cys Gly Ser Thr Ser Gly Ser Thr Val Ala Leu
130                 135                 140

Ala Cys Leu Val Ser Gly Tyr Phe Pro Glu Pro Val Thr Val Ser Trp
145                 150                 155                 160

Asn Ser Gly Ser Leu Thr Ser Gly Val His Thr Phe Pro Ser Val Leu
                165                 170                 175

Gln Ser Ser Gly Leu Tyr Ser Leu Ser Ser Met Val Thr Val Pro Ser
            180                 185                 190

Ser Arg Trp Pro Ser Glu Thr Phe Thr Cys Asn Val Ala His Pro Ala
        195                 200                 205

Ser Lys Thr Lys Val Asp Lys Pro Val Pro Lys Arg Glu Asn Gly Arg
    210                 215                 220

Val Pro Arg Pro Pro Asp Cys Pro Lys Cys Pro Ala Pro Glu Met Leu
225                 230                 235                 240

Gly Gly Pro Ser Val Phe Ile Phe Pro Pro Lys Pro Lys Asp Thr Leu
                245                 250                 255

Leu Ile Ala Arg Thr Pro Glu Val Thr Cys Val Val Val Ala Leu Asp
            260                 265                 270

Pro Glu Asp Pro Glu Val Gln Ile Ser Trp Phe Val Asp Gly Lys Gln
        275                 280                 285

Met Gln Thr Ala Lys Thr Gln Pro Arg Glu Glu Gln Phe Ala Gly Thr
    290                 295                 300

Tyr Arg Val Val Ser Val Leu Pro Ile Gly His Gln Asp Trp Leu Lys
305                 310                 315                 320

Gly Lys Gln Phe Thr Cys Lys Val Asn Asn Lys Ala Leu Pro Ser Pro
                325                 330                 335

Ile Glu Arg Thr Ile Ser Lys Ala Arg Gly Gln Ala His Gln Pro Ser
            340                 345                 350

Val Tyr Val Leu Pro Pro Ser Arg Glu Glu Leu Ser Lys Asn Thr Val
        355                 360                 365

Ser Leu Thr Cys Leu Ile Lys Asp Phe Phe Pro Pro Asp Ile Asp Val
    370                 375                 380

Glu Trp Gln Ser Asn Gly Gln Gln Glu Pro Glu Ser Lys Tyr Arg Thr
385                 390                 395                 400

Thr Pro Pro Gln Leu Asp Glu Asp Gly Ser Tyr Phe Leu Tyr Ser Lys
                405                 410                 415

Leu Ser Val Asp Lys Ser Arg Trp Gln Arg Gly Asp Thr Phe Ile Cys
            420                 425                 430

Ala Val Met His Glu Ala Leu His Asn His Tyr Thr Gln Glu Ser Leu
        435                 440                 445

Ser His Ser Pro Gly Lys
    450

<210> SEQ ID NO 3
<211> LENGTH: 651
<212> TYPE: DNA
<213> ORGANISM: Artificial Sequence
<220> FEATURE:
<223> OTHER INFORMATION: murine-canine chimera

<400> SEQUENCE: 3
cagattgtgc tgacccagag cccggcgatt atgagcgcga gcccgggcga aaaagtgacc      60
atgacctgca gcgcgagcag cagcgtgacc tatatgcatt ggtttcagca gaaaccgggc     120
```

```
accagcccga aactgtggat ttatagcacc agcattctgg cgagcggcgt gccggcgcgc      180
tttagcggca gcggcagcgg caccagctat agcctgacca ttagccgcat ggaagcggaa      240
gatgcggcga cctattattg ccagcagcgc accagctatc cgctgacctt tggcaccggc      300
accaaactgg aactgaaacg caacgatgcg cagccggcgg tgtatctgtt tcagccgagc      360
ccggatcagc tgcataccgg cagcgcgagc gtggtgtgcc tgctgaacag ctttatccg      420 aaagatatta cgtgaaatg gaaagtggat ggcgtgattc aggataccgg cattcaggaa      480
agcgtgaccg aacaggatag caaagatagc acctatagcc tgagcagcac cctgaccatg      540
agcagcaccg aatatctgag ccatgaactg tatagctgcg aaattaccca taaaagcctg      600
ccgagcaccc tgattaaaag cttccagcgc agcgaatgcc agcgcgtgga t              651
```

```
<210> SEQ ID NO 4
<211> LENGTH: 217
<212> TYPE: PRT
<213> ORGANISM: Artificial Sequence
<220> FEATURE:
<223> OTHER INFORMATION: murine-canine chimera

<400> SEQUENCE: 4
```

Gln Ile Val Leu Thr Gln Ser Pro Ala Ile Met Ser Ala Ser Pro Gly
1               5                   10                  15

Glu Lys Val Thr Met Thr Cys Ser Ala Ser Ser Val Thr Tyr Met
            20                  25                  30

His Trp Phe Gln Gln Lys Pro Gly Thr Ser Pro Lys Leu Trp Ile Tyr
        35                  40                  45

Ser Thr Ser Ile Leu Ala Ser Gly Val Pro Ala Arg Phe Ser Gly Ser
    50                  55                  60

Gly Ser Gly Thr Ser Tyr Ser Leu Thr Ile Ser Arg Met Glu Ala Glu
65                  70                  75                  80

Asp Ala Ala Thr Tyr Tyr Cys Gln Gln Arg Thr Ser Tyr Pro Leu Thr
                85                  90                  95

Phe Gly Thr Gly Thr Lys Leu Glu Leu Lys Arg Asn Asp Ala Gln Pro
            100                 105                 110

Ala Val Tyr Leu Phe Gln Pro Ser Pro Asp Gln Leu His Thr Gly Ser
        115                 120                 125

Ala Ser Val Val Cys Leu Leu Asn Ser Phe Tyr Pro Lys Asp Ile Asn
    130                 135                 140

Val Lys Trp Lys Val Asp Gly Val Ile Gln Asp Thr Gly Ile Gln Glu
145                 150                 155                 160

Ser Val Thr Glu Gln Asp Ser Lys Asp Ser Thr Tyr Ser Leu Ser Ser
                165                 170                 175

Thr Leu Thr Met Ser Ser Thr Glu Tyr Leu Ser His Glu Leu Tyr Ser
            180                 185                 190

Cys Glu Ile Thr His Lys Ser Leu Pro Ser Thr Leu Ile Lys Ser Phe
        195                 200                 205

Gln Arg Ser Glu Cys Gln Arg Val Asp
    210                 215

```
<210> SEQ ID NO 5
<211> LENGTH: 1350
<212> TYPE: DNA
<213> ORGANISM: Artificial Sequence
<220> FEATURE:
<223> OTHER INFORMATION: murine-canine chimera
```

<400> SEQUENCE: 5

```
caggtgcagc tgcagcagag cggcgatgat ctggtgaaac cgggcgcgag cgtgaaactg      60
agctgcaaag cgagcggcta cctttacc agctattgga ttaactggat taaacagcgc     120
ccgggccagg gcctggaatg gattggccgc attgcgccgg gcagcggcac cacctattat     180
aacgaagtgt ttaaaggcaa agcgaccctg accgtggata atatagcag caccgcgtat     240
attcagctga gcagcctgag cagcgaagat agcgcggtgt attttgcgc gcgcggcgat     300
tatggcagct attggggcca gggcaccctg gtgaccgtga gcgcgcgag caccaccgcg     360
ccgagcgtgt ttccgctggc gccgagctgc ggcagcacca gcggcagcac cgtggcgctg     420
gcgtgcctgg tgagcggcta ttttccggaa ccggtgaccg tgagctggaa cagcggcagc     480
ctgaccagcg gcgtgcatac cttccgagc gtgctgcaga gcagcggcct gtatagcctg     540
agcagcatgg tgaccgtgcc gagcagccgc tggccgagcg aaacctttac ctgcaacgtg     600
gcgcatccgg cgagcaaaac caaagtggat aaaccggtgc cgaaacgcga aaacggccgc     660
gtgccgcgcc cgccggattg cccgaaatgc ccggcgccgg aaatgctggg cggcccgagc     720
gtgtttattt ttccgccgaa accgaaagat accctgctga ttgcgcgcac cccggaagtg     780
acctgcgtgg tggtggcgct ggatccggaa gatccggaag tgcagattag ctggtttgtg     840
gatggcaaac agatgcagac cgcgaaaacc cagccgcgcg aagaacagtt tgcgggcacc     900
tatcgcgtgt gagcgtgct gccgattggc catcaggatt ggctgaaagg caaacagttt     960
acctgcaaag tgaacaacaa agcgctgccg agccgattg aacgcaccat tagcaaagcg    1020
cgcggccagg cgcatcagcc gagcgtgtat gtgctgccgc cgagccgcga agaactgagc    1080
aaaaacaccg tgagcctgac ctgcctgatt aaagattttt ttccgccgga tattgatgtg    1140
gaatggcaga gcaacggcca gcaggaaccg gaaagcaaat atcgcaccac cccgccgcag    1200
ctggatgaag atggcagcta ttttctgtat agcaaactga gcgtggataa aagccgctgg    1260
cagcgcggcg atacctttat ttgcgcggtg atgcatgaag cgctgcataa ccattatacc    1320
caggaaagcc tgagccatag cccgggcaaa                                    1350
```

<210> SEQ ID NO 6
<211> LENGTH: 450
<212> TYPE: PRT
<213> ORGANISM: Artificial Sequence
<220> FEATURE:
<223> OTHER INFORMATION: murine-canine chimera

<400> SEQUENCE: 6

```
Gln Val Gln Leu Gln Gln Ser Gly Asp Asp Leu Val Lys Pro Gly Ala
1               5                   10                  15

Ser Val Lys Leu Ser Cys Lys Ala Ser Gly Tyr Thr Phe Thr Ser Tyr
            20                  25                  30

Trp Ile Asn Trp Ile Lys Gln Arg Pro Gly Gln Gly Leu Glu Trp Ile
        35                  40                  45

Gly Arg Ile Ala Pro Gly Ser Gly Thr Thr Tyr Tyr Asn Glu Val Phe
    50                  55                  60

Lys Gly Lys Ala Thr Leu Thr Val Asp Lys Tyr Ser Ser Thr Ala Tyr
65                  70                  75                  80

Ile Gln Leu Ser Ser Leu Ser Ser Glu Asp Ser Ala Val Tyr Phe Cys
                85                  90                  95

Ala Arg Gly Asp Tyr Gly Ser Tyr Trp Gly Gln Gly Thr Leu Val Thr
            100                 105                 110
```

```
Val Ser Ser Ala Ser Thr Thr Ala Pro Ser Val Phe Pro Leu Ala Pro
            115                 120                 125

Ser Cys Gly Ser Thr Ser Gly Ser Thr Val Ala Leu Ala Cys Leu Val
    130                 135                 140

Ser Gly Tyr Phe Pro Glu Pro Val Thr Val Ser Trp Asn Ser Gly Ser
145                 150                 155                 160

Leu Thr Ser Gly Val His Thr Phe Pro Ser Val Leu Gln Ser Ser Gly
                165                 170                 175

Leu Tyr Ser Leu Ser Ser Met Val Thr Val Pro Ser Ser Arg Trp Pro
            180                 185                 190

Ser Glu Thr Phe Thr Cys Asn Val Ala His Pro Ala Ser Lys Thr Lys
            195                 200                 205

Val Asp Lys Pro Val Pro Lys Arg Glu Asn Gly Arg Val Pro Arg Pro
    210                 215                 220

Pro Asp Cys Pro Lys Cys Pro Ala Pro Glu Met Leu Gly Gly Pro Ser
225                 230                 235                 240

Val Phe Ile Phe Pro Pro Lys Pro Lys Asp Thr Leu Leu Ile Ala Arg
                245                 250                 255

Thr Pro Glu Val Thr Cys Val Val Val Ala Leu Asp Pro Glu Asp Pro
            260                 265                 270

Glu Val Gln Ile Ser Trp Phe Val Asp Gly Lys Gln Met Gln Thr Ala
            275                 280                 285

Lys Thr Gln Pro Arg Glu Glu Gln Phe Ala Gly Thr Tyr Arg Val Val
    290                 295                 300

Ser Val Leu Pro Ile Gly His Gln Asp Trp Leu Lys Gly Lys Gln Phe
305                 310                 315                 320

Thr Cys Lys Val Asn Asn Lys Ala Leu Pro Ser Pro Ile Glu Arg Thr
                325                 330                 335

Ile Ser Lys Ala Arg Gly Gln Ala His Gln Pro Ser Val Tyr Val Leu
            340                 345                 350

Pro Pro Ser Arg Glu Glu Leu Ser Lys Asn Thr Val Ser Leu Thr Cys
            355                 360                 365

Leu Ile Lys Asp Phe Phe Pro Pro Asp Ile Asp Val Glu Trp Gln Ser
    370                 375                 380

Asn Gly Gln Gln Glu Pro Glu Ser Lys Tyr Arg Thr Thr Pro Pro Gln
385                 390                 395                 400

Leu Asp Glu Asp Gly Ser Tyr Phe Leu Tyr Ser Lys Leu Ser Val Asp
                405                 410                 415

Lys Ser Arg Trp Gln Arg Gly Asp Thr Phe Ile Cys Ala Val Met His
            420                 425                 430

Glu Ala Leu His Asn His Tyr Thr Gln Glu Ser Leu Ser His Ser Pro
            435                 440                 445

Gly Lys
    450

<210> SEQ ID NO 7
<211> LENGTH: 651
<212> TYPE: DNA
<213> ORGANISM: Artificial Sequence
<220> FEATURE:
<223> OTHER INFORMATION: murine-canine chimera

<400> SEQUENCE: 7
cagattgtgc tgacccagag cccggcgatt atgagcgcga gcccgggcga aaaagtgacc      60
atgacctgca gcgcgagcag cagcattagc tatatgcatt ggtttcagca gaaaccgggc     120
```

```
accagcccga aacgctggat ttatgatacc agcaaactgg cgagcggcgt gccggcgcgc      180
tttagcggca gcggcagcgg caccagctat agcctgacca ttaacagcat ggaagcggaa      240
gatgcggcga cctattattg ccatcagcgc accagctatc cgctgacctt tggcgcgggc      300
accaaactgg aactgaaacg caacgatgcg cagccggcgg tgtatctgtt tcagccgagc      360
ccggatcagc tgcataccgg cagcgcgagc gtggtgtgcc tgctgaacag ctttttatccg     420 aaagatatta acgtgaaatg gaaagtggat ggcgtgattc aggataccgg cattcaggaa      480
agcgtgaccg aacaggatag caaagatagc acctatagcc tgagcagcac cctgaccatg      540
agcagcaccg aatatctgag ccatgaactg tatagctgcg aaattaccca taaaagcctg      600
ccgagcaccc tgattaaaag ctttcagcgc agcgaatgcc agcgcgtgga t                651
```

```
<210> SEQ ID NO 8
<211> LENGTH: 217
<212> TYPE: PRT
<213> ORGANISM: Artificial Sequence
<220> FEATURE:
<223> OTHER INFORMATION: murine-canine chimera

<400> SEQUENCE: 8
```

Gln Ile Val Leu Thr Gln Ser Pro Ala Ile Met Ser Ala Ser Pro Gly
1               5                  10                  15

Glu Lys Val Thr Met Thr Cys Ser Ala Ser Ser Ile Ser Tyr Met
            20                  25                  30

His Trp Phe Gln Gln Lys Pro Gly Thr Ser Pro Lys Arg Trp Ile Tyr
        35                  40                  45

Asp Thr Ser Lys Leu Ala Ser Gly Val Pro Ala Arg Phe Ser Gly Ser
    50                  55                  60

Gly Ser Gly Thr Ser Tyr Ser Leu Thr Ile Asn Ser Met Glu Ala Glu
65                  70                  75                  80

Asp Ala Ala Thr Tyr Tyr Cys His Gln Arg Thr Ser Tyr Pro Leu Thr
                85                  90                  95

Phe Gly Ala Gly Thr Lys Leu Glu Leu Lys Arg Asn Asp Ala Gln Pro
            100                 105                 110

Ala Val Tyr Leu Phe Gln Pro Ser Pro Asp Gln Leu His Thr Gly Ser
        115                 120                 125

Ala Ser Val Val Cys Leu Leu Asn Ser Phe Tyr Pro Lys Asp Ile Asn
    130                 135                 140

Val Lys Trp Lys Val Asp Gly Val Ile Gln Asp Thr Gly Ile Gln Glu
145                 150                 155                 160

Ser Val Thr Glu Gln Asp Ser Lys Asp Ser Thr Tyr Ser Leu Ser Ser
                165                 170                 175

Thr Leu Thr Met Ser Ser Thr Glu Tyr Leu Ser His Glu Leu Tyr Ser
            180                 185                 190

Cys Glu Ile Thr His Lys Ser Leu Pro Ser Thr Leu Ile Lys Ser Phe
        195                 200                 205

Gln Arg Ser Glu Cys Gln Arg Val Asp
    210                 215

```
<210> SEQ ID NO 9
<211> LENGTH: 1359
<212> TYPE: DNA
<213> ORGANISM: Artificial Sequence
<220> FEATURE:
<223> OTHER INFORMATION: human-canine chimera
```

<400> SEQUENCE: 9

```
caggtgcagc tggtggaaag cggcggcggc gtggtgcagc cgggccgcag cctgcgcctg    60
agctgcgtgg cgagcggctt tacctttagc agccatggca tgcattgggt gcgccaggcg   120
ccgggcaaag gcctggaatg ggtggcggtg atttggtatg atggccgcaa caaatattat   180
gcggatagcg tgaaaggccg ctttaccatt agccgcgata cagcaaaaa caccctgttt   240
ctgcagatga acagcctgcg cgcggaagat accgcggtgt attattgcgc gcgcggcggc   300
cattttggcc cgtttgatta ttggggccag ggcaccctgg tgaccgtgag cagcgcgagc   360
accaccgcgc cgagcgtgtt tccgctggcg ccgagctgcg gcagcaccag cggcagcacc   420
gtggcgctgg cgtgcctggt gagcggctat tttccggaac cggtgaccgt gagctggaac   480
agcggcagcc tgaccagcgg cgtgcatacc tttccgagcg tgctgcagag cagcggcctg   540
tatagcctga gcagcatggt gaccgtgccg agcagccgct ggccgagcga aacctttacc   600
tgcaacgtgg cgcatccggc gagcaaaacc aaagtggata aaccggtgcc gaaacgcgaa   660
aacggccgcg tgccgcgccc gccggattgc ccgaaatgcc cggcgccgga aatgctgggc   720
ggcccgagcg tgtttatttt tccgccgaaa ccgaaagata ccctgctgat tgcgcgcacc   780
ccggaagtga cctgcgtggt ggtggcgctg atccggaag atccggaagt gcagattagc   840
tggtttgtgg atggcaaaca gatgcagacc gcgaaaccc agccgcgcga gaacagtttt   900
gcgggcacct atcgcgtggt gagcgtgctg ccgattggcc atcaggattg gctgaaaggc   960
aaacagttta cctgcaaagt gaacaacaaa gcgctgccga gcccgattga acgcaccatt  1020
agcaaagcgc gcgccaggc gcatcagccg agcgtgtatg tgctgccgcc gagccgcgaa  1080
gaactgagca aaaacaccgt gagcctgacc tgcctgatta agatttttt tccgccggat  1140
attgatgtgg aatggcagag caacggccag caggaaccgg aaagcaaata tcgcaccacc  1200
ccgccgcagc tggatgaaga tggcagctat tttctgtata gcaaactgag cgtggataaa  1260
agccgctggc agcgcggcga tacctttatt tgcgcggtga tgcatgaagc gctgcataac  1320
cattataccc aggaaagcct gagccatagc ccgggcaaa                          1359
```

<210> SEQ ID NO 10
<211> LENGTH: 453
<212> TYPE: PRT
<213> ORGANISM: Artificial Sequence
<220> FEATURE:
<223> OTHER INFORMATION: human-canine chimera

<400> SEQUENCE: 10

```
Gln Val Gln Leu Val Glu Ser Gly Gly Gly Val Val Gln Pro Gly Arg
1               5                   10                  15

Ser Leu Arg Leu Ser Cys Val Ala Ser Gly Phe Thr Phe Ser Ser His
            20                  25                  30

Gly Met His Trp Val Arg Gln Ala Pro Gly Lys Gly Leu Glu Trp Val
        35                  40                  45

Ala Val Ile Trp Tyr Asp Gly Arg Asn Lys Tyr Ala Asp Ser Val
    50                  55                  60

Lys Gly Arg Phe Thr Ile Ser Arg Asp Asn Ser Lys Asn Thr Leu Phe
65                  70                  75                  80

Leu Gln Met Asn Ser Leu Arg Ala Glu Asp Thr Ala Val Tyr Tyr Cys
                85                  90                  95

Ala Arg Gly Gly His Phe Gly Pro Phe Asp Tyr Trp Gly Gln Gly Thr
            100                 105                 110
```

Leu Val Thr Val Ser Ser Ala Ser Thr Thr Ala Pro Ser Val Phe Pro
            115                 120                 125

Leu Ala Pro Ser Cys Gly Ser Thr Ser Gly Ser Thr Val Ala Leu Ala
130                 135                 140

Cys Leu Val Ser Gly Tyr Phe Pro Glu Pro Val Thr Val Ser Trp Asn
145                 150                 155                 160

Ser Gly Ser Leu Thr Ser Gly Val His Thr Phe Pro Ser Val Leu Gln
                165                 170                 175

Ser Ser Gly Leu Tyr Ser Leu Ser Ser Met Val Thr Val Pro Ser Ser
            180                 185                 190

Arg Trp Pro Ser Glu Thr Phe Thr Cys Asn Val Ala His Pro Ala Ser
            195                 200                 205

Lys Thr Lys Val Asp Lys Pro Val Pro Lys Arg Glu Asn Gly Arg Val
    210                 215                 220

Pro Arg Pro Pro Asp Cys Pro Lys Cys Pro Ala Pro Glu Met Leu Gly
225                 230                 235                 240

Gly Pro Ser Val Phe Ile Phe Pro Pro Lys Pro Lys Asp Thr Leu Leu
                245                 250                 255

Ile Ala Arg Thr Pro Glu Val Thr Cys Val Val Val Ala Leu Asp Pro
                260                 265                 270

Glu Asp Pro Glu Val Gln Ile Ser Trp Phe Val Asp Gly Lys Gln Met
    275                 280                 285

Gln Thr Ala Lys Thr Gln Pro Arg Glu Glu Gln Phe Ala Gly Thr Tyr
    290                 295                 300

Arg Val Val Ser Val Leu Pro Ile Gly His Gln Asp Trp Leu Lys Gly
305                 310                 315                 320

Lys Gln Phe Thr Cys Lys Val Asn Asn Lys Ala Leu Pro Ser Pro Ile
                325                 330                 335

Glu Arg Thr Ile Ser Lys Ala Arg Gly Gln Ala His Gln Pro Ser Val
                340                 345                 350

Tyr Val Leu Pro Pro Ser Arg Glu Glu Leu Ser Lys Asn Thr Val Ser
            355                 360                 365

Leu Thr Cys Leu Ile Lys Asp Phe Phe Pro Pro Asp Ile Asp Val Glu
    370                 375                 380

Trp Gln Ser Asn Gly Gln Gln Glu Pro Glu Ser Lys Tyr Arg Thr Thr
385                 390                 395                 400

Pro Pro Gln Leu Asp Glu Asp Gly Ser Tyr Phe Leu Tyr Ser Lys Leu
                405                 410                 415

Ser Val Asp Lys Ser Arg Trp Gln Arg Gly Asp Thr Phe Ile Cys Ala
                420                 425                 430

Val Met His Glu Ala Leu His Asn His Tyr Thr Gln Glu Ser Leu Ser
            435                 440                 445

His Ser Pro Gly Lys
    450

<210> SEQ ID NO 11
<211> LENGTH: 657
<212> TYPE: DNA
<213> ORGANISM: Artificial Sequence
<220> FEATURE:
<223> OTHER INFORMATION: human-canine chimera

<400> SEQUENCE: 11
gaaattgtgc tgacccagag cccgggcacc ctgagcctga gccgggcga acgcgcgacc        60 ctgagctgcc gcgcgagcca gagcattagc agcagctttc tggcgtggta tcagcagcgc      120

```
ccgggccagg cgccgcgcct gctgatttat ggcgcgagca gccgcgcgac cggcattccg    180
gatcgcttta gcggcagcgg cagcggcacc gattttaccc tgaccattag ccgcctggaa    240
ccggaagatt ttgcggtgta ttattgccag cagtatggca ccagcccgtg gacctttggc    300
cagggcacca aagtggaaat taaacgcaac gatgcgcagc cggcggtgta tctgtttcag    360
ccgagcccgg atcagctgca taccggcagc gcgagcgtgg tgtgcctgct gaacagcttt    420
tatccgaaag atattaacgt gaaatggaaa gtggatggcg tgattcagga taccggcatt    480
caggaaagcg tgaccgaaca ggatagcaaa gatagcacct atagcctgag cagcaccctg    540
accatgagca gcaccgaata tctgagccat gaactgtata gctgcgaaat tacccataaa    600
agcctgccga gcaccctgat taaaagcttt cagcgcagcg aatgccagcg cgtggat      657
```

<210> SEQ ID NO 12
<211> LENGTH: 219
<212> TYPE: PRT
<213> ORGANISM: Artificial Sequence
<220> FEATURE:
<223> OTHER INFORMATION: human-canine chimera

<400> SEQUENCE: 12

```
Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Ile Ser Ser Ser
            20                  25                  30

Phe Leu Ala Trp Tyr Gln Gln Arg Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Gly Thr Ser Pro
                85                  90                  95

Trp Thr Phe Gly Gln Gly Thr Lys Val Glu Ile Lys Arg Asn Asp Ala
            100                 105                 110

Gln Pro Ala Val Tyr Leu Phe Gln Pro Ser Pro Asp Gln Leu His Thr
        115                 120                 125

Gly Ser Ala Ser Val Val Cys Leu Leu Asn Ser Phe Tyr Pro Lys Asp
    130                 135                 140

Ile Asn Val Lys Trp Lys Val Asp Gly Val Ile Gln Asp Thr Gly Ile
145                 150                 155                 160

Gln Glu Ser Val Thr Glu Gln Asp Ser Lys Asp Ser Thr Tyr Ser Leu
                165                 170                 175

Ser Ser Thr Leu Thr Met Ser Ser Thr Glu Tyr Leu Ser His Glu Leu
            180                 185                 190

Tyr Ser Cys Glu Ile Thr His Lys Ser Leu Pro Ser Thr Leu Ile Lys
        195                 200                 205

Ser Phe Gln Arg Ser Glu Cys Gln Arg Val Asp
    210                 215
```

<210> SEQ ID NO 13
<211> LENGTH: 1362
<212> TYPE: DNA
<213> ORGANISM: Artificial Sequence
<220> FEATURE:
<223> OTHER INFORMATION: human-canine chimera

<400> SEQUENCE: 13

```
caggtgcagc tggtggaaag cggcggcggc gtggtgcagc cgggccgcag cctgcgcctg      60
agctgcaccg cgagcggctt tacctttagc aactatggca tgcattgggt gcgccaggcg     120
ccgggcaaag gcctggaatg ggtggcggtg atttggtatg atggcagcaa caaacattat     180
ggcgatagcg tgaaaggccg ctttaccatt agcagcgata cagcaaaaa caccctgtat      240
ctgcagatga acagcctgcg cgcggaagat accgcggtgt attattgcgc gcgcggcgaa     300
cgcctgggca gctatttga ttattgggc cagggcaccc tggtgaccgt gagcagcgcg       360
agcaccaccg cgccgagcgt gtttccgctg cgccgagct cggcagcac cagcggcagc       420
accgtggcgc tggcgtgcct ggtgagcggc tattttccgg aaccggtgac cgtgagctgg     480
aacagcggca gcctgaccag cggcgtgcat acctttccga gcgtgctgca gagcagcggc     540
ctgtatagcc tgagcagcat ggtgaccgtg ccagcagcc gctggccgag cgaaacctt      600
acctgcaacg tggcgcatcc ggcgagcaaa accaaagtgg ataaaccggt gccgaaacgc    660
gaaaacggcc gcgtgccgcg cccgccggat tgcccgaaat gccggcgcc ggaaatgctg     720
ggcggcccga gcgtgttat ttttccgccg aaaccgaaag atacctgct gattgcgcgc      780
accccggaag tgacctgcgt ggtggtggcg ctggatccgg aagatccgga agtgcagatt    840
agctggtttg tggatggcaa acagatgcag accgcgaaaa cccagccgcg cgaagaacag    900
tttgcgggca cctatcgcgt ggtgagcgtg ctgccgattg ccatcagga ttggctgaaa     960
ggcaaacagt ttacctgcaa agtgaacaac aaagcgctgc cgagcccgat gaacgcacc   1020
attagcaaag cgcgcggcca ggcgcatcag ccgagcgtgt atgtgctgcc gccgagccgc   1080
gaagaactga gcaaaaacac cgtgagcctg acctgctga ttaaagattt ttttccgccg   1140
gatattgatg tggaatggca gagcaacggc cagcaggaac cggaaagcaa atatcgcacc   1200
accccgccgc agctggatga agatggcagc tattttctgt atagcaaact gagcgtggat   1260
aaaagccgct ggcagcgcgg cgatacctt atttgcgcgg tgatgcatga agcgctgcat   1320
aaccattata cccaggaaag cctgagccat agcccgggca aa                      1362
```

<210> SEQ ID NO 14
<211> LENGTH: 454
<212> TYPE: PRT
<213> ORGANISM: Artificial Sequence
<220> FEATURE:
<223> OTHER INFORMATION: human-canine chimera

<400> SEQUENCE: 14

```
Gln Val Gln Leu Val Glu Ser Gly Gly Gly Val Val Gln Pro Gly Arg
1               5                   10                  15

Ser Leu Arg Leu Ser Cys Thr Ala Ser Gly Phe Thr Phe Ser Asn Tyr
            20                  25                  30

Gly Met His Trp Val Arg Gln Ala Pro Gly Lys Gly Leu Glu Trp Val
        35                  40                  45

Ala Val Ile Trp Tyr Asp Gly Ser Asn Lys His Tyr Gly Asp Ser Val
    50                  55                  60

Lys Gly Arg Phe Thr Ile Ser Ser Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Glu Arg Leu Gly Ser Tyr Phe Asp Tyr Trp Gly Gln Gly
            100                 105                 110
```

```
Thr Leu Val Thr Val Ser Ser Ala Ser Thr Thr Ala Pro Ser Val Phe
            115                 120                 125

Pro Leu Ala Pro Ser Cys Gly Ser Thr Ser Gly Ser Thr Val Ala Leu
130                 135                 140

Ala Cys Leu Val Ser Gly Tyr Phe Pro Glu Pro Val Thr Val Ser Trp
145                 150                 155                 160

Asn Ser Gly Ser Leu Thr Ser Gly Val His Thr Phe Pro Ser Val Leu
                165                 170                 175

Gln Ser Ser Gly Leu Tyr Ser Leu Ser Ser Met Val Thr Val Pro Ser
            180                 185                 190

Ser Arg Trp Pro Ser Glu Thr Phe Thr Cys Asn Val Ala His Pro Ala
        195                 200                 205

Ser Lys Thr Lys Val Asp Lys Pro Val Pro Lys Arg Glu Asn Gly Arg
    210                 215                 220

Val Pro Arg Pro Pro Asp Cys Pro Lys Cys Pro Ala Pro Glu Met Leu
225                 230                 235                 240

Gly Gly Pro Ser Val Phe Ile Phe Pro Pro Lys Pro Lys Asp Thr Leu
                245                 250                 255

Leu Ile Ala Arg Thr Pro Glu Val Thr Cys Val Val Val Ala Leu Asp
            260                 265                 270

Pro Glu Asp Pro Glu Val Gln Ile Ser Trp Phe Val Asp Gly Lys Gln
        275                 280                 285

Met Gln Thr Ala Lys Thr Gln Pro Arg Glu Glu Gln Phe Ala Gly Thr
    290                 295                 300

Tyr Arg Val Val Ser Val Leu Pro Ile Gly His Gln Asp Trp Leu Lys
305                 310                 315                 320

Gly Lys Gln Phe Thr Cys Lys Val Asn Asn Lys Ala Leu Pro Ser Pro
                325                 330                 335

Ile Glu Arg Thr Ile Ser Lys Ala Arg Gly Gln Ala His Gln Pro Ser
            340                 345                 350

Val Tyr Val Leu Pro Pro Ser Arg Glu Glu Leu Ser Lys Asn Thr Val
        355                 360                 365

Ser Leu Thr Cys Leu Ile Lys Asp Phe Phe Pro Pro Asp Ile Asp Val
    370                 375                 380

Glu Trp Gln Ser Asn Gly Gln Gln Glu Pro Glu Ser Lys Tyr Arg Thr
385                 390                 395                 400

Thr Pro Pro Gln Leu Asp Glu Asp Gly Ser Tyr Phe Leu Tyr Ser Lys
                405                 410                 415

Leu Ser Val Asp Lys Ser Arg Trp Gln Arg Gly Asp Thr Phe Ile Cys
            420                 425                 430

Ala Val Met His Glu Ala Leu His Asn His Tyr Thr Gln Glu Ser Leu
        435                 440                 445

Ser His Ser Pro Gly Lys
    450

<210> SEQ ID NO 15
<211> LENGTH: 651
<212> TYPE: DNA
<213> ORGANISM: Artificial Sequence
<220> FEATURE:
<223> OTHER INFORMATION: human-canine chimera

<400> SEQUENCE: 15
gaaattgtgc tgacccagag cccgggcacc ctgagcctga gccgggcga acgcgcgacc       60 ctgagctgcc gcaccagcgt gagcagcagc tatctggcgt ggtatcagca gaaaccgggc     120
```

```
caggcgccgc gcctgctgat ttatggcgcg agcagccgcg cgaccggcat tccggatcgc    180
tttagcggca gcggcagcgg caccgatttt accctgacca ttagccgcct ggaaccggaa    240
gattttgcgg tgtattattg ccagcagtat ggcattagcc cgtttacctt ggcggcggc     300 accaaagtgg aaattaaacg caacgatgcg cagccggcgg tgtatctgtt tcagccgagc    360
ccggatcagc tgcataccgg cagcgcgagc gtggtgtgcc tgctgaacag ctttatccg     420 aaagatatta cgtgaaatg gaaagtggat ggcgtgattc aggataccgg cattcaggaa     480
agcgtgaccg aacaggatag caaagatagc acctatagcc tgagcagcac cctgaccatg    540
agcagcaccg aatatctgag ccatgaactg tatagctgcg aaattaccca taaaagcctg    600
ccgagcaccc tgattaaaag ctttcagcgc agcgaatgcc agcgcgtgga t             651
```

<210> SEQ ID NO 16
<211> LENGTH: 217
<212> TYPE: PRT
<213> ORGANISM: Artificial Sequence
<220> FEATURE:
<223> OTHER INFORMATION: human-canine chimera
<400> SEQUENCE: 16

```
Glu Ile Val Leu Thr Gln Ser Pro Gly Thr Leu Ser Leu Ser Pro Gly
1               5                   10                  15

Glu Arg Ala Thr Leu Ser Cys Arg Thr Ser Val Ser Ser Ser Tyr Leu
            20                  25                  30

Ala Trp Tyr Gln Gln Lys Pro Gly Gln Ala Pro Arg Leu Leu Ile Tyr
        35                  40                  45

Gly Ala Ser Ser Arg Ala Thr Gly Ile Pro Asp Arg Phe Ser Gly Ser
    50                  55                  60

Gly Ser Gly Thr Asp Phe Thr Leu Thr Ile Ser Arg Leu Glu Pro Glu
65                  70                  75                  80

Asp Phe Ala Val Tyr Tyr Cys Gln Gln Tyr Gly Ile Ser Pro Phe Thr
                85                  90                  95

Phe Gly Gly Gly Thr Lys Val Glu Ile Lys Arg Asn Asp Ala Gln Pro
            100                 105                 110

Ala Val Tyr Leu Phe Gln Pro Ser Pro Asp Gln Leu His Thr Gly Ser
        115                 120                 125

Ala Ser Val Val Cys Leu Leu Asn Ser Phe Tyr Pro Lys Asp Ile Asn
    130                 135                 140

Val Lys Trp Lys Val Asp Gly Val Ile Gln Asp Thr Gly Ile Gln Glu
145                 150                 155                 160

Ser Val Thr Glu Gln Asp Ser Lys Asp Ser Thr Tyr Ser Leu Ser Ser
                165                 170                 175

Thr Leu Thr Met Ser Ser Thr Glu Tyr Leu Ser His Glu Leu Tyr Ser
            180                 185                 190

Cys Glu Ile Thr His Lys Ser Leu Pro Ser Thr Leu Ile Lys Ser Phe
        195                 200                 205

Gln Arg Ser Glu Cys Gln Arg Val Asp
    210                 215
```

<210> SEQ ID NO 17
<211> LENGTH: 1359
<212> TYPE: DNA
<213> ORGANISM: Artificial Sequence
<220> FEATURE:
<223> OTHER INFORMATION: human-canine chimera

<400> SEQUENCE: 17

```
caggtgcagc tggtggaaag cggcggcggc gtggtggaac cgggccgcag cctgcgcctg      60
agctgcaccg cgagcggctt tacctttagc agctatggca tgcattgggt gcgccaggcg     120
ccgggcaaag gcctggaatg ggtggcggtg atttggtatg atggcagcaa caaacattat     180
gcggatagcg cgaaaggccg ctttaccatt agccgcgata cagcaaaaa caccctgtat      240
ctgcagatga acagcctgcg cgcggaagat accgcggtgt attattgcgc gcgcgcgggc     300
ctgctgggct attttgatta ttggggccag ggcaccctgg tgaccgtgag cagcgcgagc     360
accaccgcgc cgagcgtgtt tccgctggcg ccgagctgcg cagcaccag cggcagcacc      420
gtggcgctgg cgtgcctggt gagcggctat tttccggaac cggtgaccgt gagctggaac     480
agcggcagcc tgaccagcgg cgtgcatacc tttccgagcg tgctgcagag cagcggcctg     540
tatagcctga gcagcatggt gaccgtgccg agcagccgct ggccgagcga aacctttacc     600
tgcaacgtgg cgcatccggc gagcaaaacc aaagtggata aaccggtgcc gaaacgcgaa     660
aacggccgcg tgccgcgccc gccggattgc ccgaaatgcc cggcgccgga atgctgggc      720
ggcccgagcg tgtttatttt tccgccgaaa ccgaaagata ccctgctgat tgcgcgcacc     780
ccggaagtga cctgcgtggt ggtggcgctg atccggaag atccggaagt gcagattagc      840
tggtttgtgg atggcaaaca gatgcagacc gcgaaaaccc agccgcgcga gaacagttt      900
gcgggcacct atcgcgtggt gagcgtgctg ccgattggcc atcaggattg ctgaaaggc      960
aaacagttta cctgcaaagt gaacaacaaa gcgctgccga gcccgattga acgcaccatt    1020
agcaaagcgc gcggccaggc gcatcagccg agcgtgtatg tgctgccgcc gagccgcgaa    1080
gaactgagca aaaacaccgt gagcctgacc tgcctgatta agattttttt tccgccggat    1140
attgatgtgg aatggcagag caacggccag caggaaccgg aaagcaaata tcgcaccacc    1200
ccgccgcagc tggatgaaga tggcagctat tttctgtata gcaaactgag cgtggataaa    1260
agccgctggc agcgcggcga tacctttatt tgcgcggtga tgcatgaagc gctgcataac    1320
cattataccc aggaaagcct gagccatagc ccgggcaaa                           1359
```

<210> SEQ ID NO 18
<211> LENGTH: 453
<212> TYPE: PRT
<213> ORGANISM: Artificial Sequence
<220> FEATURE:
<223> OTHER INFORMATION: human-canine chimera

<400> SEQUENCE: 18

```
Gln Val Gln Leu Val Glu Ser Gly Gly Gly Val Val Glu Pro Gly Arg
1               5                   10                  15

Ser Leu Arg Leu Ser Cys Thr Ala Ser Gly Phe Thr Phe Ser Ser Tyr
            20                  25                  30

Gly Met His Trp Val Arg Gln Ala Pro Gly Lys Gly Leu Glu Trp Val
        35                  40                  45

Ala Val Ile Trp Tyr Asp Gly Ser Asn Lys His Tyr Ala Asp Ser Ala
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Ala Gly Leu Leu Gly Tyr Phe Asp Tyr Trp Gly Gln Gly Thr
            100                 105                 110
```

Leu Val Thr Val Ser Ser Ala Ser Thr Thr Ala Pro Ser Val Phe Pro
        115                 120                 125

Leu Ala Pro Ser Cys Gly Ser Thr Ser Gly Ser Thr Val Ala Leu Ala
    130                 135                 140

Cys Leu Val Ser Gly Tyr Phe Pro Glu Pro Val Thr Val Ser Trp Asn
145                 150                 155                 160

Ser Gly Ser Leu Thr Ser Gly Val His Thr Phe Pro Ser Val Leu Gln
                165                 170                 175

Ser Ser Gly Leu Tyr Ser Leu Ser Ser Met Val Thr Val Pro Ser Ser
            180                 185                 190

Arg Trp Pro Ser Glu Thr Phe Thr Cys Asn Val Ala His Pro Ala Ser
        195                 200                 205

Lys Thr Lys Val Asp Lys Pro Val Pro Lys Arg Glu Asn Gly Arg Val
    210                 215                 220

Pro Arg Pro Pro Asp Cys Pro Lys Cys Pro Ala Pro Glu Met Leu Gly
225                 230                 235                 240

Gly Pro Ser Val Phe Ile Phe Pro Pro Lys Pro Lys Asp Thr Leu Leu
                245                 250                 255

Ile Ala Arg Thr Pro Glu Val Thr Cys Val Val Val Ala Leu Asp Pro
            260                 265                 270

Glu Asp Pro Glu Val Gln Ile Ser Trp Phe Val Asp Gly Lys Gln Met
        275                 280                 285

Gln Thr Ala Lys Thr Gln Pro Arg Glu Glu Gln Phe Ala Gly Thr Tyr
    290                 295                 300

Arg Val Val Ser Val Leu Pro Ile Gly His Gln Asp Trp Leu Lys Gly
305                 310                 315                 320

Lys Gln Phe Thr Cys Lys Val Asn Asn Lys Ala Leu Pro Ser Pro Ile
                325                 330                 335

Glu Arg Thr Ile Ser Lys Ala Arg Gly Gln Ala His Gln Pro Ser Val
            340                 345                 350

Tyr Val Leu Pro Pro Ser Arg Glu Glu Leu Ser Lys Asn Thr Val Ser
        355                 360                 365

Leu Thr Cys Leu Ile Lys Asp Phe Phe Pro Pro Asp Ile Asp Val Glu
    370                 375                 380

Trp Gln Ser Asn Gly Gln Gln Glu Pro Glu Ser Lys Tyr Arg Thr Thr
385                 390                 395                 400

Pro Pro Gln Leu Asp Glu Asp Gly Ser Tyr Phe Leu Tyr Ser Lys Leu
                405                 410                 415

Ser Val Asp Lys Ser Arg Trp Gln Arg Gly Asp Thr Phe Ile Cys Ala
            420                 425                 430

Val Met His Glu Ala Leu His Asn His Tyr Thr Gln Glu Ser Leu Ser
        435                 440                 445

His Ser Pro Gly Lys
    450

<210> SEQ ID NO 19
<211> LENGTH: 654
<212> TYPE: DNA
<213> ORGANISM: Artificial Sequence
<220> FEATURE:
<223> OTHER INFORMATION: human-canine chimera

<400> SEQUENCE: 19
gaaattgtgc tgacccagag cccgggcacc ctgagcctga gccgggcga acgcgcgacc      60 ctgagctgcc gcgcgagcca gagcgtgagc agctatctgg cgtggtatca gcagaaaccg     120

```
ggccaggcgc cgcgcccgct gatttatggc gtgagcagcc gcgcgaccgg cattccggat    180
cgctttagcg gcagcggcag cggcaccgat tttaccctga ccattagccg cctggaaccg    240
gaagattttg cggtgtatta ttgccagcag tatggcatta gcccgtttac ctttggcccg    300
ggcaccaaag tggatattaa acgcaacgat gcgcagccgg cggtgtatct gtttcagccg    360
agcccggatc agctgcatac cggcagcgcg agcgtggtgt gcctgctgaa cagcttttat    420
ccgaaagata ttaacgtgaa atggaaagtg gatggcgtga ttcaggatac cggcattcag    480
gaaagcgtga ccgaacagga tagcaaagat agcacctata gcctgagcag caccctgacc    540
atgagcagca ccgaatatct gagccatgaa ctgtatagct gcgaaattac cataaaaagc    600
ctgccgagca ccctgattaa aagctttcag cgcagcgaat gccagcgcgt ggat          654
```

<210> SEQ ID NO 20
<211> LENGTH: 218
<212> TYPE: PRT
<213> ORGANISM: Artificial Sequence
<220> FEATURE:
<223> OTHER INFORMATION: human-canine chimera

<400> SEQUENCE: 20

```
Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Pro Leu Ile
        35                  40                  45

Tyr Gly Val Ser Ser Arg Ala Thr Gly Ile Pro Asp Arg Phe Ser Gly
    50                  55                  60

Ser Gly Ser Gly Thr Asp Phe Thr Leu Thr Ile Ser Arg Leu Glu Pro
65                  70                  75                  80

Glu Asp Phe Ala Val Tyr Tyr Cys Gln Gln Tyr Gly Ile Ser Pro Phe
                85                  90                  95

Thr Phe Gly Pro Gly Thr Lys Val Asp Ile Lys Arg Asn Asp Ala Gln
            100                 105                 110

Pro Ala Val Tyr Leu Phe Gln Pro Ser Pro Asp Gln Leu His Thr Gly
        115                 120                 125

Ser Ala Ser Val Val Cys Leu Leu Asn Ser Phe Tyr Pro Lys Asp Ile
    130                 135                 140

Asn Val Lys Trp Lys Val Asp Gly Val Ile Gln Asp Thr Gly Ile Gln
145                 150                 155                 160

Glu Ser Val Thr Glu Gln Asp Ser Lys Asp Ser Thr Tyr Ser Leu Ser
                165                 170                 175

Ser Thr Leu Thr Met Ser Ser Thr Glu Tyr Leu Ser His Glu Leu Tyr
            180                 185                 190

Ser Cys Glu Ile Thr His Lys Ser Leu Pro Ser Thr Leu Ile Lys Ser
        195                 200                 205

Phe Gln Arg Ser Glu Cys Gln Arg Val Asp
    210                 215
```

<210> SEQ ID NO 21
<211> LENGTH: 1359
<212> TYPE: DNA
<213> ORGANISM: Artificial Sequence
<220> FEATURE:
<223> OTHER INFORMATION: human-canine chimera

<400> SEQUENCE: 21

```
caggtgcagc tggtggaaag cggcggcggc gtggtgcagc cgggccgcag cctgcgcctg      60
agctgcgcgg cgagcggctt tacctttagc agctatacca tgcattgggt gcgccaggcg     120
ccgggcaaag gcctggaatg ggtgaccttt attagctatg atggcaacaa caaatattat     180
gcggatagcg tgaaaggccg ctttaccatt agccgcgata cagcaaaaa caccctgtat     240
ctgcagatga acagcctgcg cgcggaagat accgcggtgt attattgcgc gcgcaccggc     300
tggctgggcc cgtttgatta ttggggccag ggcaccctgg tgaccgtgag cagcgcgagc     360
accaccgcgc cgagcgtgtt tccgctggcg ccgagctgcg cagcaccag cggcagcacc     420
gtggcgctgg cgtgcctggt gagcggctat tttccggaac cggtgaccgt gagctggaac     480
agcggcagcc tgaccagcgg cgtgcatacc tttccgagcg tgctgcagag cagcggcctg     540
tatagcctga gcagcatggt gaccgtgccg agcagccgct ggccgagcga aacctttacc     600
tgcaacgtgg cgcatccggc gagcaaaacc aaagtggata accggtgcc gaaacgcgaa     660
aacggccgcg tgccgcgccc gccggattgc ccgaaatgcc cggcgccgga atgctgggc     720
ggcccgagcg tgtttatttt tccgccgaaa ccgaaagata ccctgctgat tgcgcgcacc     780
ccggaagtga cctgcgtggt ggtggcgctg atccggaag atccggaagt gcagattagc     840
tggtttgtgg atggcaaaca gatgcagacc gcgaaaaccc agccgcgcga gaacagttt     900
gcgggcacct atcgcgtggt gagcgtgctg ccgattggcc atcaggattg gctgaaaggc     960
aaacagttta cctgcaaagt gaacaacaaa gcgctgccga gcccgattga acgcaccatt    1020
agcaaagcgc gcggccaggc gcatcagccg agcgtgtatg tgctgccgcc gagccgcgaa    1080
gaactgagca aaaacaccgt gagcctgacc tgcctgatta agatttttt tccgccggat    1140
attgatgtgg aatggcagag caacggccag caggaaccgg aaagcaaata tcgcaccacc    1200
ccgccgcagc tggatgaaga tggcagctat tttctgtata gcaaactgag cgtggataaa    1260
agccgctggc agcgcggcga tacctttatt gcgcgggtga tgcatgaagc gctgcataac    1320
cattataccc aggaaagcct gagccatagc ccgggcaaa                           1359
```

<210> SEQ ID NO 22
<211> LENGTH: 453
<212> TYPE: PRT
<213> ORGANISM: Artificial Sequence
<220> FEATURE:
<223> OTHER INFORMATION: hyman-canine chimera

<400> SEQUENCE: 22

```
Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Thr Met His Trp Val Arg Gln Ala Pro Gly Lys Gly Leu Glu Trp Val
        35                  40                  45

Thr Phe Ile Ser Tyr Asp Gly Asn Asn Lys Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Thr Gly Trp Leu Gly Pro Phe Asp Tyr Trp Gly Gln Gly Thr
            100                 105                 110
```

```
Leu Val Thr Val Ser Ser Ala Ser Thr Thr Ala Pro Ser Val Phe Pro
            115                 120                 125

Leu Ala Pro Ser Cys Gly Ser Thr Ser Gly Ser Thr Val Ala Leu Ala
        130                 135                 140

Cys Leu Val Ser Gly Tyr Phe Pro Glu Pro Val Thr Val Ser Trp Asn
145                 150                 155                 160

Ser Gly Ser Leu Thr Ser Gly Val His Thr Phe Pro Ser Val Leu Gln
                165                 170                 175

Ser Ser Gly Leu Tyr Ser Leu Ser Ser Met Val Thr Val Pro Ser Ser
            180                 185                 190

Arg Trp Pro Ser Glu Thr Phe Thr Cys Asn Val Ala His Pro Ala Ser
        195                 200                 205

Lys Thr Lys Val Asp Lys Pro Val Pro Lys Arg Glu Asn Gly Arg Val
210                 215                 220

Pro Arg Pro Pro Asp Cys Pro Lys Cys Pro Ala Pro Glu Met Leu Gly
225                 230                 235                 240

Gly Pro Ser Val Phe Ile Phe Pro Pro Lys Pro Lys Asp Thr Leu Leu
                245                 250                 255

Ile Ala Arg Thr Pro Glu Val Thr Cys Val Val Val Ala Leu Asp Pro
            260                 265                 270

Glu Asp Pro Glu Val Gln Ile Ser Trp Phe Val Asp Gly Lys Gln Met
        275                 280                 285

Gln Thr Ala Lys Thr Gln Pro Arg Glu Glu Gln Phe Ala Gly Thr Tyr
        290                 295                 300

Arg Val Val Ser Val Leu Pro Ile Gly His Gln Asp Trp Leu Lys Gly
305                 310                 315                 320

Lys Gln Phe Thr Cys Lys Val Asn Asn Lys Ala Leu Pro Ser Pro Ile
                325                 330                 335

Glu Arg Thr Ile Ser Lys Ala Arg Gly Gln Ala His Gln Pro Ser Val
            340                 345                 350

Tyr Val Leu Pro Pro Ser Arg Glu Glu Leu Ser Lys Asn Thr Val Ser
        355                 360                 365

Leu Thr Cys Leu Ile Lys Asp Phe Phe Pro Pro Asp Ile Asp Val Glu
        370                 375                 380

Trp Gln Ser Asn Gly Gln Gln Glu Pro Glu Ser Lys Tyr Arg Thr Thr
385                 390                 395                 400

Pro Pro Gln Leu Asp Glu Asp Gly Ser Tyr Phe Leu Tyr Ser Lys Leu
                405                 410                 415

Ser Val Asp Lys Ser Arg Trp Gln Arg Gly Asp Thr Phe Ile Cys Ala
            420                 425                 430

Val Met His Glu Ala Leu His Asn His Tyr Thr Gln Glu Ser Leu Ser
        435                 440                 445

His Ser Pro Gly Lys
        450

<210> SEQ ID NO 23
<211> LENGTH: 657
<212> TYPE: DNA
<213> ORGANISM: Artificial Sequence
<220> FEATURE:
<223> OTHER INFORMATION: human-canine chimera

<400> SEQUENCE: 23
gaaattgtgc tgacccagag cccgggcacc ctgagcctga gcccgggcga acgcgcgacc      60
ctgagctgcc gcgcgagcca gagcgtgggc agcagctatc tggcgtggta tcagcagaaa     120
```

```
ccgggccagg cgccgcgcct gctgatttat ggcgcgttta gccgcgcgac cggcattccg    180
gatcgcttta gcggcagcgg cagcggcacc gattttaccc tgaccattag ccgcctggaa    240
ccggaagatt ttgcggtgta ttattgccag cagtatggca gcagcccgtg gacctttggc    300
cagggcacca aagtggaaat taaacgcaac gatgcgcagc cggcggtgta tctgtttcag    360
ccgagcccgg atcagctgca taccggcagc gcgagcgtgg tgtgcctgct gaacagcttt    420
tatccgaaag atattaacgt gaaatggaaa gtggatggcg tgattcagga taccggcatt    480
caggaaagcg tgaccgaaca ggatagcaaa gatagcacct atagcctgag cagcaccctg    540
accatgagca gcaccgaata tctgagccat gaactgtata gctgcgaaat tacccataaa    600
agcctgccga gcaccctgat taaaagcttt cagcgcagcg aatgccagcg cgtggat       657
```

<210> SEQ ID NO 24
<211> LENGTH: 219
<212> TYPE: PRT
<213> ORGANISM: Artificial Sequence
<220> FEATURE:
<223> OTHER INFORMATION: human-canine chimera

<400> SEQUENCE: 24

```
Glu Ile Val Leu Thr Gln Ser Pro Gly Thr Leu Ser Leu Ser Pro Gly
  1               5                  10                  15

Glu Arg Ala Thr Leu Ser Cys Arg Ala Ser Gln Ser Val Gly Ser Ser
             20                  25                  30

Tyr Leu Ala Trp Tyr Gln Gln Lys Pro Gly Gln Ala Pro Arg Leu Leu
         35                  40                  45

Ile Tyr Gly Ala Phe Ser Arg Ala Thr Gly Ile Pro Asp Arg Phe Ser
     50                  55                  60

Gly Ser Gly Ser Gly Thr Asp Phe Thr Leu Thr Ile Ser Arg Leu Glu
 65                  70                  75                  80

Pro Glu Asp Phe Ala Val Tyr Tyr Cys Gln Gln Tyr Gly Ser Ser Pro
                 85                  90                  95

Trp Thr Phe Gly Gln Gly Thr Lys Val Glu Ile Lys Arg Asn Asp Ala
            100                 105                 110

Gln Pro Ala Val Tyr Leu Phe Gln Pro Ser Pro Asp Gln Leu His Thr
        115                 120                 125

Gly Ser Ala Ser Val Val Cys Leu Leu Asn Ser Phe Tyr Pro Lys Asp
    130                 135                 140

Ile Asn Val Lys Trp Lys Val Asp Gly Val Ile Gln Asp Thr Gly Ile
145                 150                 155                 160

Gln Glu Ser Val Thr Glu Gln Asp Ser Lys Asp Ser Thr Tyr Ser Leu
                165                 170                 175

Ser Ser Thr Leu Thr Met Ser Ser Thr Glu Tyr Leu Ser His Glu Leu
            180                 185                 190

Tyr Ser Cys Glu Ile Thr His Lys Ser Leu Pro Ser Thr Leu Ile Lys
        195                 200                 205

Ser Phe Gln Arg Ser Glu Cys Gln Arg Val Asp
    210                 215
```

<210> SEQ ID NO 25
<211> LENGTH: 1362
<212> TYPE: DNA
<213> ORGANISM: Artificial Sequence
<220> FEATURE:
<223> OTHER INFORMATION: human-canine chimera

<400> SEQUENCE: 25

```
caggtgcagc tggtggaaag cggcggcggc gtggtgcagc cgggccgcag cctgcgcctg    60
agctgcgcgg cgagcggctt tacctttagc agctatggca tgcattgggt gcgccaggcg   120
ccgggcaaag gcctggaatg gggtggcggtg atttggtatg atggcagcaa caaatattat   180
gcggatagcg tgaaaggccg ctttaccatt agccgcgata acagcaaaaa caccctgtat   240
ctgcagatga acagcctgcg cgcggaagat accgcggtgt tttattgcgc gcgcgcgccg   300
aactatattg gcgcgtttga tgtgtgggc caggcacca tggtgaccgt gagcagcgcg   360
agcaccaccg cgccgagcgt gtttccgctg cgccgagct gcggcagcac cagcggcagc   420
accgtggcgc tggcgtgcct ggtgagcggc tattttccgg aaccggtgac cgtgagctgg   480
aacagcggca gcctgaccag cggcgtgcat acctttccga gcgtgctgca gagcagcggc   540
ctgtatagcc tgagcagcat ggtgaccgtg ccgagcagcc gctggccgag cgaaacctt   600
acctgcaacg tggcgcatcc ggcgagcaaa accaaagtgg ataaaccggt gccgaaacgc   660
gaaaacggcc gcgtgccgcg cccgccggat tgcccgaaat gccggcgcc ggaaatgctg   720
ggcggcccga gcgtgtttat ttttccgccg aaaccgaaag ataccctgct gattgcgcgc   780
acccccggaag tgacctgcgt ggtggtggcg ctggatccgg aagatccgga agtgcagatt   840
agctggtttg tggatggcaa acagatgcag accgcgaaaa cccagccgcg cgaagaacag   900
tttgcgggca cctatcgcgt ggtgagcgtg ctgccgattg ccatcagga ttggctgaaa   960
ggcaaacagt ttacctgcaa agtgaacaac aaagcgctgc cgagcccgat gaacgcacc  1020
attagcaaag cgcgcggcca ggcgcatcag ccgagcgtgt atgtgctgcc gccgagccgc  1080
gaagaactga gcaaaaacac cgtgagcctg acctgcctga ttaaagattt ttttccgccg  1140
gatattgatg tggaatggca gagcaacggc cagcaggaac cggaaagcaa atatcgcacc  1200
accccgccgc agctggatga agatggcagc tattttctgt atagcaaact gagcgtggat  1260
aaaagccgct ggcagcgcgg cgataccttt atttgcgcgg tgatgcatga agcgctgcat  1320
aaccattata cccaggaaag cctgagccat agcccgggca aa                     1362
```

<210> SEQ ID NO 26
<211> LENGTH: 454
<212> TYPE: PRT
<213> ORGANISM: Artificial Sequence
<220> FEATURE:
<223> OTHER INFORMATION: human-canine chimera

<400> SEQUENCE: 26

```
Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Gly Met His Trp Val Arg Gln Ala Pro Gly Lys Gly Leu Glu Trp Val
        35                  40                  45

Ala Val Ile Trp Tyr Asp Gly Ser Asn Lys Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Phe Tyr Cys
                85                  90                  95

Ala Arg Ala Pro Asn Tyr Ile Gly Ala Phe Asp Val Trp Gly Gln Gly
            100                 105                 110
```

Thr Met Val Thr Val Ser Ser Ala Ser Thr Thr Ala Pro Ser Val Phe
            115                 120                 125

Pro Leu Ala Pro Ser Cys Gly Ser Thr Ser Gly Ser Thr Val Ala Leu
    130                 135                 140

Ala Cys Leu Val Ser Gly Tyr Phe Pro Glu Pro Val Thr Val Ser Trp
145                 150                 155                 160

Asn Ser Gly Ser Leu Thr Ser Gly Val His Thr Phe Pro Ser Val Leu
                165                 170                 175

Gln Ser Ser Gly Leu Tyr Ser Leu Ser Ser Met Val Thr Val Pro Ser
            180                 185                 190

Ser Arg Trp Pro Ser Glu Thr Phe Thr Cys Asn Val Ala His Pro Ala
            195                 200                 205

Ser Lys Thr Lys Val Asp Lys Pro Val Pro Lys Arg Glu Asn Gly Arg
    210                 215                 220

Val Pro Arg Pro Pro Asp Cys Pro Lys Cys Pro Ala Pro Glu Met Leu
225                 230                 235                 240

Gly Gly Pro Ser Val Phe Ile Phe Pro Pro Lys Pro Lys Asp Thr Leu
                245                 250                 255

Leu Ile Ala Arg Thr Pro Glu Val Thr Cys Val Val Val Ala Leu Asp
            260                 265                 270

Pro Glu Asp Pro Glu Val Gln Ile Ser Trp Phe Val Asp Gly Lys Gln
            275                 280                 285

Met Gln Thr Ala Lys Thr Gln Pro Arg Glu Glu Gln Phe Ala Gly Thr
    290                 295                 300

Tyr Arg Val Val Ser Val Leu Pro Ile Gly His Gln Asp Trp Leu Lys
305                 310                 315                 320

Gly Lys Gln Phe Thr Cys Lys Val Asn Asn Lys Ala Leu Pro Ser Pro
                325                 330                 335

Ile Glu Arg Thr Ile Ser Lys Ala Arg Gly Gln Ala His Gln Pro Ser
            340                 345                 350

Val Tyr Val Leu Pro Pro Ser Arg Glu Glu Leu Ser Lys Asn Thr Val
            355                 360                 365

Ser Leu Thr Cys Leu Ile Lys Asp Phe Phe Pro Pro Asp Ile Asp Val
    370                 375                 380

Glu Trp Gln Ser Asn Gly Gln Gln Glu Pro Glu Ser Lys Tyr Arg Thr
385                 390                 395                 400

Thr Pro Pro Gln Leu Asp Glu Asp Gly Ser Tyr Phe Leu Tyr Ser Lys
                405                 410                 415

Leu Ser Val Asp Lys Ser Arg Trp Gln Arg Gly Asp Thr Phe Ile Cys
            420                 425                 430

Ala Val Met His Glu Ala Leu His Asn His Tyr Thr Gln Glu Ser Leu
            435                 440                 445

Ser His Ser Pro Gly Lys
    450

<210> SEQ ID NO 27
<211> LENGTH: 654
<212> TYPE: DNA
<213> ORGANISM: Artificial Sequence
<220> FEATURE:
<223> OTHER INFORMATION: human-canine chimera

<400> SEQUENCE: 27
gatattcaga tgacccagag cccgagcagc ctgagcgcga gcgtgggcga tcgcgtgacc     60
attacctgcc gcgcgagcca gggcattagc agctggctgg cgtggtatca gcagaaaccg    120

```
gaaaaagcgc cgaaaagcct gatttatgcg gcgagcagcc tgcagagcgg cgtgccgagc    180
cgctttagcg gcagcggcag cggcaccgat tttaccctga ccattagcag cctgcagccg    240
gaagattttg cgacctatta ttgccagcag tataacagct atccgccgac ctttggccag    300
ggcaccaaag tggaaattaa acgcaacgat gcgcagccgg cggtgtatct gtttcagccg    360
agcccggatc agctgcatac cggcagcgcg agcgtggtgt gcctgctgaa cagctttta t   420 ccgaaagata ttaacgtgaa atggaaagtg gatggcgtga ttcaggatac cggcattcag    480
gaaagcgtga ccgaacagga tagcaaagat agcacctata gcctgagcag caccctgacc    540
atgagcagca ccgaatatct gagccatgaa ctgtatagct gcgaaattac ccataaaagc    600
ctgccgagca ccctgattaa aagctttcag cgcagcgaat gccagcgcgt ggat          654
```

<210> SEQ ID NO 28
<211> LENGTH: 218
<212> TYPE: PRT
<213> ORGANISM: Artificial Sequence
<220> FEATURE:
<223> OTHER INFORMATION: human-canine chimera

<400> SEQUENCE: 28

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Gly Ile Ser Ser Trp
            20                  25                  30

Leu Ala Trp Tyr Gln Gln Lys Pro Glu Lys Ala Pro Lys Ser Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Asn Ser Tyr Pro Pro
                85                  90                  95

Thr Phe Gly Gln Gly Thr Lys Val Glu Ile Lys Arg Asn Asp Ala Gln
            100                 105                 110

Pro Ala Val Tyr Leu Phe Gln Pro Ser Pro Asp Gln Leu His Thr Gly
        115                 120                 125

Ser Ala Ser Val Val Cys Leu Leu Asn Ser Phe Tyr Pro Lys Asp Ile
    130                 135                 140

Asn Val Lys Trp Lys Val Asp Gly Val Ile Gln Asp Thr Gly Ile Gln
145                 150                 155                 160

Glu Ser Val Thr Glu Gln Asp Ser Lys Asp Ser Thr Tyr Ser Leu Ser
                165                 170                 175

Ser Thr Leu Thr Met Ser Ser Thr Glu Tyr Leu Ser His Glu Leu Tyr
            180                 185                 190

Ser Cys Glu Ile Thr His Lys Ser Leu Pro Ser Thr Leu Ile Lys Ser
        195                 200                 205

Phe Gln Arg Ser Glu Cys Gln Arg Val Asp
    210                 215
```

<210> SEQ ID NO 29
<211> LENGTH: 1374
<212> TYPE: DNA
<213> ORGANISM: Artificial Sequence
<220> FEATURE:
<223> OTHER INFORMATION: murine-canine chimera

<400> SEQUENCE: 29

```
gaagtgaaac tggtgaacag cggcggcggc ctggtgcagc cgggcaacag cctgcgcctg      60
agctgcgcga ccagcggctt tacctttacc gattttata tgagctgggt gcgccagccg     120
ccgggcaaag cgctggaatg gctgggcttt gtgcgcaacc gcgcgaacgg ctataccacc     180
gaatatagcg tgagcgtgaa aggccgcttt attattagcc gcgataactt tcagagcacc     240
ctgtttctgc agatgaacac cctgcgcgcg gaagatagcg gcacctatta ttgcgtgcgc     300
ggcccgggcg ataccgcgga ttataccatg gattattggg gccagggcac cagcgtgacc     360
gtgagcagcg cgagcaccac cgcgccagc gtgtttccgc tggcgccgag ctgcggcagc      420
accagcggca gcaccgtggc gctggcgtgc ctggtgagcg gctattttcc ggaaccggtg     480
accgtgagct ggaacagcgg cagcctgacc agcggcgtgc atacctttcc gagcgtgctg     540
cagagcagcg gcctgtatag cctgagcagc atggtgaccg tgccgagcag ccgctggccg     600
agcgaaacct ttacctgcaa cgtggcgcat ccggcgagca aaccaaagt ggataaaccg      660
gtgccgaaac gcgaaaacgg ccgcgtgccg cgccgccgg attgcccgaa atgcccggcg     720
ccggaaatgc tgggcggccc gagcgtgttt attttccgc cgaaaccgaa agataccctg      780
ctgattgcgc gcaccccgga agtgacctgc gtggtggtgg cgctggatcc ggaagatccg     840
gaagtgcaga ttagctggtt tgtggatggc aaacagatgc agaccgcgaa acccagccg      900
cgcgaagaac agtttgcggg cacctatcgc gtggtgagcg tgctgccgat ggccatcag      960
gattggctga aaggcaaaca gtttacctgc aaagtgaaca caaagcgct gccgagcccg     1020
attgaacgca ccattagcaa agcgcgcggc caggcgcatc agccgagcgt gtatgtgctg     1080
ccgccgagcc gcgaagaact gagcaaaaac accgtgagcc tgacctgcct gattaaagat     1140
tttttccgc cggatattga tgtggaatgg cagagcaacg gccagcagga accggaaagc     1200
aaatatcgca ccaccccgcc gcagctggat gaagatggca gctattttct gtatagcaaa     1260
ctgagcgtgg ataaaagccg ctggcagcgc ggcgatacct ttatttgcgc ggtgatgcat     1320
gaagcgctgc ataaccatta tacccaggaa agcctgagcc atagcccggg caaa           1374
```

<210> SEQ ID NO 30
<211> LENGTH: 458
<212> TYPE: PRT
<213> ORGANISM: Artificial Sequence
<220> FEATURE:
<223> OTHER INFORMATION: murine-canine chimera

<400> SEQUENCE: 30

```
Glu Val Lys Leu Val Asn Ser Gly Gly Gly Leu Val Gln Pro Gly Asn
1               5                   10                  15

Ser Leu Arg Leu Ser Cys Ala Thr Ser Gly Phe Thr Phe Thr Asp Phe
            20                  25                  30

Tyr Met Ser Trp Val Arg Gln Pro Gly Lys Ala Leu Glu Trp Leu
        35                  40                  45

Gly Phe Val Arg Asn Arg Ala Asn Gly Tyr Thr Thr Glu Tyr Ser Val
    50                  55                  60

Ser Val Lys Gly Arg Phe Ile Ile Ser Arg Asp Asn Phe Gln Ser Thr
65                  70                  75                  80

Leu Phe Leu Gln Met Asn Thr Leu Arg Ala Glu Asp Ser Gly Thr Tyr
                85                  90                  95

Tyr Cys Val Arg Gly Pro Gly Asp Thr Ala Asp Tyr Thr Met Asp Tyr
            100                 105                 110
```

```
Trp Gly Gln Gly Thr Ser Val Thr Val Ser Ser Ala Ser Thr Thr Ala
            115                 120                 125

Pro Ser Val Phe Pro Leu Ala Pro Ser Cys Gly Ser Thr Ser Gly Ser
        130                 135                 140

Thr Val Ala Leu Ala Cys Leu Val Ser Gly Tyr Phe Pro Glu Pro Val
145                 150                 155                 160

Thr Val Ser Trp Asn Ser Gly Ser Leu Thr Ser Gly Val His Thr Phe
                165                 170                 175

Pro Ser Val Leu Gln Ser Ser Gly Leu Tyr Ser Leu Ser Ser Met Val
            180                 185                 190

Thr Val Pro Ser Ser Arg Trp Pro Ser Glu Thr Phe Thr Cys Asn Val
        195                 200                 205

Ala His Pro Ala Ser Lys Thr Lys Val Asp Lys Pro Val Pro Lys Arg
210                 215                 220

Glu Asn Gly Arg Val Pro Arg Pro Asp Cys Pro Lys Cys Pro Ala
225                 230                 235                 240

Pro Glu Met Leu Gly Gly Pro Ser Val Phe Ile Phe Pro Pro Lys Pro
                245                 250                 255

Lys Asp Thr Leu Leu Ile Ala Arg Thr Pro Glu Val Thr Cys Val Val
            260                 265                 270

Val Ala Leu Asp Pro Glu Asp Pro Glu Val Gln Ile Ser Trp Phe Val
        275                 280                 285

Asp Gly Lys Gln Met Gln Thr Ala Lys Thr Gln Pro Arg Glu Glu Gln
290                 295                 300

Phe Ala Gly Thr Tyr Arg Val Val Ser Val Leu Pro Ile Gly His Gln
305                 310                 315                 320

Asp Trp Leu Lys Gly Lys Gln Phe Thr Cys Lys Val Asn Asn Lys Ala
                325                 330                 335

Leu Pro Ser Pro Ile Glu Arg Thr Ile Ser Lys Ala Arg Gly Gln Ala
            340                 345                 350

His Gln Pro Ser Val Tyr Val Leu Pro Pro Ser Arg Glu Glu Leu Ser
        355                 360                 365

Lys Asn Thr Val Ser Leu Thr Cys Leu Ile Lys Asp Phe Phe Pro Pro
370                 375                 380

Asp Ile Asp Val Glu Trp Gln Ser Asn Gly Gln Gln Glu Pro Glu Ser
385                 390                 395                 400

Lys Tyr Arg Thr Thr Pro Pro Gln Leu Asp Glu Asp Gly Ser Tyr Phe
                405                 410                 415

Leu Tyr Ser Lys Leu Ser Val Asp Lys Ser Arg Trp Gln Arg Gly Asp
            420                 425                 430

Thr Phe Ile Cys Ala Val Met His Glu Ala Leu His Asn His Tyr Thr
        435                 440                 445

Gln Glu Ser Leu Ser His Ser Pro Gly Lys
450                 455
```

<210> SEQ ID NO 31
<211> LENGTH: 645
<212> TYPE: DNA
<213> ORGANISM: Artificial Sequence
<220> FEATURE:
<223> OTHER INFORMATION: murine-canine chimera

<400> SEQUENCE: 31
caggcggtgg tgacccagga aagcgcgttt accaccagcc cgggcggcac cgtgattctg     60
acctgccgca gcagcaccgg cgcggtgacc accaacaact atgcgaactg ggtgcaggaa    120

```
aaaccggatc atctgtttac cggcctgatt ggcggcacca gcaaccgcgc gccgggcgtg    180
ccggtgcgct ttagcggcag cctgattggc gataaagcgg cgctgaccat taccggcgcg    240
cagaccgaag atgatggcat gtattttttgc gcgctgtggt ataccaccca ttttgtgttt    300
ggcggcggca ccaaagtgac cgtgctgggc cagccgaaag cgagcccgag cgtgaccctg    360
tttccgccga gcagcgaaga actgggcgcg aacaaagcga ccctggtgtg cctgattagc    420 gattttatc cgagcggcgt gaccgtggcg tggaaagcgg atggcagccc gattacccag    480
ggcgtggaaa ccaccaaacc gagcaaacag agcaacaaca aatatgcggc gagcagctat    540
ctgagcctga ccccggataa atggaaaagc catagcagct ttagctgcct ggtgacccat    600
gaaggcagca ccgtggaaaa aaaagtggcg ccggcggaat gcagc                    645
```

<210> SEQ ID NO 32
<211> LENGTH: 215
<212> TYPE: PRT
<213> ORGANISM: Artificial Sequence
<220> FEATURE:
<223> OTHER INFORMATION: murine-canine chimera

<400> SEQUENCE: 32

Gln Ala Val Val Thr Gln Glu Ser Ala Phe Thr Thr Ser Pro Gly Gly
1               5                   10                  15

Thr Val Ile Leu Thr Cys Arg Ser Ser Thr Gly Ala Val Thr Thr Asn
            20                  25                  30

Asn Tyr Ala Asn Trp Val Gln Glu Lys Pro Asp His Leu Phe Thr Gly
        35                  40                  45

Leu Ile Gly Gly Thr Ser Asn Arg Ala Pro Gly Val Pro Val Arg Phe
    50                  55                  60

Ser Gly Ser Leu Ile Gly Asp Lys Ala Ala Leu Thr Ile Thr Gly Ala
65                  70                  75                  80

Gln Thr Glu Asp Asp Gly Met Tyr Phe Cys Ala Leu Trp Tyr Thr Thr
                85                  90                  95

His Phe Val Phe Gly Gly Gly Thr Lys Val Thr Val Leu Gly Gln Pro
            100                 105                 110

Lys Ala Ser Pro Ser Val Thr Leu Phe Pro Pro Ser Ser Glu Glu Leu
        115                 120                 125

Gly Ala Asn Lys Ala Thr Leu Val Cys Leu Ile Ser Asp Phe Tyr Pro
    130                 135                 140

Ser Gly Val Thr Val Ala Trp Lys Ala Asp Gly Ser Pro Ile Thr Gln
145                 150                 155                 160

Gly Val Glu Thr Thr Lys Pro Ser Lys Gln Ser Asn Asn Lys Tyr Ala
                165                 170                 175

Ala Ser Ser Tyr Leu Ser Leu Thr Pro Asp Lys Trp Lys Ser His Ser
            180                 185                 190

Ser Phe Ser Cys Leu Val Thr His Glu Gly Ser Thr Val Glu Lys Lys
        195                 200                 205

Val Ala Pro Ala Glu Cys Ser
    210                 215

<210> SEQ ID NO 33
<211> LENGTH: 1365
<212> TYPE: DNA
<213> ORGANISM: Artificial Sequence
<220> FEATURE:
<223> OTHER INFORMATION: caninized mouse antibody

<400> SEQUENCE: 33

```
gaagtgcagc tggtgcagag cggcgcggaa gtgaaaaaac cgggcgcgag cgtgaaagtg      60
agctgcaaag cgagcggcta ccctttacc gattataaca tggattgggt gcgccaggcg     120
ccgggcgcgg gcctggattg gatgggcaac attaacccga cagcgaaag caccagctat      180
aaccagaaat ttaaaggccg cgtgaccctg accgcggata ccagcaccag caccgcgtat     240
atggaactga gcagcctgcg cgcgggcgat attgcggtgt attattgcac cgcgatggc      300
aaccgctatg atgcgtggtt tgcgtattgg ggccagggca ccctggtgac cgtgagcagc     360
gcgagcacca ccgcgccgag cgtgtttccg ctggcgccga ctgcggcag caccagcggc     420
agcaccgtgg cgctggcgtg cctggtgagc ggctattttc cggaaccggt gaccgtgagc     480
tggaacagcg gcagcctgac cagcggcgtg cataccttc gagcgtgct gcagagcagc      540
ggcctgtata gcctgagcag catggtgacc gtgccgagca gccgctggcc gagcgaaacc     600
tttacctgca acgtggcgca tccggcgagc aaaaccaaag tggataaacc ggtgccgaaa    660
cgcgaaaacg gccgcgtgcc gcgcccgccg gattgcccga atgcccggc gccggaaatg     720
ctgggcggcc cgagcgtgtt tattttttcccg ccgaaaccga agatacccct gctgattgcg    780
cgcacccgg aagtgacctg cgtggtggtg gatctggatc cggaagatcc ggaagtgcag     840
attagctggt tgtggatgg caaacagatg cagaccgcga aaacccagcc gcgcgaagaa     900
cagtttaacg gcacctatcg cgtggtgagc gtgctgccga ttggccatca ggattggctg     960
aaaggcaaac agtttaccctg caaagtgaac aacaaagcgc tgccgagccc gattgaacgc    1020
accattagca aagcgcgcgg ccaggcgcat cagccgagcg tgtatgtgct gccgccgagc    1080
cgcgaagaac tgagcaaaaa caccgtgagc ctgacctgcc tgattaaaga ttttttccg     1140
ccggatattg atgtggaatg gcagagcaac ggccagcagg aaccgaaag caaatatcgc     1200
accaccccgc cgcagctgga tgaagatggc agctatttc tgtatagcaa actgagcgtg    1260
gataaaagcc gctggcagcg cggcgatacc tttatttgcg cggtgatgca tgaagcgctg     1320
cataaccatt atacccagga aagcctgagc catagcccgg gcaaa                    1365
```

<210> SEQ ID NO 34  
<211> LENGTH: 455  
<212> TYPE: PRT  
<213> ORGANISM: Artificial Sequence  
<220> FEATURE:  
<223> OTHER INFORMATION: caninized mouse antibody

<400> SEQUENCE: 34

```
Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Asn Met Asp Trp Val Arg Gln Ala Pro Gly Ala Gly Leu Asp Trp Met
        35                  40                  45

Gly Asn Ile Asn Pro Asn Ser Glu Ser Thr Ser Tyr Asn Gln Lys Phe
    50                  55                  60

Lys Gly Arg Val Thr Leu Thr Ala Asp Thr Ser Thr Ser Thr Ala Tyr
65                  70                  75                  80

Met Glu Leu Ser Ser Leu Arg Ala Gly Asp Ile Ala Val Tyr Tyr Cys
                85                  90                  95

Thr Arg Asp Gly Asn Arg Tyr Asp Ala Trp Phe Ala Tyr Trp Gly Gln
            100                 105                 110
```

Gly Thr Leu Val Thr Val Ser Ser Ala Ser Thr Ala Pro Ser Val
            115                 120                 125

Phe Pro Leu Ala Pro Ser Cys Gly Ser Thr Ser Gly Ser Thr Val Ala
130                 135                 140

Leu Ala Cys Leu Val Ser Gly Tyr Phe Pro Glu Pro Val Thr Val Ser
145                 150                 155                 160

Trp Asn Ser Gly Ser Leu Thr Ser Gly Val His Thr Phe Pro Ser Val
                165                 170                 175

Leu Gln Ser Ser Gly Leu Tyr Ser Leu Ser Ser Met Val Thr Val Pro
            180                 185                 190

Ser Ser Arg Trp Pro Ser Glu Thr Phe Thr Cys Asn Val Ala His Pro
        195                 200                 205

Ala Ser Lys Thr Lys Val Asp Lys Pro Val Pro Lys Arg Glu Asn Gly
210                 215                 220

Arg Val Pro Arg Pro Asp Cys Pro Lys Cys Pro Ala Pro Glu Met
225                 230                 235                 240

Leu Gly Gly Pro Ser Val Phe Ile Phe Pro Pro Lys Pro Lys Asp Thr
                245                 250                 255

Leu Leu Ile Ala Arg Thr Pro Glu Val Thr Cys Val Val Val Asp Leu
            260                 265                 270

Asp Pro Glu Asp Pro Glu Val Gln Ile Ser Trp Phe Val Asp Gly Lys
        275                 280                 285

Gln Met Gln Thr Ala Lys Thr Gln Pro Arg Glu Glu Gln Phe Asn Gly
290                 295                 300

Thr Tyr Arg Val Val Ser Val Leu Pro Ile Gly His Gln Asp Trp Leu
305                 310                 315                 320

Lys Gly Lys Gln Phe Thr Cys Lys Val Asn Asn Lys Ala Leu Pro Ser
                325                 330                 335

Pro Ile Glu Arg Thr Ile Ser Lys Ala Arg Gly Gln Ala His Gln Pro
            340                 345                 350

Ser Val Tyr Val Leu Pro Pro Ser Arg Glu Glu Leu Ser Lys Asn Thr
        355                 360                 365

Val Ser Leu Thr Cys Leu Ile Lys Asp Phe Phe Pro Pro Asp Ile Asp
370                 375                 380

Val Glu Trp Gln Ser Asn Gly Gln Gln Glu Pro Glu Ser Lys Tyr Arg
385                 390                 395                 400

Thr Thr Pro Pro Gln Leu Asp Glu Asp Gly Ser Tyr Phe Leu Tyr Ser
                405                 410                 415

Lys Leu Ser Val Asp Lys Ser Arg Trp Gln Arg Gly Asp Thr Phe Ile
            420                 425                 430

Cys Ala Val Met His Glu Ala Leu His Asn His Tyr Thr Gln Glu Ser
        435                 440                 445

Leu Ser His Ser Pro Gly Lys
450                 455

<210> SEQ ID NO 35
<211> LENGTH: 1365
<212> TYPE: DNA
<213> ORGANISM: Artificial Sequence
<220> FEATURE:
<223> OTHER INFORMATION: caninized mouse antibody

<400> SEQUENCE: 35
gaagtgcagc tggtgcagag cggcgcggaa gtgaaaaaac cgggcgcgag cgtgaaagtg     60
agctgcaaag cgagcggcta tacctttacc gattataaca tggattgggt gcgccaggcg    120

```
ccgggcgcga gcctggattg gattggcaac attaacccga acagcgaaag caccagctat    180
aaccagaaat ttaaaggcaa agcgaccctg accgtggata aaagcaccag caccgcgtat    240
atggaactga gcagcctgcg cgcgggcgat attgcggtgt attattgcac ccgcgatggc    300
aaccgctatg atgcgtggtt tgcgtattgg ggccagggca ccctggtgac cgtgagcagc    360
gcgagcacca ccgcgccgag cgtgtttccg ctggcgccga gctgcggcag caccagcggc    420
agcaccgtgg cgctggcgtg cctggtgagc ggctattttc cggaaccggt gaccgtgagc    480
tggaacagcg gcagcctgac cagcggcgtg cataccttt cgagcgtgct gcagagcagc    540
ggcctgtata gcctgagcag catggtgacc gtgccgagca gccgctggcc gagcgaaacc    600
tttacctgca acgtggcgca tccggcgagc aaaaccaaag tggataaacc ggtgccgaaa    660
cgcgaaaacg gccgcgtgcc gcgcccgccg gattgcccga atgcccggc gccggaaatg    720 ctgggcggcc cgagcgtgtt tatttttccg ccgaaaccga agatacccct gctgattgcg    780
cgcaccccgg aagtgacctg cgtggtggtg atctggatc cggaagatcc ggaagtgcag    840
attagctggt ttgtggatgg caaacagatg cagaccgcga aacccagcc gcgcgaagaa    900 cagtttaacg gcacctatcg cgtggtgagc gtgctgccga ttggccatca ggattggctg    960
aaaggcaaac agtttacctg caaagtgaac aacaaagcgc tgccgagccc gattgaacgc    1020
accattagca aagcgcgcgg ccaggcgcat cagccgagcg tgtatgtgct gccgccgagc    1080
cgcgaagaac tgagcaaaaa caccgtgagc ctgacctgcc tgattaaaga ttttttccg    1140 ccggatattg atgtggaatg gcagagcaac ggccagcagg aaccggaaag caaatatcgc    1200 accacccgc gcagctgga tgaagatggc agctattttc tgtatagcaa actgagcgtg    1260
gataaaagcc gctggcagcg cggcgatacc tttatttgcg cggtgatgca tgaagcgctg    1320
cataaccatt atacccagga aagcctgagc catagcccgg gcaaa              1365
```

<210> SEQ ID NO 36
<211> LENGTH: 455
<212> TYPE: PRT
<213> ORGANISM: Artificial Sequence
<220> FEATURE:
<223> OTHER INFORMATION: caninized mouse antibody

<400> SEQUENCE: 36

```
Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Asn Met Asp Trp Val Arg Gln Ala Pro Gly Ala Ser Leu Asp Trp Ile
        35                  40                  45

Gly Asn Ile Asn Pro Asn Ser Glu Ser Thr Ser Tyr Asn Gln Lys Phe
    50                  55                  60

Lys Gly Lys Ala Thr Leu Thr Val Asp Lys Ser Thr Ser Thr Ala Tyr
65                  70                  75                  80

Met Glu Leu Ser Ser Leu Arg Ala Gly Asp Ile Ala Val Tyr Tyr Cys
                85                  90                  95

Thr Arg Asp Gly Asn Arg Tyr Asp Ala Trp Phe Ala Tyr Trp Gly Gln
            100                 105                 110

Gly Thr Leu Val Thr Val Ser Ser Ala Ser Thr Thr Ala Pro Ser Val
        115                 120                 125

Phe Pro Leu Ala Pro Ser Cys Gly Ser Thr Ser Gly Ser Thr Val Ala
    130                 135                 140
```

Leu Ala Cys Leu Val Ser Gly Tyr Phe Pro Glu Pro Val Thr Val Ser
145                 150                 155                 160

Trp Asn Ser Gly Ser Leu Thr Ser Gly Val His Thr Phe Pro Ser Val
            165                 170                 175

Leu Gln Ser Ser Gly Leu Tyr Ser Leu Ser Ser Met Val Thr Val Pro
        180                 185                 190

Ser Ser Arg Trp Pro Ser Glu Thr Phe Thr Cys Asn Val Ala His Pro
        195                 200                 205

Ala Ser Lys Thr Lys Val Asp Lys Pro Val Pro Lys Arg Glu Asn Gly
    210                 215                 220

Arg Val Pro Arg Pro Pro Asp Cys Pro Lys Cys Pro Ala Pro Glu Met
225                 230                 235                 240

Leu Gly Gly Pro Ser Val Phe Ile Phe Pro Pro Lys Pro Lys Asp Thr
                245                 250                 255

Leu Leu Ile Ala Arg Thr Pro Glu Val Thr Cys Val Val Val Asp Leu
            260                 265                 270

Asp Pro Glu Asp Pro Glu Val Gln Ile Ser Trp Phe Val Asp Gly Lys
        275                 280                 285

Gln Met Gln Thr Ala Lys Thr Gln Pro Arg Glu Glu Gln Phe Asn Gly
    290                 295                 300

Thr Tyr Arg Val Val Ser Val Leu Pro Ile Gly His Gln Asp Trp Leu
305                 310                 315                 320

Lys Gly Lys Gln Phe Thr Cys Lys Val Asn Asn Lys Ala Leu Pro Ser
                325                 330                 335

Pro Ile Glu Arg Thr Ile Ser Lys Ala Arg Gly Gln Ala His Gln Pro
            340                 345                 350

Ser Val Tyr Val Leu Pro Pro Ser Arg Glu Glu Leu Ser Lys Asn Thr
        355                 360                 365

Val Ser Leu Thr Cys Leu Ile Lys Asp Phe Phe Pro Pro Asp Ile Asp
370                 375                 380

Val Glu Trp Gln Ser Asn Gly Gln Gln Glu Pro Glu Ser Lys Tyr Arg
385                 390                 395                 400

Thr Thr Pro Pro Gln Leu Asp Glu Asp Gly Ser Tyr Phe Leu Tyr Ser
                405                 410                 415

Lys Leu Ser Val Asp Lys Ser Arg Trp Gln Arg Gly Asp Thr Phe Ile
            420                 425                 430

Cys Ala Val Met His Glu Ala Leu His Asn His Tyr Thr Gln Glu Ser
        435                 440                 445

Leu Ser His Ser Pro Gly Lys
        450                 455

<210> SEQ ID NO 37
<211> LENGTH: 1365
<212> TYPE: DNA
<213> ORGANISM: Artificial Sequence
<220> FEATURE:
<223> OTHER INFORMATION: caninized mouse antibody

<400> SEQUENCE: 37
gaagtgcagc tggtgcagag cggcgcggaa gtgaaaaaac cgggcgcgag cgtgaaagtg       60
agctgcaaag cgagcggcta cctttacc gattataaca tggattgggt gcgccaggcg       120
catggcgcga gcctggattg gattggcaac attaacccga cagcgaaag caccagctat       180 aaccagaaat ttaaaggcaa agcgaccctg accgtggata aaagcaccag caccgcgtat       240

```
atggaactga gcagcctgcg cgcgggcgat attgcggtgt attattgcac ccgcgatggc    300
aaccgctatg atgcgtggtt tgcgtattgg ggccagggca ccctggtgac cgtgagcagc    360
gcgagcacca ccgcgccgag cgtgtttccg ctggcgccga gctgcggcag caccagcggc    420
agcaccgtgg cgctggcgtg cctggtgagc ggctattttc cggaaccggt gaccgtgagc    480
tggaacagcg gcagcctgac cagcggcgtg catacctttc cgagcgtgct gcagagcagc    540
ggcctgtata gcctgagcag catggtgacc gtgccgagca ccgctggcc gagcgaaacc    600
tttacctgca acgtggcgca tccggcgagc aaaaccaaag tggataaacc ggtgccgaaa    660
cgcgaaaacg gccgcgtgcc cgcccgccg gattgcccga atgcccggc gccggaaatg    720
ctgggcggcc cgagcgtgtt tattttccg ccgaaaccga agatacccct gctgattgcg    780
cgcaccccgg aagtgacctg cgtggtggtg gatctggatc cggaagatcc ggaagtgcag    840
attagctggt ttgtggatgg caaacagatg cagaccgcga aaacccagcc gcgcgaagaa    900
cagtttaacg gcacctatcg cgtggtgagc gtgctgccga ttggccatca ggattggctg    960
aaaggcaaac agtttacctg caaagtgaac aacaaagcgc tgccgagccc gattgaacgc   1020
accattagca aagcgcgcgg ccaggcgcat cagccgagcg tgtatgtgct gccgccgagc   1080
cgcgaagaac tgagcaaaaa caccgtgagc ctgacctgcc tgattaaaga ttttttttccg   1140
ccggatattg atgtggaatg gcagagcaac ggccagcagg aaccggaaag caaatatcgc   1200
accaccccgc cgcagctgga tgaagatggc agctattttc tgtatagcaa actgagcgtg   1260
gataaaagcc gctggcagcg cggcgatacc tttatttgcg cggtgatgca tgaagcgctg   1320
cataaccatt atacccagga aagcctgagc catagcccgg gcaaa                    1365
```

<210> SEQ ID NO 38
<211> LENGTH: 455
<212> TYPE: PRT
<213> ORGANISM: Artificial Sequence
<220> FEATURE:
<223> OTHER INFORMATION: caninized mouse antibody

<400> SEQUENCE: 38

```
Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Asn Met Asp Trp Val Arg Gln Ala His Gly Ala Ser Leu Asp Trp Ile
        35                  40                  45

Gly Asn Ile Asn Pro Asn Ser Glu Ser Thr Ser Tyr Asn Gln Lys Phe
    50                  55                  60

Lys Gly Lys Ala Thr Leu Thr Val Asp Lys Ser Thr Ser Thr Ala Tyr
65                  70                  75                  80

Met Glu Leu Ser Ser Leu Arg Ala Gly Asp Ile Ala Val Tyr Tyr Cys
                85                  90                  95

Thr Arg Asp Gly Asn Arg Tyr Asp Ala Trp Phe Ala Tyr Trp Gly Gln
            100                 105                 110

Gly Thr Leu Val Thr Val Ser Ser Ala Ser Thr Thr Ala Pro Ser Val
        115                 120                 125

Phe Pro Leu Ala Pro Ser Cys Gly Ser Thr Ser Gly Ser Thr Val Ala
    130                 135                 140

Leu Ala Cys Leu Val Ser Gly Tyr Phe Pro Glu Pro Val Thr Val Ser
145                 150                 155                 160

Trp Asn Ser Gly Ser Leu Thr Ser Gly Val His Thr Phe Pro Ser Val
```

165                 170                 175
Leu Gln Ser Ser Gly Leu Tyr Ser Leu Ser Ser Met Val Thr Val Pro
            180                 185                 190

Ser Ser Arg Trp Pro Ser Glu Thr Phe Thr Cys Asn Val Ala His Pro
            195                 200                 205

Ala Ser Lys Thr Lys Val Asp Lys Pro Val Pro Lys Arg Glu Asn Gly
            210                 215                 220

Arg Val Pro Arg Pro Pro Asp Cys Pro Lys Cys Pro Ala Pro Glu Met
225                 230                 235                 240

Leu Gly Gly Pro Ser Val Phe Ile Phe Pro Pro Lys Pro Lys Asp Thr
            245                 250                 255

Leu Leu Ile Ala Arg Thr Pro Glu Val Thr Cys Val Val Val Asp Leu
            260                 265                 270

Asp Pro Glu Asp Pro Glu Val Gln Ile Ser Trp Phe Val Asp Gly Lys
            275                 280                 285

Gln Met Gln Thr Ala Lys Thr Gln Pro Arg Glu Glu Gln Phe Asn Gly
            290                 295                 300

Thr Tyr Arg Val Val Ser Val Leu Pro Ile Gly His Gln Asp Trp Leu
305                 310                 315                 320

Lys Gly Lys Gln Phe Thr Cys Lys Val Asn Asn Lys Ala Leu Pro Ser
            325                 330                 335

Pro Ile Glu Arg Thr Ile Ser Lys Ala Arg Gly Gln Ala His Gln Pro
            340                 345                 350

Ser Val Tyr Val Leu Pro Pro Ser Arg Glu Glu Leu Ser Lys Asn Thr
            355                 360                 365

Val Ser Leu Thr Cys Leu Ile Lys Asp Phe Phe Pro Pro Asp Ile Asp
            370                 375                 380

Val Glu Trp Gln Ser Asn Gly Gln Gln Glu Pro Glu Ser Lys Tyr Arg
385                 390                 395                 400

Thr Thr Pro Pro Gln Leu Asp Glu Asp Gly Ser Tyr Phe Leu Tyr Ser
            405                 410                 415

Lys Leu Ser Val Asp Lys Ser Arg Trp Gln Arg Gly Asp Thr Phe Ile
            420                 425                 430

Cys Ala Val Met His Glu Ala Leu His Asn His Tyr Thr Gln Glu Ser
            435                 440                 445

Leu Ser His Ser Pro Gly Lys
            450                 455

<210> SEQ ID NO 39
<211> LENGTH: 1365
<212> TYPE: DNA
<213> ORGANISM: Artificial Sequence
<220> FEATURE:
<223> OTHER INFORMATION: caninized mouse antibody

<400> SEQUENCE: 39
gaagtgcagc tgcagcagag cggcgcggaa gtgaaaaaac cgggcgcgag cgtgaaagtg      60
agctgcaaag cgagcggcta cctttacc gattataaca tggattgggt gcgccaggcg      120
ccgggcgcga gcctggattg gattggcaac attaacccga cagcgaaag caccagctat      180 aaccagaaat ttaaaggcaa agcgaccctg accgtggata aaagcaccag caccgcgtat      240
atggaactgc gcagcctgac cgcgggcgat attgcggtgt attattgcac cgcgatggc      300 aaccgctatg atgcgtggtt tgcgtattgg ggccagggca ccctggtgac cgtgagcagc      360
gcgagcacca ccgcgccgag cgtgtttccg ctggcgccga gctgcggcag caccagcggc      420

```
agcaccgtgg cgctggcgtg cctggtgagc ggctatttc cggaaccggt gaccgtgagc      480
tggaacagcg gcagcctgac cagcggcgtg catacctttc cgagcgtgct gcagagcagc      540
ggcctgtata gcctgagcag catggtgacc gtgccgagca gccgctggcc gagcgaaacc      600
tttacctgca acgtggcgca tccggcgagc aaaaccaaag tggataaacc ggtgccgaaa      660
cgcgaaaacg gccgcgtgcc gcgcccgccg gattgcccga atgcccggc gccggaaatg      720 ctgggcggcc cgagcgtgtt tatttttccg ccgaaaccga agataccct gctgattgcg      780 cgcacccgg aagtgacctg cgtggtggtg atctggatc cggaagatcc ggaagtgcag      840
attagctggt ttgtggatgg caaacagatg cagaccgcga aaccccagcc gcgcgaagaa      900
cagtttaacg gcacctatcg cgtggtgagc gtgctgccga ttggccatca ggattggctg      960
aaaggcaaac agtttacctg caaagtgaac aacaaagcgc tgccgagccc gattgaacgc     1020
accattagca agcgcgcgg ccaggcgcat cagccgagcg tgtatgtgct gccgccgagc     1080
cgcgaagaac tgagcaaaaa caccgtgagc ctgacctgcc tgattaaaga ttttttccg     1140 ccggatattg atgtggaatg gcagagcaac ggccagcagg aaccggaaag caaatatcgc     1200
accaccccgc cgcagctgga tgaagatggc agctatttc tgtatagcaa actgagcgtg     1260
gataaaagcc gctggcagcg cggcgatacc tttatttgcg cggtgatgca tgaagcgctg     1320
cataaccatt atacccagga aagcctgagc catagcccgg gcaaa                     1365
```

<210> SEQ ID NO 40
<211> LENGTH: 455
<212> TYPE: PRT
<213> ORGANISM: Artificial Sequence
<220> FEATURE:
<223> OTHER INFORMATION: caninized mouse antibody

<400> SEQUENCE: 40

```
Glu Val Gln Leu Gln Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Asn Met Asp Trp Val Arg Gln Ala Pro Gly Ala Ser Leu Asp Trp Ile
        35                  40                  45

Gly Asn Ile Asn Pro Asn Ser Glu Ser Thr Ser Tyr Asn Gln Lys Phe
    50                  55                  60

Lys Gly Lys Ala Thr Leu Thr Val Asp Lys Ser Thr Ser Thr Ala Tyr
65                  70                  75                  80

Met Glu Leu Arg Ser Leu Thr Ala Gly Asp Ile Ala Val Tyr Tyr Cys
                85                  90                  95

Thr Arg Asp Gly Asn Arg Tyr Asp Ala Trp Phe Ala Tyr Trp Gly Gln
            100                 105                 110

Gly Thr Leu Val Thr Val Ser Ser Ala Ser Thr Thr Ala Pro Ser Val
        115                 120                 125

Phe Pro Leu Ala Pro Ser Cys Gly Ser Thr Ser Gly Ser Thr Val Ala
    130                 135                 140

Leu Ala Cys Leu Val Ser Gly Tyr Phe Pro Glu Pro Val Thr Val Ser
145                 150                 155                 160

Trp Asn Ser Gly Ser Leu Thr Ser Gly Val His Thr Phe Pro Ser Val
                165                 170                 175

Leu Gln Ser Ser Gly Leu Tyr Ser Leu Ser Ser Met Val Thr Val Pro
            180                 185                 190
```

| | | | | | | | | | | | |
|---|---|---|---|---|---|---|---|---|---|---|---|
|Ser|Ser|Arg|Trp|Pro|Ser|Glu|Thr|Phe|Thr|Cys|Asn|Val|Ala|His|Pro|
| | |195| | | |200| | | |205| | | | | |

Ser Ser Arg Trp Pro Ser Glu Thr Phe Thr Cys Asn Val Ala His Pro
                195                 200                 205

Ala Ser Lys Thr Lys Val Asp Lys Pro Val Pro Lys Arg Glu Asn Gly
    210                 215                 220

Arg Val Pro Arg Pro Pro Asp Cys Pro Lys Cys Pro Ala Pro Glu Met
225                 230                 235                 240

Leu Gly Gly Pro Ser Val Phe Ile Phe Pro Pro Lys Pro Lys Asp Thr
                245                 250                 255

Leu Leu Ile Ala Arg Thr Pro Glu Val Thr Cys Val Val Val Asp Leu
                260                 265                 270

Asp Pro Glu Asp Pro Glu Val Gln Ile Ser Trp Phe Val Asp Gly Lys
            275                 280                 285

Gln Met Gln Thr Ala Lys Thr Gln Pro Arg Glu Glu Gln Phe Asn Gly
    290                 295                 300

Thr Tyr Arg Val Val Ser Val Leu Pro Ile Gly His Gln Asp Trp Leu
305                 310                 315                 320

Lys Gly Lys Gln Phe Thr Cys Lys Val Asn Asn Lys Ala Leu Pro Ser
                325                 330                 335

Pro Ile Glu Arg Thr Ile Ser Lys Ala Arg Gly Gln Ala His Gln Pro
                340                 345                 350

Ser Val Tyr Val Leu Pro Pro Ser Arg Glu Glu Leu Ser Lys Asn Thr
            355                 360                 365

Val Ser Leu Thr Cys Leu Ile Lys Asp Phe Phe Pro Pro Asp Ile Asp
    370                 375                 380

Val Glu Trp Gln Ser Asn Gly Gln Gln Glu Pro Glu Ser Lys Tyr Arg
385                 390                 395                 400

Thr Thr Pro Pro Gln Leu Asp Glu Asp Gly Ser Tyr Phe Leu Tyr Ser
                405                 410                 415

Lys Leu Ser Val Asp Lys Ser Arg Trp Gln Arg Gly Asp Thr Phe Ile
                420                 425                 430

Cys Ala Val Met His Glu Ala Leu His Asn His Tyr Thr Gln Glu Ser
            435                 440                 445

Leu Ser His Ser Pro Gly Lys
    450                 455

<210> SEQ ID NO 41
<211> LENGTH: 651
<212> TYPE: DNA
<213> ORGANISM: Artificial Sequence
<220> FEATURE:
<223> OTHER INFORMATION: caninized mouse antibody

<400> SEQUENCE: 41

```
gatattgtga tgacccagac cccgctgagc ctgagcgtga gcccgggcga accggcgagc     60
attagctgca gcgcgagcag cagcgtgacc tatatgcatt ggtttcgcca taaaccgggc    120
cagagcccgc agagcctgat ttatagcacc agcattctgg cgagcggcgt gccggatcgc    180
tttagcggca gcggcagcgg caccgatttt accctgaaaa ttagccgcgt ggaagcggat    240
gatgcgggcg tgtattattg ccagcagcgc accagctatc cgctgacctt tggcaccggc    300
accaaactgg aactgaaacg caacgatgcg cagccggcgg tgtatctgtt tcagccgagc    360
ccggatcagc tgcataccgg cagcgcgagc gtggtgtgcc tgctgaacag ctttatccg     420
aaagatatta cgtgaaatg gaaagtggat ggcgtgattc aggataccgg cattcaggaa    480
agcgtgaccg aacaggatag caaagatagc acctatagcc tgagcagcac cctgaccatg    540
```

```
agcagcaccg aatatctgag ccatgaactg tatagctgcg aaattaccca taaaagcctg    600
ccgagcaccc tgattaaaag ctttcagcgc agcgaatgcc agcgcgtgga t             651
```

```
<210> SEQ ID NO 42
<211> LENGTH: 217
<212> TYPE: PRT
<213> ORGANISM: Artificial Sequence
<220> FEATURE:
<223> OTHER INFORMATION: caninized mouse antibody

<400> SEQUENCE: 42
```

```
Asp Ile Val Met Thr Gln Thr Pro Leu Ser Leu Ser Val Ser Pro Gly
1               5                   10                  15

Glu Pro Ala Ser Ile Ser Cys Ser Ala Ser Ser Val Thr Tyr Met
            20                  25                  30

His Trp Phe Arg His Lys Pro Gly Gln Ser Pro Gln Ser Leu Ile Tyr
        35                  40                  45

Ser Thr Ser Ile Leu Ala Ser Gly Val Pro Asp Arg Phe Ser Gly Ser
    50                  55                  60

Gly Ser Gly Thr Asp Phe Thr Leu Lys Ile Ser Arg Val Glu Ala Asp
65                  70                  75                  80

Asp Ala Gly Val Tyr Tyr Cys Gln Gln Arg Thr Ser Tyr Pro Leu Thr
                85                  90                  95

Phe Gly Thr Gly Thr Lys Leu Glu Leu Lys Arg Asn Asp Ala Gln Pro
            100                 105                 110

Ala Val Tyr Leu Phe Gln Pro Ser Pro Asp Gln Leu His Thr Gly Ser
        115                 120                 125

Ala Ser Val Val Cys Leu Leu Asn Ser Phe Tyr Pro Lys Asp Ile Asn
    130                 135                 140

Val Lys Trp Lys Val Asp Gly Val Ile Gln Asp Thr Gly Ile Gln Glu
145                 150                 155                 160

Ser Val Thr Glu Gln Asp Ser Lys Asp Ser Thr Tyr Ser Leu Ser Ser
                165                 170                 175

Thr Leu Thr Met Ser Ser Thr Glu Tyr Leu Ser His Glu Leu Tyr Ser
            180                 185                 190

Cys Glu Ile Thr His Lys Ser Leu Pro Ser Thr Leu Ile Lys Ser Phe
        195                 200                 205

Gln Arg Ser Glu Cys Gln Arg Val Asp
    210                 215
```

```
<210> SEQ ID NO 43
<211> LENGTH: 651
<212> TYPE: DNA
<213> ORGANISM: Artificial Sequence
<220> FEATURE:
<223> OTHER INFORMATION: caninized mouse antibody

<400> SEQUENCE: 43
```

```
cagattgtga tgacccagac cccgctgagc ctgagcgtga gcccgggcga accggcgagc    60
attagctgca gcgcgagcag cagcgtgacc tatatgcatt ggtttcagca gaaaccgggc   120
cagagcccgc agagcctgat ttatagcacc agcattctgg cgagcggcgt gccggatcgc   180
tttagcggca gcggcagcgg caccgatttt accctgaaaa ttagccgcgt ggaagcggat   240
gatgcgggcg tgtattattg ccagcagcgc accagctatc cgctgacctt tggcaccggc   300
accaaactgg aactgaaacg caacgatgcg cagccggcgg tgtatctgtt tcagccgagc   360
ccggatcagc tgcataccgg cagcgcgagc gtggtgtgcc tgctgaacag cttttatccg   420
```

-continued

```
aaagatatta acgtgaaatg gaaagtggat ggcgtgattc aggataccgg cattcaggaa      480
agcgtgaccg aacaggatag caaagatagc acctatagcc tgagcagcac cctgaccatg      540
agcagcaccg aatatctgag ccatgaactg tatagctgcg aaattaccca taaaagcctg      600
ccgagcaccc tgattaaaag ctttcagcgc agcgaatgcc agcgcgtgga t               651
```

<210> SEQ ID NO 44
<211> LENGTH: 217
<212> TYPE: PRT
<213> ORGANISM: Artificial Sequence
<220> FEATURE:
<223> OTHER INFORMATION: caninized mouse antibody

<400> SEQUENCE: 44

```
Gln Ile Val Met Thr Gln Thr Pro Leu Ser Leu Ser Val Ser Pro Gly
1               5                   10                  15

Glu Pro Ala Ser Ile Ser Cys Ser Ala Ser Ser Val Thr Tyr Met
            20                  25                  30

His Trp Phe Gln Gln Lys Pro Gly Gln Ser Pro Gln Ser Leu Ile Tyr
        35                  40                  45

Ser Thr Ser Ile Leu Ala Ser Gly Val Pro Asp Arg Phe Ser Gly Ser
    50                  55                  60

Gly Ser Gly Thr Asp Phe Thr Leu Lys Ile Ser Arg Val Glu Ala Asp
65                  70                  75                  80

Asp Ala Gly Val Tyr Tyr Cys Gln Gln Arg Thr Ser Tyr Pro Leu Thr
                85                  90                  95

Phe Gly Thr Gly Thr Lys Leu Glu Leu Lys Arg Asn Asp Ala Gln Pro
            100                 105                 110

Ala Val Tyr Leu Phe Gln Pro Ser Pro Asp Gln Leu His Thr Gly Ser
        115                 120                 125

Ala Ser Val Val Cys Leu Leu Asn Ser Phe Tyr Pro Lys Asp Ile Asn
    130                 135                 140

Val Lys Trp Lys Val Asp Gly Val Ile Gln Asp Thr Gly Ile Gln Glu
145                 150                 155                 160

Ser Val Thr Glu Gln Asp Ser Lys Asp Ser Thr Tyr Ser Leu Ser Ser
                165                 170                 175

Thr Leu Thr Met Ser Ser Thr Glu Tyr Leu Ser His Glu Leu Tyr Ser
            180                 185                 190

Cys Glu Ile Thr His Lys Ser Leu Pro Ser Thr Leu Ile Lys Ser Phe
        195                 200                 205

Gln Arg Ser Glu Cys Gln Arg Val Asp
    210                 215
```

<210> SEQ ID NO 45
<211> LENGTH: 651
<212> TYPE: DNA
<213> ORGANISM: Artificial Sequence
<220> FEATURE:
<223> OTHER INFORMATION: caninized mouse antibody

<400> SEQUENCE: 45

```
cagattgtgc tgacccagac cccgctgagc ctgagcgtga gcccgggcga accggcgagc      60
attagctgca gcgcgagcag cagcgtgacc tatatgcatt ggtttcagca gaaaccgggc      120
cagagcccga aaagctggat ttatagcacc agcattctgg cgagcggcgt gccggatcgc      180
tttagcggca gcggcagcgg caccgatttt accctgaaaa ttagccgcgt ggaagcggat      240
```

```
gatgcgggcg tgtattattg ccagcagcgc accagctatc cgctgacctt tggcaccggc    300
accaaactgg aactgaaacg caacgatgcg cagccggcgg tgtatctgtt tcagccgagc    360
ccggatcagc tgcataccgg cagcgcgagc gtggtgtgcc tgctgaacag cttttatccg    420
aaagatatta cgtgaaatg gaaagtggat ggcgtgattc aggataccgg cattcaggaa     480
agcgtgaccg aacaggatag caaagatagc acctatagcc tgagcagcac cctgaccatg    540
agcagcaccg aatatctgag ccatgaactg tatagctgcg aaattaccca taaaagcctg    600
ccgagcaccc tgattaaaag ctttcagcgc agcgaatgcc agcgcgtgga t             651
```

<210> SEQ ID NO 46
<211> LENGTH: 217
<212> TYPE: PRT
<213> ORGANISM: Artificial Sequence
<220> FEATURE:
<223> OTHER INFORMATION: caninized mouse antibody

<400> SEQUENCE: 46

```
Gln Ile Val Leu Thr Gln Thr Pro Leu Ser Leu Ser Val Ser Pro Gly
1               5                  10                  15

Glu Pro Ala Ser Ile Ser Cys Ser Ala Ser Ser Val Thr Tyr Met
            20                  25                  30

His Trp Phe Gln Gln Lys Pro Gly Gln Ser Pro Lys Ser Trp Ile Tyr
        35                  40                  45

Ser Thr Ser Ile Leu Ala Ser Gly Val Pro Asp Arg Phe Ser Gly Ser
    50                  55                  60

Gly Ser Gly Thr Asp Phe Thr Leu Lys Ile Ser Arg Val Glu Ala Asp
65                  70                  75                  80

Asp Ala Gly Val Tyr Tyr Cys Gln Gln Arg Thr Ser Tyr Pro Leu Thr
                85                  90                  95

Phe Gly Thr Gly Thr Lys Leu Glu Leu Lys Arg Asn Asp Ala Gln Pro
            100                 105                 110

Ala Val Tyr Leu Phe Gln Pro Ser Pro Asp Gln Leu His Thr Gly Ser
        115                 120                 125

Ala Ser Val Val Cys Leu Leu Asn Ser Phe Tyr Pro Lys Asp Ile Asn
    130                 135                 140

Val Lys Trp Lys Val Asp Gly Val Ile Gln Asp Thr Gly Ile Gln Glu
145                 150                 155                 160

Ser Val Thr Glu Gln Asp Ser Lys Asp Ser Thr Tyr Ser Leu Ser Ser
                165                 170                 175

Thr Leu Thr Met Ser Ser Thr Glu Tyr Leu Ser His Glu Leu Tyr Ser
            180                 185                 190

Cys Glu Ile Thr His Lys Ser Leu Pro Ser Thr Leu Ile Lys Ser Phe
        195                 200                 205

Gln Arg Ser Glu Cys Gln Arg Val Asp
    210                 215
```

<210> SEQ ID NO 47
<211> LENGTH: 15
<212> TYPE: DNA
<213> ORGANISM: Mus musculus

<400> SEQUENCE: 47

```
gattataaca tggat                                                      15
```

<210> SEQ ID NO 48
<211> LENGTH: 5

```
<212> TYPE: PRT
<213> ORGANISM: Mus musculus

<400> SEQUENCE: 48

Asp Tyr Asn Met Asp
1               5

<210> SEQ ID NO 49
<211> LENGTH: 51
<212> TYPE: DNA
<213> ORGANISM: Mus musculus

<400> SEQUENCE: 49
aacattaacc cgaacagcga aagcaccagc tataaccaga aatttaaagg c          51

<210> SEQ ID NO 50
<211> LENGTH: 17
<212> TYPE: PRT
<213> ORGANISM: Mus musculus

<400> SEQUENCE: 50

Asn Ile Asn Pro Asn Ser Glu Ser Thr Ser Tyr Asn Gln Lys Phe Lys
1               5                   10                  15

Gly

<210> SEQ ID NO 51
<211> LENGTH: 33
<212> TYPE: DNA
<213> ORGANISM: Mus musculus

<400> SEQUENCE: 51
gatggcaacc gctatgatgc gtggtttgcg tat                              33

<210> SEQ ID NO 52
<211> LENGTH: 11
<212> TYPE: PRT
<213> ORGANISM: Mus musculus

<400> SEQUENCE: 52

Asp Gly Asn Arg Tyr Asp Ala Trp Phe Ala Tyr
1               5                   10

<210> SEQ ID NO 53
<211> LENGTH: 30
<212> TYPE: DNA
<213> ORGANISM: Mus musculus

<400> SEQUENCE: 53
agcgcgagca gcagcgtgac ctatatgcat                                  30

<210> SEQ ID NO 54
<211> LENGTH: 10
<212> TYPE: PRT
<213> ORGANISM: Mus musculus

<400> SEQUENCE: 54

Ser Ala Ser Ser Ser Val Thr Tyr Met His
1               5                   10

<210> SEQ ID NO 55
<211> LENGTH: 21
<212> TYPE: DNA
<213> ORGANISM: Mus musculus
```

<400> SEQUENCE: 55
agcaccagca ttctggcgag c                                              21

<210> SEQ ID NO 56
<211> LENGTH: 7
<212> TYPE: PRT
<213> ORGANISM: Mus musculus

<400> SEQUENCE: 56

Ser Thr Ser Ile Leu Ala Ser
1               5

<210> SEQ ID NO 57
<211> LENGTH: 27
<212> TYPE: DNA
<213> ORGANISM: Mus musculus

<400> SEQUENCE: 57
cagcagcgca ccagctatcc gctgacc                                        27

<210> SEQ ID NO 58
<211> LENGTH: 9
<212> TYPE: PRT
<213> ORGANISM: Mus musculus

<400> SEQUENCE: 58

Gln Gln Arg Thr Ser Tyr Pro Leu Thr
1               5

<210> SEQ ID NO 59
<211> LENGTH: 1365
<212> TYPE: DNA
<213> ORGANISM: Artificial Sequence
<220> FEATURE:
<223> OTHER INFORMATION: caninized murine antibody

<400> SEQUENCE: 59
gaagtgcagc tggtgcagag cggcgcggaa gtgaaaaaac cgggcgcgag cgtgaaagtg      60
agctgcaaag cgagcggcta cctttacc gattataaca tggattgggt gcgccaggcg      120
ccgggcgcgg gcctggattg gatgggcaac attaacccga cagcgaaag caccagctat      180 aaccagaaat ttaaaggccg cgtgacccctg accgcggata ccagcaccag caccgcgtat      240
atggaactga gcagcctgcg cgcgggcgat attgcggtgt attattgcac ccgcgatggc      300
aaccgctatg atgcgtggtt tgcgtattgg ggccagggca ccctggtgac cgtgagcagc      360
gcgagcacca ccgcgccgag cgtgtttccg ctggcgccga gctgcggcag caccagcggc      420
agcaccgtgg cgctggcgtg cctggtgagc ggctattttc cggaaccggt gaccgtgagc      480
tggaacagcg gcagcctgac cagcggcgtg cataccttc gagcgtgct gcagagcagc      540 ggcctgtata gcctgagcag catggtgacc gtgccgagca ccgctggcc gagcgaaacc      600 tttacctgca acgtggcgca tccggcgagc aaaaccaaag tggataaacc ggtgccgaaa      660
cgcgaaaacg gccgcgtgcc gcgcccgccg gattgcccga atgccccggc gccggaaatg      720
ctgggcggcc cgagcgtgtt tatttttccg ccgaaaccga agataccct gctgattgcg      780 cgcaccccgg aagtgaccctg cgtggtggtg gcgctggatc cggaagatcc ggaagtgcag      840
attagctggt ttgtggatgg caaacagatg cagaccgcga aaccagcc gcgcgaagaa      900 cagtttgccg gcacctatcg cgtggtgagc gtgctgccga ttggccatca ggattggctg      960
aaaggcaaac agtttaccctg caaagtgaac aacaaagcgc tgccgagccc gattgaacgc     1020

-continued

```
accattagca aagcgcgcgg ccaggcgcat cagccgagcg tgtatgtgct gccgccgagc    1080
cgcgaagaac tgagcaaaaa caccgtgagc ctgacctgcc tgattaaaga ttttttcccg    1140
ccggatattg atgtggaatg cagagcaac ggccagcagg aaccggaaag caaatatcgc     1200
accaccccgc cgcagctgga tgaagatggc agctattttc tgtatagcaa actgagcgtg    1260
gataaaagcc gctggcagcg cggcgatacc tttatttgcg cggtgatgca tgaagcgctg    1320
cataaccatt atacccagga aagcctgagc catagcccgg gcaaa                    1365
```

<210> SEQ ID NO 60
<211> LENGTH: 455
<212> TYPE: PRT
<213> ORGANISM: Artificial Sequence
<220> FEATURE:
<223> OTHER INFORMATION: caninized mouse antibody

<400> SEQUENCE: 60

```
Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Asn Met Asp Trp Val Arg Gln Ala Pro Gly Ala Gly Leu Asp Trp Met
        35                  40                  45

Gly Asn Ile Asn Pro Asn Ser Glu Ser Thr Ser Tyr Asn Gln Lys Phe
    50                  55                  60

Lys Gly Arg Val Thr Leu Thr Ala Asp Thr Ser Thr Ser Thr Ala Tyr
65                  70                  75                  80

Met Glu Leu Ser Ser Leu Arg Ala Gly Asp Ile Ala Val Tyr Tyr Cys
                85                  90                  95

Thr Arg Asp Gly Asn Arg Tyr Asp Ala Trp Phe Ala Tyr Trp Gly Gln
            100                 105                 110

Gly Thr Leu Val Thr Val Ser Ser Ala Ser Thr Thr Ala Pro Ser Val
        115                 120                 125

Phe Pro Leu Ala Pro Ser Cys Gly Ser Thr Ser Gly Ser Thr Val Ala
    130                 135                 140

Leu Ala Cys Leu Val Ser Gly Tyr Phe Pro Glu Pro Val Thr Val Ser
145                 150                 155                 160

Trp Asn Ser Gly Ser Leu Thr Ser Gly Val His Thr Phe Pro Ser Val
                165                 170                 175

Leu Gln Ser Ser Gly Leu Tyr Ser Leu Ser Ser Met Val Thr Val Pro
            180                 185                 190

Ser Ser Arg Trp Pro Ser Glu Thr Phe Thr Cys Asn Val Ala His Pro
        195                 200                 205

Ala Ser Lys Thr Lys Val Asp Lys Pro Val Pro Lys Arg Glu Asn Gly
    210                 215                 220

Arg Val Pro Arg Pro Pro Asp Cys Pro Lys Cys Pro Ala Pro Glu Met
225                 230                 235                 240

Leu Gly Gly Pro Ser Val Phe Ile Phe Pro Pro Lys Pro Lys Asp Thr
                245                 250                 255

Leu Leu Ile Ala Arg Thr Pro Glu Val Thr Cys Val Val Val Ala Leu
            260                 265                 270

Asp Pro Glu Asp Pro Glu Val Gln Ile Ser Trp Phe Val Asp Gly Lys
        275                 280                 285

Gln Met Gln Thr Ala Lys Thr Gln Pro Arg Glu Glu Gln Phe Ala Gly
    290                 295                 300
```

Thr Tyr Arg Val Val Ser Val Leu Pro Ile Gly His Gln Asp Trp Leu
305                 310                 315                 320

Lys Gly Lys Gln Phe Thr Cys Lys Val Asn Asn Lys Ala Leu Pro Ser
            325                 330                 335

Pro Ile Glu Arg Thr Ile Ser Lys Ala Arg Gly Gln Ala His Gln Pro
        340                 345                 350

Ser Val Tyr Val Leu Pro Pro Ser Arg Glu Glu Leu Ser Lys Asn Thr
    355                 360                 365

Val Ser Leu Thr Cys Leu Ile Lys Asp Phe Phe Pro Pro Asp Ile Asp
370                 375                 380

Val Glu Trp Gln Ser Asn Gly Gln Gln Glu Pro Glu Ser Lys Tyr Arg
385                 390                 395                 400

Thr Thr Pro Pro Gln Leu Asp Glu Asp Gly Ser Tyr Phe Leu Tyr Ser
            405                 410                 415

Lys Leu Ser Val Asp Lys Ser Arg Trp Gln Arg Gly Asp Thr Phe Ile
        420                 425                 430

Cys Ala Val Met His Glu Ala Leu His Asn His Tyr Thr Gln Glu Ser
    435                 440                 445

Leu Ser His Ser Pro Gly Lys
    450                 455

<210> SEQ ID NO 61
<211> LENGTH: 1365
<212> TYPE: DNA
<213> ORGANISM: Artificial Sequence
<220> FEATURE:
<223> OTHER INFORMATION: caninized mouse antibody

<400> SEQUENCE: 61
gaagtgcagc tggtgcagag cggcgcggaa gtgaaaaaac cgggcgcgag cgtgaaagtg      60
agctgcaaag cgagcggcta ccctttacc gattataaca tggattgggt gcgccaggcg     120
ccgggcgcga gcctggattg gattggcaac attaacccga cagcgaaag caccagctat     180 aaccagaaat ttaaaggcaa agcgacccctg accgtggata aagcaccag caccgcgtat     240 atggaactga gcagcctgcg cgcgggcgat attgcgtgt attattgcac ccgcgatggc     300
aaccgctatg atgcgtggtt tgcgtattgg ggccagggca ccctggtgac cgtgagcagc     360
gcgagcacca ccgcgccgag cgtgtttccg ctggcgccga ctgcggcag caccagcggc     420 agcaccgtgg cgctggcgtg cctggtgagc ggctattttc cggaaccggt gaccgtgagc     480
tggaacagcg gcagcctgac cagcggcgtg catacctttc cgagcgtgct gcagagcagc     540
ggcctgtata gcctgagcag catggtgacc gtgccgagca gccgctggcc gagcgaaacc     600
tttacctgca acgtggcgca tccgcgcagc aaaaccaaag tggataaacc ggtgccgaaa     660
cgcgaaaacg gcgcgtgcc gcgccccgcg gattgcccga atgcccggc gccggaaatg     720 ctgggcggcc cgagcgtgtt tattttttccg ccgaaaccga agatacccct gctgattgcg     780 cgcacccgg aagtgacctg cgtggtggtg gcgctggatc cggaagatcc ggaagtgcag     840
attagctggt ttgtggatgg caaacagatg cagaccgcga aacccagcc gcgcgaagaa     900 cagttttgccg gcacctatcg cgtggtgagc gtgctgccga ttggccatca ggattggctg     960
aaaggcaaac agtttaccctg caaagtgaac aacaaagcgc tgccgagccc gattgaacgc    1020
accattagca aagcgcgcgg ccaggcgcat cagccgagcg tgtatgtgct gccgccgagc    1080
cgcgaagaac tgagcaaaaa caccgtgagc ctgacctgcc tgattaaaga ttttttttccg    1140

```
ccggatattg atgtggaatg gcagagcaac ggccagcagg aaccggaaag caaatatcgc    1200
accaccccgc cgcagctgga tgaagatggc agctattttc tgtatagcaa actgagcgtg    1260
gataaaagcc gctggcagcg cggcgatacc tttatttgcg cggtgatgca tgaagcgctg    1320
cataaccatt atacccagga aagcctgagc catagcccgg gcaaa                   1365
```

<210> SEQ ID NO 62
<211> LENGTH: 455
<212> TYPE: PRT
<213> ORGANISM: Artificial Sequence
<220> FEATURE:
<223> OTHER INFORMATION: caninized mouse antibody

<400> SEQUENCE: 62

```
Glu Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Asn Met Asp Trp Val Arg Gln Ala Pro Gly Ala Ser Leu Asp Trp Ile
        35                  40                  45

Gly Asn Ile Asn Pro Asn Ser Glu Ser Thr Ser Tyr Asn Gln Lys Phe
    50                  55                  60

Lys Gly Lys Ala Thr Leu Thr Val Asp Lys Ser Thr Ser Thr Ala Tyr
65                  70                  75                  80

Met Glu Leu Ser Ser Leu Arg Ala Gly Asp Ile Ala Val Tyr Tyr Cys
                85                  90                  95

Thr Arg Asp Gly Asn Arg Tyr Asp Ala Trp Phe Ala Tyr Trp Gly Gln
            100                 105                 110

Gly Thr Leu Val Thr Val Ser Ser Ala Ser Thr Thr Ala Pro Ser Val
        115                 120                 125

Phe Pro Leu Ala Pro Ser Cys Gly Ser Thr Ser Gly Ser Thr Val Ala
    130                 135                 140

Leu Ala Cys Leu Val Ser Gly Tyr Phe Pro Glu Pro Val Thr Val Ser
145                 150                 155                 160

Trp Asn Ser Gly Ser Leu Thr Ser Gly Val His Thr Phe Pro Ser Val
                165                 170                 175

Leu Gln Ser Ser Gly Leu Tyr Ser Leu Ser Ser Met Val Thr Val Pro
            180                 185                 190

Ser Ser Arg Trp Pro Ser Glu Thr Phe Thr Cys Asn Val Ala His Pro
        195                 200                 205

Ala Ser Lys Thr Lys Val Asp Lys Pro Val Pro Lys Arg Glu Asn Gly
    210                 215                 220

Arg Val Pro Arg Pro Pro Asp Cys Pro Lys Cys Pro Ala Pro Glu Met
225                 230                 235                 240

Leu Gly Gly Pro Ser Val Phe Ile Phe Pro Pro Lys Pro Lys Asp Thr
                245                 250                 255

Leu Leu Ile Ala Arg Thr Pro Glu Val Thr Cys Val Val Val Ala Leu
            260                 265                 270

Asp Pro Glu Asp Pro Glu Val Gln Ile Ser Trp Phe Val Asp Gly Lys
        275                 280                 285

Gln Met Gln Thr Ala Lys Thr Gln Pro Arg Glu Glu Gln Phe Ala Gly
    290                 295                 300

Thr Tyr Arg Val Val Ser Val Leu Pro Ile Gly His Gln Asp Trp Leu
305                 310                 315                 320

Lys Gly Lys Gln Phe Thr Cys Lys Val Asn Asn Lys Ala Leu Pro Ser
```

|  |  | 325 |  |  |  | 330 |  |  |  | 335 |  |
| --- | --- | --- | --- | --- | --- | --- | --- | --- | --- | --- | --- |

Pro Ile Glu Arg Thr Ile Ser Lys Ala Arg Gly Gln Ala His Gln Pro
                            340                        345                        350

Ser Val Tyr Val Leu Pro Pro Ser Arg Glu Glu Leu Ser Lys Asn Thr
            355                        360                        365

Val Ser Leu Thr Cys Leu Ile Lys Asp Phe Phe Pro Pro Asp Ile Asp
    370                        375                        380

Val Glu Trp Gln Ser Asn Gly Gln Gln Glu Pro Glu Ser Lys Tyr Arg
385                        390                        395                        400

Thr Thr Pro Pro Gln Leu Asp Glu Asp Gly Ser Tyr Phe Leu Tyr Ser
                    405                        410                        415

Lys Leu Ser Val Asp Lys Ser Arg Trp Gln Arg Gly Asp Thr Phe Ile
                420                        425                        430

Cys Ala Val Met His Glu Ala Leu His Asn His Tyr Thr Gln Glu Ser
            435                        440                        445

Leu Ser His Ser Pro Gly Lys
    450                        455

<210> SEQ ID NO 63
<211> LENGTH: 1365
<212> TYPE: DNA
<213> ORGANISM: Artificial Sequence
<220> FEATURE:
<223> OTHER INFORMATION: caninized mouse antibody

<400> SEQUENCE: 63

| gaagtgcagc | tggtgcagag | cggcgcggaa | gtgaaaaaac | cgggcgcgag | cgtgaaagtg | 60 |
| agctgcaaag | cgagcggcta | tacctttacc | gattataaca | tggattgggt | gcgccaggcg | 120 |
| catggcgcga | gcctggattg | gattggcaac | attaacccga | acagcgaaag | caccagctat | 180 |
| aaccagaaat | ttaaaggcaa | agcgaccctg | accgtggata | aaagcaccag | caccgcgtat | 240 |
| atggaactga | gcagcctgcg | cgcgggcgat | attgcggtgt | attattgcac | cgcgatggc | 300 |
| aaccgctatg | atgcgtggtt | tgcgtattgg | ggccagggca | ccctggtgac | cgtgagcagc | 360 |
| gcgagcacca | ccgcgccgag | cgtgtttccg | ctggcgccga | gctgcggcag | caccagcggc | 420 |
| agcaccgtgg | cgctggcgtg | cctggtgagc | ggctatttc | cggaaccggt | gaccgtgagc | 480 |
| tggaacagcg | gcagcctgac | cagcggcgtg | cataccttc | cgagcgtgct | gcagagcagc | 540 |
| ggcctgtata | gcctgagcag | catggtgacc | gtgccgagca | gccgctggcc | gagcgaaacc | 600 |
| tttacctgca | acgtggcgca | tccggcgagc | aaaaccaaag | tggataaacc | ggtgccgaaa | 660 |
| cgcgaaaacg | gccgcgtgcc | gcgcccgccg | gattgcccga | atgcccggc | gccggaaatg | 720 |
| ctgggcggcc | cgagcgtgtt | tatttttccg | ccgaaaccga | aagataccct | gctgattgcg | 780 |
| cgcaccccgg | aagtgacctg | cgtggtggtg | gcgctggatc | cggaagatcc | ggaagtgcag | 840 |
| attagctggt | ttgtggatgg | caaacagatg | cagaccgcga | aacccagcc | gcgcgaagaa | 900 |
| cagtttgccg | gcacctatcg | cgtggtgagc | gtgctgccga | ttggccatca | ggattggctg | 960 |
| aaaggcaaac | agtttaccctg | caaagtgaac | aacaaagcgc | tgccgagccc | gattgaacgc | 1020 |
| accattagca | aagcgcgcgg | ccaggcgcat | cagccgagcg | tgtatgtgct | gccgccgagc | 1080 |
| cgcgaagaac | tgagcaaaaa | caccgtgagc | ctgacctgcc | tgattaaaga | ttttttccg | 1140 |
| ccggatattg | atgtggaatg | gcagagcaac | ggccagcagg | aaccggaaag | caaatatcgc | 1200 |
| accacccgc | cgcagctgga | tgaagatggc | agctatttc | tgtatagcaa | actgagcgtg | 1260 |
| gataaaagcc | gctggcagcg | cggcgatacc | tttatttgcg | cggtgatgca | tgaagcgctg | 1320 | cataaccatt atacccagga aagcctgagc catagcccgg gcaaa    1365

<210> SEQ ID NO 64
<211> LENGTH: 455
<212> TYPE: PRT
<213> ORGANISM: Artificial Sequence
<220> FEATURE:
<223> OTHER INFORMATION: caninized mouse antibody

<400> SEQUENCE: 64

```
Glu Val Gln Leu Val Gln Ser Gly Ala Glu Lys Lys Pro Gly Ala
1               5                   10                  15

Ser Val Lys Val Ser Cys Lys Ala Ser Gly Tyr Thr Phe Thr Asp Tyr
            20                  25                  30

Asn Met Asp Trp Val Arg Gln Ala His Gly Ala Ser Leu Asp Trp Ile
        35                  40                  45

Gly Asn Ile Asn Pro Asn Ser Glu Ser Thr Ser Tyr Asn Gln Lys Phe
    50                  55                  60

Lys Gly Lys Ala Thr Leu Thr Val Asp Lys Ser Thr Ser Thr Ala Tyr
65                  70                  75                  80

Met Glu Leu Ser Ser Leu Arg Ala Gly Asp Ile Ala Val Tyr Tyr Cys
                85                  90                  95

Thr Arg Asp Gly Asn Arg Tyr Asp Ala Trp Phe Ala Tyr Trp Gly Gln
            100                 105                 110

Gly Thr Leu Val Thr Val Ser Ser Ala Ser Thr Thr Ala Pro Ser Val
        115                 120                 125

Phe Pro Leu Ala Pro Ser Cys Gly Ser Thr Ser Gly Ser Thr Val Ala
    130                 135                 140

Leu Ala Cys Leu Val Ser Gly Tyr Phe Pro Glu Pro Val Thr Val Ser
145                 150                 155                 160

Trp Asn Ser Gly Ser Leu Thr Ser Gly Val His Thr Phe Pro Ser Val
                165                 170                 175

Leu Gln Ser Ser Gly Leu Tyr Ser Leu Ser Ser Met Val Thr Val Pro
            180                 185                 190

Ser Ser Arg Trp Pro Ser Glu Thr Phe Thr Cys Asn Val Ala His Pro
        195                 200                 205

Ala Ser Lys Thr Lys Val Asp Lys Pro Val Pro Lys Arg Glu Asn Gly
    210                 215                 220

Arg Val Pro Arg Pro Pro Asp Cys Pro Lys Cys Pro Ala Pro Glu Met
225                 230                 235                 240

Leu Gly Gly Pro Ser Val Phe Ile Phe Pro Pro Lys Pro Lys Asp Thr
                245                 250                 255

Leu Leu Ile Ala Arg Thr Pro Glu Val Thr Cys Val Val Val Ala Leu
            260                 265                 270

Asp Pro Glu Asp Pro Glu Val Gln Ile Ser Trp Phe Val Asp Gly Lys
        275                 280                 285

Gln Met Gln Thr Ala Lys Thr Gln Pro Arg Glu Glu Gln Phe Ala Gly
    290                 295                 300

Thr Tyr Arg Val Val Ser Val Leu Pro Ile Gly His Gln Asp Trp Leu
305                 310                 315                 320

Lys Gly Lys Gln Phe Thr Cys Lys Val Asn Asn Lys Ala Leu Pro Ser
                325                 330                 335

Pro Ile Glu Arg Thr Ile Ser Lys Ala Arg Gly Gln Ala His Gln Pro
            340                 345                 350
```

Ser Val Tyr Val Leu Pro Pro Ser Arg Glu Glu Leu Ser Lys Asn Thr
        355                 360                 365

Val Ser Leu Thr Cys Leu Ile Lys Asp Phe Phe Pro Pro Asp Ile Asp
    370                 375                 380

Val Glu Trp Gln Ser Asn Gly Gln Gln Glu Pro Glu Ser Lys Tyr Arg
385                 390                 395                 400

Thr Thr Pro Pro Gln Leu Asp Glu Asp Gly Ser Tyr Phe Leu Tyr Ser
                405                 410                 415

Lys Leu Ser Val Asp Lys Ser Arg Trp Gln Arg Gly Asp Thr Phe Ile
            420                 425                 430

Cys Ala Val Met His Glu Ala Leu His Asn His Tyr Thr Gln Glu Ser
        435                 440                 445

Leu Ser His Ser Pro Gly Lys
    450                 455

<210> SEQ ID NO 65
<211> LENGTH: 1365
<212> TYPE: DNA
<213> ORGANISM: Artificial Sequence
<220> FEATURE:
<223> OTHER INFORMATION: caninized mouse antibody

<400> SEQUENCE: 65
gaagtgcagc tgcagcagag cggcgcggaa gtgaaaaaac cgggcgcgag cgtgaaagtg      60
agctgcaaag cgagcggcta cctttacc gattataaca tggattgggt gcgccaggcg      120
ccgggcgcga gcctggattg gattggcaac attaacccga cagcgaaag caccagctat      180 aaccagaaat ttaaaggcaa agcgaccctg accgtggata aaagcaccag caccgcgtat      240
atggaactgc gcagcctgac cgcgggcgat attgcggtgt attattgcac cgcgatggc      300 aaccgctatg atgcgtggtt tgcgtattgg ggccagggca ccctggtgac cgtgagcagc      360
gcgagcacca ccgcgccgag cgtgtttccg ctggcgccga ctgcggcag caccagcggc      420 agcaccgtgg cgctggcgtg cctggtgagc ggctattttc cggaaccggt gaccgtgagc      480
tggaacagcg gcagcctgac cagcggcgtg cataccttc cgagcgtgct gcagagcagc      540
ggcctgtata gcctgagcag catggtgacc gtgccgagca ccgctggcc gagcgaaacc      600 tttacctgca acgtgcgca tccggcgagc aaaaccaaag tggataaacc ggtgccgaaa      660
cgcgaaaacg gccgcgtgcc gcgcccgccg gattgcccga atgcccggc gccggaaatg      720 ctgggcggcc cgagcgtgtt tatttttccg ccgaaaccga agatacccct gctgattgcg      780 cgcacccccgg aagtgacctg cgtggtggtg gcgctggatc cggaagatcc ggaagtgcag      840
attagctggt ttgtggatgg caaacagatg cagaccgcga aaacccagcc gcgcgaagaa      900
cagtttgccg gcacctatcg cgtggtgagc gtgctgccga ttggccatca ggattggctg      960
aaaggcaaac agttttaccctg caaagtgaac aacaaagcgc tgccgagccc gattgaacgc     1020
accattagca aagcgcgcgg ccaggcgcat cagccgagcg tgtatgtgct gccgccgagc     1080
cgcgaagaac tgagcaaaaa caccgtgagc ctgacctgcc tgattaaaga ttttttttccg     1140 ccggatattg atgtggaatg gcagagcaac ggccagcagg aaccggaaag caaatatcgc     1200
accaccccgc cgcagctgga tgaagatggc agctatttc tgtatagcaa actgagcgtg     1260
gataaaagcc gctggcagcg cggcgatacc tttatttgcg cggtgatgca tgaagcgctg     1320
cataaccatt atacccagga aagcctgagc catagcccgg gcaaa     1365

<210> SEQ ID NO 66

```
<211> LENGTH: 455
<212> TYPE: PRT
<213> ORGANISM: Artificial Sequence
<220> FEATURE:
<223> OTHER INFORMATION: caninized mouse antibody

<400> SEQUENCE: 66

Glu Val Gln Leu Gln Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Asn Met Asp Trp Val Arg Gln Ala Pro Gly Ala Ser Leu Asp Trp Ile
        35                  40                  45

Gly Asn Ile Asn Pro Asn Ser Glu Ser Thr Ser Tyr Asn Gln Lys Phe
    50                  55                  60

Lys Gly Lys Ala Thr Leu Thr Val Asp Lys Ser Thr Ser Thr Ala Tyr
65                  70                  75                  80

Met Glu Leu Arg Ser Leu Thr Ala Gly Asp Ile Ala Val Tyr Tyr Cys
                85                  90                  95

Thr Arg Asp Gly Asn Arg Tyr Asp Ala Trp Phe Ala Tyr Trp Gly Gln
            100                 105                 110

Gly Thr Leu Val Thr Val Ser Ser Ala Ser Thr Thr Ala Pro Ser Val
        115                 120                 125

Phe Pro Leu Ala Pro Ser Cys Gly Ser Thr Ser Gly Ser Thr Val Ala
    130                 135                 140

Leu Ala Cys Leu Val Ser Gly Tyr Phe Pro Glu Pro Val Thr Val Ser
145                 150                 155                 160

Trp Asn Ser Gly Ser Leu Thr Ser Gly Val His Thr Phe Pro Ser Val
                165                 170                 175

Leu Gln Ser Ser Gly Leu Tyr Ser Leu Ser Ser Met Val Thr Val Pro
            180                 185                 190

Ser Ser Arg Trp Pro Ser Glu Thr Phe Thr Cys Asn Val Ala His Pro
        195                 200                 205

Ala Ser Lys Thr Lys Val Asp Lys Pro Val Pro Lys Arg Glu Asn Gly
    210                 215                 220

Arg Val Pro Arg Pro Pro Asp Cys Pro Lys Cys Pro Ala Pro Glu Met
225                 230                 235                 240

Leu Gly Gly Pro Ser Val Phe Ile Phe Pro Pro Lys Pro Lys Asp Thr
                245                 250                 255

Leu Leu Ile Ala Arg Thr Pro Glu Val Thr Cys Val Val Val Ala Leu
            260                 265                 270

Asp Pro Glu Asp Pro Glu Val Gln Ile Ser Trp Phe Val Asp Gly Lys
        275                 280                 285

Gln Met Gln Thr Ala Lys Thr Gln Pro Arg Glu Gln Phe Ala Gly
    290                 295                 300

Thr Tyr Arg Val Val Ser Val Leu Pro Ile Gly His Gln Asp Trp Leu
305                 310                 315                 320

Lys Gly Lys Gln Phe Thr Cys Lys Val Asn Asn Lys Ala Leu Pro Ser
                325                 330                 335

Pro Ile Glu Arg Thr Ile Ser Lys Ala Arg Gly Gln Ala His Gln Pro
            340                 345                 350

Ser Val Tyr Val Leu Pro Pro Ser Arg Glu Glu Leu Ser Lys Asn Thr
        355                 360                 365

Val Ser Leu Thr Cys Leu Ile Lys Asp Phe Phe Pro Pro Asp Ile Asp
    370                 375                 380
```

Val Glu Trp Gln Ser Asn Gly Gln Gln Glu Pro Ser Lys Tyr Arg
385                 390                 395                 400

Thr Thr Pro Pro Gln Leu Asp Glu Asp Gly Ser Tyr Phe Leu Tyr Ser
            405                 410                 415

Lys Leu Ser Val Asp Lys Ser Arg Trp Gln Arg Gly Thr Phe Ile
            420                 425                 430

Cys Ala Val Met His Glu Ala Leu His Asn His Tyr Thr Gln Glu Ser
            435                 440                 445

Leu Ser His Ser Pro Gly Lys
        450                 455

<210> SEQ ID NO 67
<211> LENGTH: 669
<212> TYPE: DNA
<213> ORGANISM: Canis familiaris

<400> SEQUENCE: 67
atggcgggct tggctttcg ccgccatggc gcgcagccgg atctggcgag ccgcacctgg      60
ccgtgcaccg cgctgtttag cctgctgttt attccggtgt ttagcaaagg catgcatgtg    120
gcgcagccgg cggtggtgct ggcgagcagc cgcggcgtgg cgagctttgt gtgcgaatat    180
ggcagcagcg gcaacgcggc ggaagtgcgc gtgaccgtgc tgcgccaggc gggcagccag    240
atgaccgaag tgtgcgcggc gacctatacc gtggaagatg aactggcgtt tctggatgat    300
agcacctgca ccggcaccag cagcggcaac aaagtgaacc tgaccattca gggcctgcgc    360
gcgatggata ccggcctgta tatttgcaaa gtggaactga tgtatccgcc gccgtattat    420
gtgggcatgg caacggcac ccagatttat gtgattgatc cggaaccgtg cccggatagc     480
gattttctgc tgtggattct ggcggcggtg agcagcggcc tgttttttta tagctttctg    540
attaccgcgg tgagcctgag caaaatgctg aaaaaacgca gcccgctgac caccggcgtg    600
tatgtgaaaa tgccgccgac cgaaccggaa tgcgaaaaac agtttcagcc gtatttatt    660 ccgattaac                                                             669

<210> SEQ ID NO 68
<211> LENGTH: 223
<212> TYPE: PRT
<213> ORGANISM: Canis familiaris

<400> SEQUENCE: 68

Met Ala Gly Phe Gly Phe Arg Arg His Gly Ala Gln Pro Asp Leu Ala
1               5                   10                  15

Ser Arg Thr Trp Pro Cys Thr Ala Leu Phe Ser Leu Leu Phe Ile Pro
            20                  25                  30

Val Phe Ser Lys Gly Met His Val Ala Gln Pro Ala Val Val Leu Ala
        35                  40                  45

Ser Ser Arg Gly Val Ala Ser Phe Val Cys Glu Tyr Gly Ser Ser Gly
    50                  55                  60

Asn Ala Ala Glu Val Arg Val Thr Val Leu Arg Gln Ala Gly Ser Gln
65                  70                  75                  80

Met Thr Glu Val Cys Ala Ala Thr Tyr Thr Val Glu Asp Glu Leu Ala
            85                  90                  95

Phe Leu Asp Asp Ser Thr Cys Thr Gly Thr Ser Ser Gly Asn Lys Val
            100                 105                 110

Asn Leu Thr Ile Gln Gly Leu Arg Ala Met Asp Thr Gly Leu Tyr Ile
        115                 120                 125

Cys Lys Val Glu Leu Met Tyr Pro Pro Tyr Tyr Val Gly Met Gly
    130                 135                 140

Asn Gly Thr Gln Ile Tyr Val Ile Asp Pro Glu Pro Cys Pro Asp Ser
145                 150                 155                 160

Asp Phe Leu Leu Trp Ile Leu Ala Ala Val Ser Ser Gly Leu Phe Phe
                165                 170                 175

Tyr Ser Phe Leu Ile Thr Ala Val Ser Leu Ser Lys Met Leu Lys Lys
                180                 185                 190

Arg Ser Pro Leu Thr Thr Gly Val Tyr Val Lys Met Pro Pro Thr Glu
            195                 200                 205

Pro Glu Cys Glu Lys Gln Phe Gln Pro Tyr Phe Ile Pro Ile Asn
    210                 215                 220

<210> SEQ ID NO 69
<211> LENGTH: 215
<212> TYPE: PRT
<213> ORGANISM: Artificial Sequence
<220> FEATURE:
<223> OTHER INFORMATION: modified canine

<400> SEQUENCE: 69

Leu Gly Gly Pro Ser Val Phe Ile Phe Pro Pro Lys Pro Lys Asp Thr
1               5                   10                  15

Leu Leu Ile Ala Arg Thr Pro Glu Val Thr Cys Val Val Val Ala Leu
                20                  25                  30

Asp Pro Glu Asp Pro Glu Val Gln Ile Ser Trp Phe Val Asp Gly Lys
            35                  40                  45

Gln Met Gln Thr Ala Lys Thr Gln Pro Arg Glu Glu Gln Phe Ala Gly
50                  55                  60

Thr Tyr Arg Val Val Ser Val Leu Pro Ile Gly His Gln Asp Trp Leu
65                  70                  75                  80

Lys Gly Lys Gln Phe Thr Cys Lys Val Asn Asn Lys Ala Leu Pro Ser
                85                  90                  95

Pro Ile Glu Arg Thr Ile Ser Lys Ala Arg Gly Gln Ala His Gln Pro
            100                 105                 110

Ser Val Tyr Val Leu Pro Pro Ser Arg Glu Glu Leu Ser Lys Asn Thr
        115                 120                 125

Val Ser Leu Thr Cys Leu Ile Lys Asp Phe Phe Pro Pro Asp Ile Asp
    130                 135                 140

Val Glu Trp Gln Ser Asn Gly Gln Gln Glu Pro Glu Ser Lys Tyr Arg
145                 150                 155                 160

Thr Thr Pro Pro Gln Leu Asp Glu Asp Gly Ser Tyr Phe Leu Tyr Ser
                165                 170                 175

Lys Leu Ser Val Asp Lys Ser Arg Trp Gln Arg Gly Asp Thr Phe Ile
                180                 185                 190

Cys Ala Val Met His Glu Ala Leu His Asn His Tyr Thr Gln Glu Ser
                195                 200                 205

Leu Ser His Ser Pro Gly Lys
    210                 215